(12) United States Patent
Allen et al.

(10) Patent No.: US 9,512,269 B2
(45) Date of Patent: Dec. 6, 2016

(54) METHODS FOR POLYMER SYNTHESIS

(71) Applicant: Novomer, Inc., Ithaca, NY (US)

(72) Inventors: Scott D. Allen, Ithaca, NY (US); Christopher A. Simoneau, Ithaca, NY (US); William D. Keefe, Ithaca, NY (US); Jeff R. Conuel, Ithaca, NY (US)

(73) Assignee: Novomer, Inc., Ithaca, NY (US)

( * ) Notice: Subject to any disclaimer, the term of this patent is extended or adjusted under 35 U.S.C. 154(b) by 110 days.

(21) Appl. No.: 14/367,333

(22) PCT Filed: Dec. 20, 2012

(86) PCT No.: PCT/US2012/070904
§ 371 (c)(1),
(2) Date: Jun. 20, 2014

(87) PCT Pub. No.: WO2013/096602
PCT Pub. Date: Jun. 27, 2013

(65) Prior Publication Data
US 2015/0051369 A1 Feb. 19, 2015

Related U.S. Application Data

(60) Provisional application No. 61/577,800, filed on Dec. 20, 2011.

(51) Int. Cl.
*C08G 65/00* (2006.01)
*C08G 64/34* (2006.01)

(52) U.S. Cl.
CPC .................................... *C08G 64/34* (2013.01)

(58) Field of Classification Search
CPC ... C07F 15/065; C07F 11/005; C08G 65/266
See application file for complete search history.

(56) References Cited

U.S. PATENT DOCUMENTS

| 2005/0187392 | A1 | 8/2005 | Jacobsen et al. |
| 2010/0324260 | A1 | 12/2010 | Jeong et al. |
| 2011/0054145 | A1 | 3/2011 | Chang et al. |
| 2011/0230580 | A1 | 9/2011 | Allen et al. |

FOREIGN PATENT DOCUMENTS

| WO | WO-2009/137540 A1 | 11/2009 |
| WO | WO-2010/022388 A2 | 2/2010 |
| WO | WO-2010/028362 A1 | 3/2010 |

OTHER PUBLICATIONS

Cohen, C.T. et al., Cobalt catalysts for the alternating copolymerization of propylene oxide and carbon dioxide: Combining high activity and selectivity, Journal of the American Chemical Society, 127: 10869-10878 (2005).
Min, J. et al., Efficient synthesis of a highly active catalyst for CO2/epoxide copolymerization, Bull. Korean Chem. Soc., 30(3): 745 (2009).
European Search Report for 12859891.9, 6 pages. (Jul. 9, 2015).
Written Opinion for PCT/US2012/070904, 16 pages. (Feb. 26, 2013).
International Search Report for PCT/US2012/070904 mailed Feb. 26, 2013.
Darensbourg, D.J. and Mackiewicz, R.M., Role of the Cocatalyst in the Copolymerization of CO2 and Cyclohexene Oxide Utilizing Chromium Salen Complexes, J. Am. Chem. Soc., 127: 14026-14038 (2005).

*Primary Examiner* — Shane Fang
(74) *Attorney, Agent, or Firm* — Choate, Hall and Stewart LLP; Charles E. Lyon

(57) ABSTRACT

The present invention provides methods for reducing induction periods in epoxide-$CO_2$ copolymerizations. In certain embodiments, the methods include the step of contacting an epoxide with $CO_2$ in the presence of two catalysts: an epoxide hydrolysis catalyst and an epoxide $CO_2$ copolymerization catalyst. In another aspect, the invention provides catalyst compositions comprising a mixture of an epoxide hydrolysis catalyst and an epoxide $CO_2$ copolymerization catalyst.

15 Claims, No Drawings

METHODS FOR POLYMER SYNTHESIS

CROSS REFERENCE TO RELATED APPLICATIONS

The present application claims priority to U.S. provisional application Ser. No. 61/577,800 filed Dec. 20, 2011, the entire content of which is hereby incorporated herein by reference.

GOVERNMENT SUPPORT

The invention was made in part with United States Government support under grants DE-FE0002474 awarded by the Department of Energy. The United States Government has certain rights in the invention.

BACKGROUND

Methods for the copolymerization of epoxides and carbon dioxide to form aliphatic polycarbonates (APCs) have been known in the art since the 1960s. The early methods of copolymerization used catalysts based on heterogeneous zinc compounds and suffered from low reactivity, a lack of selectivity for polymer formation vs. cyclic carbonate formation, and a tendency to produce polycarbonates contaminated with ether linkages.

Improved methods using catalysts based on transition metals have been discovered over the past decade or so. These newer catalysts have increased reactivity and improved selectivity. Nevertheless, even using highly active catalysts such as those disclosed in U.S. Pat. No. 7,304,172, the reaction times required to make high molecular weight polymer are typically quite tong. In addition, the best-performing catalysts disclosed in the '172 patent require the addition of a separate co-catalyst to achieve optimum activity.

Recent advances in addressing these shortcomings have been made by developing transition metal catalysts with one or more functional groups tethered to a ligand of the catalysts, see for example WO 2010/022338, WO 2008/136591, and WO 2010/013948 and references cited therein. However, these catalysts with tethered functional groups suffer from undesirable induction times prior to onset of polymerization, see for example (*Angew. Chem. Int. Ed.* 2008, 47, 7306-7309. In some cases, the induction time prior to the onset of polymerization can exceed the actual reaction time. This is inefficient, causes unpredictability in the total processing time required to make polymer, and reduces the ultimate catalyst productivity that can be achieved. This is highly undesirable in a manufacturing context. As such, there remains a need for methods that will reduce or eliminate the induction time in epoxide $CO_2$ copolymerization reactions.

SUMMARY

The present invention provides methods of preparing poly(alkylene carbonate) comprising the step of contacting one or more epoxides and carbon dioxide with an epoxide hydrolysis catalyst and a polymerization catalyst. In certain embodiments, the epoxide hydrolysis catalyst catalyzes hydrolysis of the epoxide but does not inhibit copolymerization of the epoxide and carbon dioxide.

In certain embodiments, the present invention provides methods of reducing undesirable induction time prior to onset of copolymerization of epoxides and carbon dioxide by eliminating water present in the reaction mixture by providing an epoxide hydrolysis catalyst that consumes the water by reaction with epoxide present in the reaction mixture.

In certain embodiments, the present invention provides novel compositions comprising a mixture of a first catalyst that is an epoxide hydrolysis catalyst and a second catalyst with a different structure that is an epoxide $CO_2$ copolymerization catalyst.

DEFINITIONS

Definitions of specific functional groups and chemical terms are described in more detail below. For purposes of this invention, the chemical elements are identified in accordance with the Periodic Table of the Elements. CAS version, Handbook of Chemistry and Physics, $75^{th}$ Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito, 1999; Smith and March *March's Advanced Organic Chemistry*, $5^{th}$ Edition, John Wiley & Sons, Inc., New York, 2001; Larock, *Comprehensive Organic Transformations*, VCH Publishers, Inc., New York, 1989; Carruthers, *Some Modern Methods of Organic Synthesis*, $3^{rd}$ Edition, Cambridge University Press, Cambridge, 1987; the entire contents of each of which are incorporated herein by reference.

Certain compounds of the present invention can comprise one or more asymmetric centers, and thus can exist in various stereoisomeric forms, e.g., enantiomers and/or diastereomers. Thus, inventive compounds and compositions thereof may be in the form of an individual enantiomer, diastereomer or geometric isomer, or may be in the form of a mixture of stereoisomers. In certain embodiments, the compounds of the invention are enantiopure compounds. In certain embodiments, mixtures of enantiomers or diastereomers are provided.

Furthermore, certain compounds, as described herein may have one or more double bonds that can exist as either a Z or E isomer, unless otherwise indicated. The invention additionally encompasses the compounds as individual isomers substantially free of other isomers and alternatively, as mixtures of various isomers, racemic mixtures of enantiomers. In addition to the above-mentioned compounds per se, this invention also encompasses compositions comprising one or more compounds.

As used herein, the term "isomers" includes any and all geometric isomers and stereoisomers. For example, "isomers" include cis- and trans-isomers, E- and Z-isomers, R- and S-enantiomers, diastereomers, (D)-isomers, (L)-isomers, racemic mixtures thereof, and other mixtures thereof, as falling within the scope of the invention. For instance, a compound may, in some embodiments, be provided substantially free of one or more corresponding stereoisomers, and may also be referred to as "stereochemically enriched."

Where a particular enantiomer is preferred, it may, in some embodiments be provided substantially free of the opposite enantiomer, and may also be referred to as "optically enriched." "Optically enriched," as used herein, means that the compound is made up of a significantly greater proportion of one enantiomer. In certain embodiments the compound is made up of at least about 90% by weight of an enantiomer. In some embodiments the compound is made up of at least about 95%, 97%, 98%, 99%, 99.5%, 99.7%, 99.8%, or 99.9% by weight of an enantiomer. In some embodiments the enantiomeric excess of provided compounds is at least about 90%, 95%, 97%, 98%, 99%, 99.5%, 99.7%, 99.8%, or 99.9%. In some embodiments, enantiomers may be isolated from racemic mixtures by any method known to those skilled in the art, including chiral high pressure liquid chromatography (HPLC) and the formation and crystallization of chiral salts or prepared by asymmetric syntheses. See, for example, Jacques, et al., *Enantiomers, Racemates and Resolutions* (Wiley Interscience, New York, 1981); Wilen, S. H., et al., *Tetrahedron* 33:2725 (1977); Eliel, E. L. *Stereochemistry of Carbon Compounds* (McGraw-Hill, N.Y., 1962); Wilen, S. H. *Tables of Resolving Agents and Optical Resolutions* p. 268 (E. L. Eliel, Ed., Univ. of Notre Dame Press, Notre Dame, Ind. 1972).

The terms "halo" and "halogen" as used herein refer to an atom selected from fluorine (fluoro, —F), chlorine (chloro, —Cl), bromine (bromo, —Br), and iodine (iodo, —I).

The term "aliphatic" or "aliphatic group", as used herein, denotes a hydrocarbon moiety that may be straight-chain (i.e., unbranched), branched, or cyclic (including fused, bridging, and spiro-fused polycyclic) and may be completely saturated or may contain one or more units of unsaturation, but which is not aromatic. Unless otherwise specified, aliphatic groups contain 1-30 carbon atoms. In certain embodiments, aliphatic groups contain 1-12 carbon atoms. In certain embodiments, aliphatic groups contain 1-8 carbon atoms. In certain embodiments, aliphatic groups contain 1-6 carbon atoms. In some embodiments, aliphatic groups contain 1-5 carbon atoms, in some embodiments, aliphatic groups contain 1-4 carbon atoms, in yet other embodiments aliphatic groups contain 1-3 carbon atoms, and in yet other embodiments aliphatic groups contain 1-2 carbon atoms. Suitable aliphatic groups include, but are not limited to, linear or branched, alkyl, alkenyl, and alkynyl groups, and hybrids thereof such as (cycloalkyl)alkyl, (cycloalkenyl)alkyl or (cycloalkyl)alkenyl. In certain embodiments, the term aliphatic group encompasses aliphatic groups wherein one or more hydrogen atoms are replaced with a halogen atom. In certain embodiments, the term aliphatic group encompasses chlorinated or fluorinated aliphatic groups including perfluorinated compounds.

The term "epoxide", as used herein, refers to a substituted or unsubstituted oxirane. Such substituted oxiranes include monosubstituted oxiranes, disubstituted oxiranes, trisubstituted oxiranes, and tetrasubstituted oxiranes. Such epoxides may be further optionally substituted as defined herein. In certain embodiments, epoxides comprise a single oxirane moiety. In certain embodiments, epoxides comprise two or more oxirane moieties.

The term "polymer", as used herein, refers to a molecule of high relative molecular mass, the structure of which comprises the multiple repetition of units derived, actually or conceptually, from molecules of low relative molecular mass. In certain embodiments, a polymer is comprised of only one monomer species (e.g., polyethylene oxide). In certain embodiments, a polymer of the present invention is a copolymer, terpolymer, heteropolymer, block copolymer, or tapered heteropolymer of one or more epoxides.

The term "unsaturated", as used herein, means that a moiety has one or more double or triple bonds.

The terms "cycloaliphatic", "carbocycle", or "carbocyclic", used alone or as part of a larger moiety, refer to a saturated or partially unsaturated cyclic aliphatic monocyclic, bicyclic, or polycyclic ring systems, as described herein, having from 3 to 12 members, wherein the aliphatic ring system is optionally substituted as defined above and described herein. Cycloaliphatic groups include, without limitation, cyclopropyl, cyclobutyl, cyclopentyl, cyclopentenyl, cyclohexyl, cyclohexenyl, cycloheptyl, cycloheptenyl, cyclooctyl, cyclooctenyl, and cyclooctadienyl. In some embodiments, the cycloalkyl has 3-6 carbons. The terms "cycloaliphatic", "carbocycle" or "carbocyclic" also include aliphatic rings that are fused to one or more aromatic or nonaromatic rings, such as decahydronaphthyl or tetrahydronaplithyl, where the radical or point of attachment is on the aliphatic ring. In some embodiments, a carbocyclic groups is bicyclic. In some embodiments, a carbocyclic group is tricyclic. In some embodiments, a carbocyclic group is polycyclic. In certain embodiments, the term "3- to 8-membered carbocycle" refers to a 3- to 8-membered saturated or partially unsaturated monocyclic carbocyclic ring The term "alkyl," as used herein, refers to saturated, straight- or branched-chain hydrocarbon radicals derived by removal of a single hydrogen atom from an aliphatic moiety. Unless otherwise specified, alkyl groups contain 1-12 carbon atoms. In certain embodiments, alkyl groups contain 1-8 carbon atoms. In certain embodiments, alkyl groups contain 1-6 carbon atoms. In some embodiments, alkyl groups contain 1-5 carbon atoms, in some embodiments, alkyl groups contain 1-4 carbon atoms, in yet other embodiments alkyl groups contain 1-3 carbon atoms, and in yet other embodiments alkyl groups contain 1-2 carbon atoms. Examples of alkyl radicals include, but are not limited to, methyl, ethyl, n-propyl, isopropyl, n-butyl, iso-butyl, sec-butyl, sec-pentyl, iso-pentyl, tert-butyl, n-pentyl, neopentyl, n-hexyl, sec-hexyl, n-heptyl, n-octyl, n-decyl, n-undecyl, dodecyl, and the like.

The term "alkenyl," as used herein, denotes a monovalent group derived by the removal of a single hydrogen atom from a straight- or branched-chain aliphatic moiety having at least one carbon-carbon double bond. Unless otherwise specified, alkenyl groups contain 2-12 carbon atoms. In certain embodiments, alkenyl groups contain 2-8 carbon atoms. In certain embodiments, alkenyl groups contain 2-6 carbon atoms. In some embodiments, alkenyl groups contain 2-5 carbon atoms, in some embodiments, alkenyl groups contain 2-4 carbon atoms, in yet other embodiments alkenyl groups contain 2-3 carbon atoms, and in yet other embodiments alkenyl groups contain 2 carbon atoms. Alkenyl groups include, for example, ethenyl, propenyl, allyl, 1,3-butadienyl, butenyl, 1-methyl-2-buten-1-yl, allyl, 1,3-butadienyl, allenyl, and the like.

The term "alkynyl," as used herein, refers to a monovalent group derived by the removal of a single hydrogen atom from a straight- or branched-chain aliphatic moiety having at least one carbon-carbon triple bond. Unless otherwise specified, alkynyl groups contain 2-12 carbon atoms. In certain embodiments, alkynyl groups contain 2-8 carbon atoms. In certain embodiments, alkynyl groups contain 2-6 carbon atoms. In some embodiments, alkynyl groups contain 2-5 carbon atoms, in some embodiments, alkynyl groups contain 2-4 carbon atoms, in yet other embodiments alkynyl groups contain 2-3 carbon atoms, and in yet other embodiments alkynyl groups contain 2 carbon atoms. Representative alkynyl groups include, but are not limited to, ethynyl, 2-propynyl (propargyl), 1-propynyl, and the like.

The term "carbocycle" and "carbocyclic ring" as used herein, refer to monocyclic and polycyclic moieties wherein the rings contain only carbon atoms. Unless otherwise specified, carbocycles may be saturated, partially unsaturated or aromatic, and contain 3 to 20 carbon atoms. Representative carbocycles include cyclopropane, cyclobutane, cyclopentane, cyclohexane, bicyclo[2,2,1]heptane, norbornene, phenyl, cyclohexene, naphthalene, and spiro[4.5]decane, to name but a few.

The term "aryl" used alone or as part of a larger moiety as in "aralkyl", "aralkoxy", or "aryloxyalkyl", refers to monocyclic and polycyclic ring systems having a total of six to 20 ring members, wherein at least one ring in the system is aromatic and wherein each ring in the system contains three to twelve ring members. The term "aryl" may be used interchangeably with the term "aryl ring". In certain embodiments of the present invention, "aryl" refers to an aromatic ring system which includes, but is not limited to, phenyl, biphenyl, naphthyl, anthracyl and the like, which may bear one or more substituents. Also included within the scope of the term "aryl", as it is used herein, is a group in which an aromatic ring is fused to one or more additional rings, such as benzofuranyl, indanyl, phthalimidyl, naphthimidyl, phenanthridinyl, or tetrahydronaphthyl, and the like. In certain embodiments, the term "8- to 14-membered aryl," refers to an 8- to 14-membered polycyclic aryl ring.

The term "heteroaliphatic," as used herein, refers to aliphatic groups wherein one or more carbon atoms are independently replaced by one or more atoms selected from the group consisting of oxygen, sulfur, nitrogen, phosphorus, or boron. In certain embodiments, one to six carbon atoms are independently replaced by one or more of oxygen, sulfur, nitrogen, or phosphorus. Heteroaliphatic groups may be substituted or unsubstituted, branched or unbranched, cyclic or acyclic, and include saturated, unsaturated or partially unsaturated groups.

The terms "heteroaryl" and "heteroar-", used alone or as part of a larger moiety, e.g., "heteroaralkyl", or "heteroaralkoxy", refer to groups having 5 to 14 ring atoms, preferably 5, 6, or 9 ring atoms; having 6, 10, or 14 π electrons shared in a cyclic array; and having, in addition to carbon atoms, from one to five heteroatoms. The term "heteroatom" refers to nitrogen, oxygen, or sulfur, and includes any oxidized form of nitrogen or sulfur, and any quaternized form of a basic nitrogen. Heteroaryl groups include, without limitation, thienyl, furanyl, pyrrolyl, imidazolyl, pyrazolyl, triazolyl, tetrazolyl, oxazolyl, isoxazolyl, oxadiazolyl, thiazolyl, isothiazolyl, thiadiazolyl, pyridyl, pyridazinyl, pyrimidinyl, pyrazinyl, indolizinyl, purinyl, naphthyridinyl, benzofuranyl and pteridinyl. The terms "heteroaryl" and "heteroar-", as used herein, also include groups in which a heteroaromatic ring is fused to one or more aryl, cycloaliphatic, or heterocyclyl rings, where the radical or point of attachment is on the heteroaromatic ring. Nonlimiting examples include indolyl, isoindolyl, benzothienyl, benzofuranyl, dibenzofuranyl, indazolyl, benzimidazolyl, benzthiazolyl, quinolyl, isoquinolyl, cinnolinyl, quinazolinyl, quinoxalinyl, 4H-quinolizinyl, carbazolyl, acridinyl, phenazinyl, phenothiazinyl, phenoxazinyl, tetrahydroquinolinyl, tetrahydroisoquinolinyl, and pyrido[2,3-b]-1,4-oxazin-3(4H)-one. A heteroaryl group may be mono- or polycyclic. The term "heteroaryl" may be used interchangeably with the terms "heteroaryl ring", "heteroaryl group", or "heteroaromatic", any of which terms include rings that are optionally substituted. The term "heteroaralkyl" refers to an alkyl group substituted by a heteroaryl, wherein the alkyl and heteroaryl portions independently are optionally substituted. In certain embodiments, the term "5- to 14-membered heteroaryl" refers to a 5- to 6-membered monocyclic heteroaryl ring having 1 to 3 heteroatoms independently selected from nitrogen, oxygen, or sulfur, or an 8- to 14-membered bicyclic heteroaryl ring having to 4 heteroatoms independently selected from nitrogen, oxygen, or sulfur.

As used herein, the terms "heterocycle", "heterocyclyl", "heterocyclic radical", and "heterocyclic ring" are used interchangeably and refer to a stable 5- to 7-membered monocyclic or 7-14-membered bicyclic heterocyclic moiety that is saturated, partially unsaturated, or aromatic and having, in addition to carbon atoms, one or more, preferably one to four, heteroatoms, as defined above. When used in reference to a ring atom of a heterocycle, the term "nitrogen" includes a substituted nitrogen. As an example, in a saturated or partially unsaturated ring having 0-3 heteroatoms selected from oxygen, sulfur or nitrogen, the nitrogen may be N (as in 3,4-dihydro-2H-pyrrolyl), NH (as in pyrrolidinyl), or $^+$NR (as in N-substituted pyrrolidinyl). In some embodiments, the term "3- to 7-membered heterocyclic" refers to a 3- to 7-membered saturated or partially unsaturated monocyclic heterocyclic ring having 1 to 2 heteroatoms independently selected from nitrogen, oxygen, or sulfur. In some embodiments, the term "3- to 8-membered heterocyclic" refers to a 3- to 8-membered saturated or partially unsaturated monocyclic heterocyclic ring having 1 to 2 heteroatoms independently selected from nitrogen, oxygen, or sulfur.

A heterocyclic ring can be attached to its pendant group at any heteroatom or carbon atom that results in a stable structure and any of the ring atoms can be optionally substituted. Examples of such saturated or partially unsaturated heterocyclic radicals include, without limitation, tetrahydrofuranyl, tetrahydrothienyl, pyrrolidinyl, pyrrolidonyl, piperidinyl pyrrolinyl, tetrahydroquinolinyl, tetrahydroisoquinolinyl, decahydroquinolinyl, oxazolidinyl, piperazinyl, dioxanyl, dioxolanyl, diazepinyl, oxazepinyl, thiazepinyl, morpholinyl, and quinuclidinyl. The terms "heterocycle", "heterocyclyl", "heterocyclyl ring", "heterocyclic group", "heterocyclic moiety", and "heterocyclic radical", are used interchangeably herein, and also include groups in which a heterocyclyl ring is fused to one or more aryl, heteroaryl, or cycloaliphatic rings, such as indolinyl, 3H-indolyl, chromanyl, phenanthridinyl, or tetrahydroquinolinyl, where the radical or point of attachment is on the heterocyclyl ring. A heterocyclyl group may be mono- or bicyclic. The term "heterocyclylalkyl" refers to an alkyl group substituted by a heterocyclyl, wherein the alkyl and heterocyclyl portions independently are optionally substituted.

The term "acyl" as used herein refers to a group having a formula —C(O)R where R is hydrogen or an optionally substituted aliphatic, aryl, or heterocyclic group.

As used herein, the term "partially unsaturated" refers to a ring moiety that includes at least one double or triple bond. The term "partially unsaturated" is intended to encompass rings having multiple sites of unsaturation, but is not intended to include aryl or heteroaryl moieties, as herein defined.

One of ordinary skill in the art will appreciate that the synthetic methods, as described herein, utilize a variety of protecting groups. By the term "protecting group," as used herein, it is meant that a particular functional moiety, e.g., O, S, or N, is masked or blocked, permitting, if desired, a reaction to be carried out selectively at another reactive site in a multifunctional compound. In preferred embodiments, a protecting group reacts selectively in good yield to give a protected substrate that is stable to the projected reactions; the protecting group is preferably selectively removable by readily available, preferably non-toxic reagents that do not attack the other functional groups; the protecting group forms a separable derivative (more preferably without the generation of new stereogenic centers); and the protecting group will preferably have a minimum of additional functionality to avoid further sites of reaction. As detailed herein, oxygen, sulfur, nitrogen, and carbon protecting groups may be utilized. By way of non-limiting example, hydroxyl protecting groups include methyl, methoxymethyl (MOM), methylthiomethyl (MTM), t-butylthiomethyl, (phenyldimethylsilyl)methoxymethyl (SMOM), benzyloxymethyl (BOM), p-methoxybenzyloxymethyl (PMBM), (4-methoxyphenoxy)methyl (p-AOM), guaiacolmethyl (GUM), t-butoxymethyl, 4-pentenyloxymethyl (POM), siloxymethyl, 2-methoxyethoxymethyl (MEM), 2,2,2-trichloroethoxymethyl, bis(2-chloroethoxy)methyl, 2-(trimethylsilyl)ethoxymethyl (SEMOR), tetrahydropyranyl (THP), 3-bromotetrahydropyranyl, tetrahydrothiopyranyl, 1-methoxycyclohexyl, 4-methoxytetrahydropyranyl (MTHP), 4-methoxytetrahydrothiopyranyl, 4-methoxytetrahydrothiopyranyl S,S-dioxide, 1-[(2-chloro-4-methyl)phenyl]-4-methoxypiperidin-4-yl (CTMP), 1,4-dioxan-2-yl, tetrahydrofuranyl, tetrahydrothiofuranyl, 2,3,3a,4,5,6,7,7a-octahydro-7,8,8-trimethyl-4,7-methanobenzofuran-2-yl, 1-ethoxyethyl, 1-(2-chloroethoxy)ethyl, 1-methyl-1-methoxyethyl, 1-methyl-1-benzyloxyethyl, 1-methyl-1-benzyloxy-2-fluoroethyl, 2,2,2-trichloroethyl, 2-trimethylsilylethyl, 2-(phenylselenyl)ethyl, t-butyl, allyl, p-chlorophenyl, p-methoxyphenyl, 2,4-dinitrophenyl, benzyl, p-methoxybenzyl, 3,4-dimethoxybenzyl, o-nitrobenzyl, p-nitrobenzyl, p-halobenzyl, 2,6-dichlorobenzyl, p-cyanobenzyl, p-phenylbenzyl, 3-methyl-2-picolyl N-oxido, diphenylmethyl, p,p'-dinitrobenzhydryl, 5-dibenzosuberyl, triphenylmethyl, α-naphthyldiphenylmethyl, p-methoxyphenyldiphenylmethyl, di(p-methoxyphenyl)phenylmethyl, tri(p-methoxyphenyl)methyl, (4'-bromophenacyloxyphenyl)diphenylmethyl, 4,4',4"-tris(4,5-dichlorophthalimidophenyl)methyl, 4,4',4"-tris(levulinoyloxyphenyl)methyl, 4,4',4"-tris(benzoyloxyphenyl)methyl, 3-(imidazol-1-yl)bis(4',4"-dimethoxyphenyl)methyl, 1,1-bis(4-methoxyphenyl)-1'-pyrenylmethyl, 9-anthryl, 9-(9-phenyl)xanthenyl, 9-(9-phenyl-10-oxo)anthryl, 1,3-benzodithiolan-2-yl, benzisothiazolyl S,S-dioxido, trimethylsilyl (TMS), triethylsilyl (TES), triisopropylsilyl (TIPS), dimethylisopropylsilyl (IPDMS), diethylisopropylsilyl (DEIPS), dimethylthexylsilyl, t-butyldimethylsilyl, (TBDMS), t-butyldiphenylsilyl (TBDPS), tribenzylsilyl, triphenylsilyl, diphenylmethylsilyl (DPMS), t-butylmethoxyphenylsilyl (TBMPS), formate, benzoylformate, acetate, chloroacetate, dichloroacetate, trichloroacetate, trifluoroacetate, methoxyacetate, triphenylmethoxyacetate, phenoxyacetate, p-chlorophenoxyacetate, 3-phenylpropionate, 4-oxopentanoate (levulinate), 4,4-(ethylenedithio)pentanoate (levulinoyldithioacetal), pivaloate, adamantoate, crotonate, 4-methoxycrotonate, benzoate, p-phenylbenzoate, 2,4,6-trimethylbenzoate (mesitoate), alkyl methyl carbonate, 9-fluorenylmethyl carbonate (Fmoc), alkyl ethyl carbonate, alkyl 2,2,2-trichloroethyl carbonate (Troc), 2-(trimethylsilyl)ethyl carbonate (TMSEC), 2-(phenylsulfonyl)ethyl carbonate (Psec), 2-(triphenylphosphonio) ethyl carbonate (Peoc), isobutyl carbonate, alkyl vinyl carbonate alkyl allyl carbonate, alkyl p-nitrophenyl carbonate, alkyl benzyl carbonate, alkyl p-methoxybenzyl carbonate, alkyl 3,4-dimethoxybenzyl carbonate, alkyl o-nitrobenzyl carbonate, alkyl p-nitrobenzyl carbonate, alkyl S-benzyl thiocarbonate, 4-ethoxy-1-napththyl carbonate, methyl dithiocarbonate, 2-iodobenzoate, 4-azidobutyrate, 4-nitro-4-methylpentanoate, o-(dibromomethyl)benzoate, 2-formylbenzenesulfonate, 2-(methylthiomethoxy)ethyl, 4-(methylthiomethoxy)butyrate, 2-(methylthiomethoxymethyl)benzoate, 2,6-dichloro-4-methylphenoxyacetate, 2,6-dichloro-4-(1,1,3,3-tetramethylbutyl)phenoxyacetate, 2,4-bis(1,1-dimethylpropyl)phenoxyacetate, chlorodiphenylacetate, isobutyrate, monosuccinoate, (E)-2-methyl-2-butenoate, o-(methoxycarbonyl)benzoate, α-naphthoate, nitrate, alkyl N,N,N',N'-tetramethylphosphorodiamidate, alkyl N-phenylcarbamate, borate, dimethylphosphinothioyl, alkyl 2,4-dinitrophenylsulfenate, sulfate, methanesulfonate (mesylate), benzylsulfonate, and tosylate (Ts). For protecting 1,2- or 1,3-diols, the protecting groups include methylene acetal, ethylidene acetal, 1-t-butylethylidene ketal, 1-phenylethylidene ketal, (4-methoxyphenyl)ethylidene acetal, 2,2,2-trichloroethylidene acetal, acetonide, cyclopentylidene ketal, cyclohexylidene ketal, cycloheptylidene ketal, benzylidene acetal, p-methoxybenzylidene acetal, 2,4-dimethoxybenzylidene ketal, dimethoxybenzylidene acetal, 2-nitrobenzylidene acetal, methoxymethylene acetal, ethoxymethylene acetal, dimethoxymethylene ortho ester, 1-methoxyethylidene ortho ester, 1-ethoxyethylidine ortho ester, 1,2-dimethoxyethylidene ortho ester, α-methoxybenzylidene ortho ester, 1-(N,N-dimethylamino)ethylidene derivative, α-(N,N'-dimethylamino)benzylidene derivative, 2-oxacyclopentylidene ortho ester, di-t-butylsilylene group (DTBS), 1,3(1,1,3,3-tetraisopropyldisitoxanylidene) derivative (TIPDS), tetra-t-butoxydisiloxane-1,3-diylidene derivative (TBDS), cyclic carbonates, cyclic boronates, ethyl boronate, and phenyl boronate. Amino-protecting groups include methyl carbamate, ethyl carbamante, 9-fluorenylmethyl carbamate (Fmoc), 9-(2-sulfo)fluorenylmethyl carbamate, 9-(2,7-dibromo)fluoroenylmethyl carbamate, 2,7-di-t-butyl-[9-(10,10-dioxo-10,10,10,10-tetrahydrothioxanthyl)]methyl carbamate (DBD-Tmoc), 4-methoxyphenacyl carbamate (Phenoc), 2,2,2-trichloroethyl carbamate (Troc), 2-trimethylsilylethyl carbamate (Teoc), 2-phenylethyl carbamate (hZ), 1-(1-adamantyl)-1-methylethyl carbamate (Adpoc), 1,1-dimethyl-2-haloethyl carbamate, 1,1-dimethyl-2,2-dibromoethyl carbamate (DB-t-BOC), 1,1-dimethyl-2,2,2-trichloroethyl carbamate (TCBOC), 1-methyl-1-(4-biphenylyl)ethyl carbamate (Bpoc), 1-(3,5-di-t-butylphenyl)-1-methylethyl carbamate (t-Bumeoc), 2-(2'- and 4'-pyridyl)ethyl carbamate (Pyoc), 2-(N,N-dicyclohexylcarboxamido)ethyl carbamate, t-butyl carbamate (BOC), 1-adamantyl carbamate (Adoc), vinyl carbamate (Voc), carbamate (Alloc), 1-isopropylallyl carbamate (Ipaoc), carbamate (Coc), 4-nitrocinnamyl carbamate (Noc), 8-quinolyl carbamate, N-hydroxypiperidinyl carbamate, alkyldithio carbamate, benzyl carbamate (Cbz),p-methoxybenzyl carbamate (Moz), p-nitobenzyl carbamate, p-bromobenzyl carbamate, p-chlorobenzyl carbamate, 2,4-dichlorobenzyl carbamate, 4-methylsulfinylbenzyl carbamate (Msz), 9-anthrylmethyl carbamate, diphenylmethyl carbamate, 2-methylthioethyl carbamate, 2-methylsulfonylethyl carbamate, 2-(p-toluenesulfonyl)ethyl carbamate, [2-(1,3-dithianyl)]methyl carbamate (Dmoc), 4-methylthiophenyl carbamate (Mtpc), 2,4-dimethylthiophenyl carbamate (Bmpc), 2-phosphonioethyl carbamate (Peoc), 2-triphenylphosphonioisopropyl carbamate (Ppoc), 1,1-dimethyl-2-cyanoethyl carbamate, m-chloro-p-acyloxybenzyl carbamate, p-(dihydroxyboryl)benzyl carbamate, 5-benzisoxazolylmethyl carbamate, 2-(trifluoromethyl)-6-chromonylmethyl carbamate (Tcroc), m-nitrophenylcarbamate, 3,5-dimethoxybenzyl carbamate, o-nitrobenzyl carbamate, 3,4-dimethoxy-6-nitrobenzyl carbamate, phenyl(o-nitrophenyl)methyl carbamate, phenothiazinyl-(10)-carbonyl derivative, N'-p-toluenesulfonylaminocarbonyl derivative, N'-phenylaminothiocarbonyl derivative, t-amyl carbamate, S-benzyl thiocarbamate, p-cyanobenzyl carbamate, cyclobutyl carbamate, cyclohexyl carbamate, cyclopentyl carbamate, cyclopropylmethyl carbamate, p-decyloxybenzyl carbamate, 2,2-dimethoxycarbonylvinyl carbamate, o-(N,N-dimethylcarboxamido)benzyl carbamate, 1,1-dimethyl-3-(N,N-dimethylcarboxamido) propyl carbamate, 1,1-dimethylpropynyl carbamate, di(2-pyridyl)methyl carbamate, 2-furanylmethyl carbamate, 2-iodoethyl carbamate, isoborynl carbamate, isobutyl carbamate, isonicotinyl carbamate, p-(p'-methoxyphenylazo) benzyl carbamate, 1-methylcyclobutyl carbamate, 1-methylcyclohexyl carbamate, 1-methyl-1-cyclopropylmethyl carbamate, 1-methyl-1-(3,5-dimethoxyphenyl)ethyl carbamate, 1-methyl-1-(p-phenylazophenyl)ethyl carbamate, 1-methyl-1-phenylethyl carbamate, 1-methyl-1-(4-pyridyl) ethyl carbamate, phenyl carbamate, p-(phenylazo)benzyl carbamate, 2,4,6-tri-t-butylphenyl carbamate, 4-(trimethylammonium)benzyl carbamate, 2,4,6-trimethylbenzyl carbamate, formamide, acetamide, chloroacetamide, trichloroacetamide, trifluoroacetamide, phenylacetamide, 3-phenylpropanamide, picolinamide, 3-pyridylcarboxamide, N-benzoylphenylalanyl derivative, benzamide, p-phenylbenzamide, o-nitophenylacetamide, o-nitrophenoxyacetamide, acetoacetamide, (N'-dithiobenzyloxycarbonylamino) acetamide, 3-(p-hydroxyphenyl)propanamide, 3-(o-nitrophenyl)propanamide, 2-methyl-2-(o-nitropherioxy) propanamide, 2-methyl-2-(o-phenylazophenoxy) propanamide, 4-chlorobutanamide, 3-methyl-3-nitrobutanamide, o-nitrocinnamide, N-acetylmethionine derivative, o-nitrobenzamide, o-(benzoyloxymethyl)benzamide, 4,5-diphenyl-3-oxazotin-2-one, N-phthalimide, N-dithiasuccinimide (Dts), N-2,3-diphenylmaleimide N-2, 5-dimethylpyrrole, N-1,1,4,4-tetramethyldisilylazacyclopentane adduct (STABASE), 5-substituted 1,3-dimethyl-1, 3,5-triazacyclohexan-2-one, 5-substituted 1,3-dibenzyl-1,3, 5-triazacyclohexan-2-one, 1-substituted 3,5-dinitro-4-pyridone, N-methylamine, N-[2-(trimethylsilyl)ethoxy] methylamine (SEM), N-3-acetoxypropylamine, N-(1-isopropyl-4-nitro-2-oxo-3-pyroolin-3-yl)amine, quaternary ammonium salts, N-benzylamine, N-di(4-methoxyphenyl) methylamine, N-5-dibenzosuberylamine, N-triphenylmethylamine (Tr), N-[(4-methoxyphenyl)diphenylmethyl]amine (MMTr), N-9-phenylfluorenylamine (PhF), N-2,7-dichloro-9-fluorenylmethyleneamine, N-ferrocenylmethylamino (Fcm), N-2-picolylamino N'-oxide, N-1,1-dimethylthiomethyleneamine, N-benzylideneamine, N-p-methoxybenzylidenamine, N-diphenylmethyleneamine, N-[(2-pyridyl) mesityl]methyleneamine, N—(N',N'-dimethylaminomethylene)amine, N,N'-isopropylidenediamine, N-p-nitrobenzylideneamine, N-salicylideneamine, N-5-chlorosalicylideneamine, N-(5-chloro-2-hydroxyphenyl)phenylmethyleneamine, N-cyclohexylideneamine, N-(5,5-dimethyl-3-oxo-1-cyclohexenyl) amine, N-borane derivative, N-diphenylborinic acid derivative, N-[phenyl(pentacarbonylchromium- or tungsten) carbonyl]amine, N-copper chelate, N-zinc chelate, N-nitroamine, N-nitrosoamine, amine N-oxide, diphenylphosphinamide (Dpp), dimethylthiophosphinamide (Mpt), diphenylthiophosphinamide (Ppt), dialkyl phosphoramidates, dibenzyl phosphoramidate, diphenyl phosphoratai-date, benzenesulfenamide, o-nitrobenzenesulfenamide (Nps), 2,4-dinitrobenzenesulfenamide, pentachlorobenzenesulfenamide, 2-nitro-4-methoxybenzenesulfenamide, triphenylmethylsulfenamide, 3-nitropyridinesulfenamide (Npys), p-toluenesulfonamide (Ts), benzenesulfonamide, 2,3,6,-trimethyl-4-methoxybenzenesulfonamide (Mtr), 2,4,6-trimethoxybenzenesulfonamide (Mtb), 2,6-dimethyl-4-methoxybenzenesulfonamide (Pme), 2,3,5,6-tetramethyl-4-methoxybenzenesulfonamide (Mte), 4-methoxybenzenesulfonamide (Mbs), 2,4,6-trimethylbenzenesulfonamide (Mts), 2,6-dimethoxy-4-methylbenzenesulfonamide (iMds), 2,2,5,7,8-pentamethylchroman-6-sulfonamide (Pmc), methanesulfonamide (Ms), β-trimethylsilylethanesulfonamide (SES), 9-anthracenesulfonamide, 4-(4',8'-dimethoxynaphthylmethyl)benzenesulfonamide (DNMBS), benzylsulfonamide, trifluoromethylsulfonamide, and phenacylsulfonamide. Exemplary protecting groups are detailed herein, however, it will be appreciated that the present invention is not intended to be limited to these protecting groups; rather, a variety of additional equivalent protecting groups can be readily identified using the above criteria and utilized in the method of the present invention. Additionally, a variety of protecting groups are described in *Protecting Groups in Organic Synthesis*, T. W. Greene and P. G. M. Wuts, $3^{rd}$ edition, John Wiley & Sons, 1999, the entirety of which is incorporated herein by reference.

When substituents are described herein, the term "radical" or "optionally substituted radical" is sometimes used. In this context, "radical" means a moiety or functional group having an available position for attachment to the structure on which the substituent is bound. In general the point of attachment would bear a hydrogen atom if the substituent were an independent neutral molecule rather than a substituent. The terms "radical" or "optionally-substituted radical" in this context are thus interchangeable with "group" or "optionally-substituted group".

As described herein, compounds of the invention may contain "optionally substituted" moieties. In general, the term "substituted", whether preceded by the term "optionally" or not, means that one or more hydrogens of the designated moiety are replaced with a suitable substituent. Unless otherwise indicated, an "optionally substituted" group" or "optionally substituted radical" may have a suitable substituent at each substitutable position of the group, and when more than one position in any given structure may be substituted with more than one substituent selected from a specified group, the substituent may be either the same or different at every position. Combinations of substituents envisioned by this invention are preferably those that result in the formation of stable or chemically feasible compounds. The term "stable", as used herein, refers to compounds that are not substantially altered when subjected to conditions to allow for their production, detection, and, in certain embodiments, their recovery, purification, and use for one or more of the purposes disclosed herein.

In some chemical structures herein, substituents are shown attached to a bond that crosses a bond in a ring of the depicted molecule. This convention indicates that one or more of the substituents may be attached to the ring at any available position (usually in place of a hydrogen atom of the parent structure). In cases where an atom of a ring so substituted has two substitutable positions, two groups may be present on the same ring atom. Unless otherwise indicated, when more than one substituent is present, each is defined independently of the others, and each may, have a different structure. In cases where the substituent shown crossing a bond of the ring is —R, this has the same meaning as if the ring were said to be "optionally substituted" as described in the preceding paragraph.

Suitable monovalent substituents on a substitutable carbon atom of an "optionally; substituted" group are independently halogen; —$(CH_2)_{0-4}R°$; —$(CH_2)_{0-4}OR°$; —O—$(CH_2)_{0-4}C(O)OR°$; —$(CH_2)_{0-4}CH(OR°)_2$; —$(CH_2)_{0-4}SR°$; —$(CH_2)_{0-4}Ph$, which may be substituted with $R°$; —$(CH_2)_{0-4}O(CH_2)_{0-1}Ph$ which may be substituted with $R°$;

—CH=CHPh, which may be substituted with R°; —NO$_2$; —CN; —N$_3$; —(CH$_2$)$_{0-4}$N(R°); —(CH$_2$)$_{0-4}$N(R°)C(O)R°; —N(R°)C(S)R°; —(CH$_2$)$_{0-4}$N(R°)C(O)NR°$_2$; —N(R°)C(S)NR°$_2$; —(CH$_2$)$_{0-4}$N(R°)C(O)OR°; —N(R°)N(R°C(O)R°; —N(R°)N(R°)C(O)NR°$_2$; —N(R°)N(R°)C(O)OR°; —(CH$_2$)$_{0-4}$C(O)R°; —C(S)R°; —(CH$_2$)$_{0-4}$C(O)OR°; —(CH$_2$)$_{0-4}$C(O)N(R°)$_2$; —(CH$_2$)$_{0-4}$C(O)SR°; —(CH$_2$)$_{0-4}$C(O)OSiR°$_3$; —(CH$_2$)$_{0-4}$OC(O)R°; —OC(O)(CH$_2$)$_{0-4}$SR—, SC(S)SR°; —(CH$_2$)$_{0-4}$SC(O)R°; —(CH$_2$)$_{0-4}$C(O)NR°$_2$; —C(S)NR°$_2$; —C(S)SR°; —SC(S)SR°, —(CH$_2$)$_{0-4}$OC(O)NR°$_2$; —C(O)N(OR°)R°; —C(O)C(O)R°; —C(O)CH$_2$C(O)R°; —CN(OR°)R°; —(CH$_2$)$_{0-4}$SSR°; —(CH$_2$)$_{0-4}$S(O)$_2$R°; —(CH$_2$)$_{0-4}$S(O)$_2$OR°; —(CH$_2$)$_{0-4}$OS(O)$_2$R°; —S(O)$_2$NR°$_2$, —(CH$_2$)$_{0-4}$S(O)R°; —N(R°)S(O)$_2$NR°$_2$; —N(R°)S(O)$_2$R°; —N(OR°)R°; —C(NH)NR°$_2$; —P(O)$_2$R°; —P(O)R°$_2$; —OP(O)R°$_2$; —OP(O)(OR°$_2$; SiR°$_3$; —(C$_{1-4}$ straight or branched)alkylene)O—N(R°)$_2$; or —(C$_{1-4}$ straight or branched alkylene)C(O)O—N(R°)$_2$, wherein each R° may be substituted as defined below and is independently hydrogen, C$_{1-8}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur, or, notwithstanding the definition above, two independent occurrences of R°, taken together with their intervening atom(s), form a 3-12-membered saturated, partially unsaturated, or aryl mono- or polycyclic ring having 0-4 heteroatoms independently selected from nitrogen, oxygen, or sulfur, which may be substituted as defined below.

Suitable monovalent substituents on R° (or the ring formed by taking two independent occurrences of R° together with their intervening atoms), are independently halogen, —(CH$_2$)$_{0-2}$R$^\bullet$, -(haloR$^\bullet$), —(CH$_2$)$_{0-2}$OH, —(CH$_2$)$_{0-2}$OR$^\bullet$, —(CH$_2$)$_{0-2}$CH(OR$^\bullet$)$_2$; —O(haloR$^\bullet$), —CN, —N$_3$, —(CH$_2$)$_{0-2}$C(O)R$^\bullet$, —(CH$_2$)$_{0-2}$C(O)OH, —(CH$_2$)$_{0-2}$C(O)OR$^\bullet$, —(CH$_2$)$_{0-4}$C(O)N(R°)$_2$; —(CH)$_{0-2}$SR$^\bullet$, —(CH$_2$)$_{0-2}$SH, —(CH$_2$)$_{0-2}$NH$_2$, —(CH$_2$)$_{0-2}$NHR$^\bullet$, —(CH$_2$)$_{0-2}$NR$^\bullet{}_2$, —NO$_2$, —SiR$^\bullet{}_3$, —OSiR$^\bullet{}_3$, —C(O)SR$^\bullet$, —(C$_{1-4}$ straight or branched alkylene)C(O)OR$^\bullet$, or —SSR$^\bullet$ wherein each R$^\bullet$ is unsubstituted or where preceded by "halo" is substituted only with one or more halogens, and is independently selected from C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur. Suitable divalent substituents on a saturated carbon atom of R° include =O and =S.

Suitable divalent substituents on a saturated carbon atom of an "optionally substituted" group include the following: =O, =S, =NNR*$_2$, =NNHC(O)R*, =NNHC(O)OR*, =NNHS(O)$_2$R*, =NR*, =NOR*, —O(C(R*$_2$))$_{2-3}$O—, or —S(C(R*$_2$))$_{2-3}$S—, wherein each independent occurrence of R* is selected from hydrogen, C$_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur. Suitable divalent substituents that are bound to vicinal substitutable carbons of an "optionally substituted" group include: —O(CR*$_2$)$_{2-3}$O—, wherein each independent occurrence of R* is selected from hydrogen, C$_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur.

Suitable substituents on the aliphatic group of R* include halogen, —R$^\bullet$, -(haloR$^\bullet$), —OH, —OR$^\bullet$, —O(haloR$^\bullet$), —CN, —C(O)OH, —C(O)OR$^\bullet$, —NH$_2$, —NHR$^\bullet$, —NR$^\bullet{}_2$, or —NO$_2$, wherein each R$^\bullet$ is unsubstituted or where preceded by "halo" is substituted only with one or more halogens, and is independently C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur.

Suitable substituents on a substitutable nitrogen of an "optionally substituted" group include —R$^\dagger$, —NR$^\dagger{}_2$, —C(O)R$^\dagger$, —C(O)OR$^\dagger$, —C(O)C(O)R$^\dagger$, —C(O)CH$_2$C(O)R$^\dagger$, —S(O)$_2$R$^\dagger$, —S(O)$_2$NR$^\dagger{}_2$, —C(S)NR$^\dagger{}_2$, —C(NH)NR$^\dagger{}_2$ or —N(R$^\dagger$)S(O)$_2$R$^\dagger$; wherein each R$^\dagger$ is independently hydrogen, C$_{1-6}$ aliphatic which may be substituted as defined below, unsubstituted —OPh, or unsubstituted 5-6-membered saturated, partially unsaturated, or aryl ring having 0-4 heteroatoms independently selected from nitrogen, oxygen, or sulfur, or, notwithstanding the definition above, two independent occurrences of R$^\dagger$, taken together with their intervening atom(s) form an unsubstituted 3-12-membered saturated, partially unsaturated, or aryl mono- or bicyclic ring having 0-4 heteroatoms independently selected from nitrogen, oxygen, or sulfur. A substitutable nitrogen may be substituted with three R$^\dagger$ substituents to provide a charged ammonium moiety —N$^+$(R$^\dagger$)$_3$, wherein the ammonium moiety is further complexed with a suitable counterion.

Suitable substituents on the aliphatic group of R$^\dagger$ are independently halogen, —R$^\bullet$, -(haloR$^\bullet$), —OH, —OR$^\bullet$, —O(haloR$^\bullet$), —CN, —C(O)OH, —C(O)OR$^\bullet$, —NH$_2$, —NHR$^\bullet$, —NR$^\bullet{}_2$, or —NO$_2$, wherein each R$^\bullet$ is unsubstituted or where preceded by "halo" is substituted only with one or more halogens, and is independently C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur.

As used herein, the term "catalyst" refers to a substance the presence of which increases the rate and/or extent of a chemical reaction, while not being consumed or undergoing a permanent chemical change itself.

As used herein, the term "multidentate" refers to ligands having multiple sites capable of coordinating to a single metal center.

As used herein, the term "activating moiety" refers to a moiety comprising one or more activating functional groups. In certain embodiments, an activating moiety improves the catalytic activity of a metal complex. In some embodiments, such improved catalytic activity is characterized by higher conversion of starting materials compared to a metal complex lacking an activating moiety. In some embodiments, such improved catalytic activity is characterized by higher rate of conversion of starting materials compared to a metal complex lacking an activating moiety. In some embodiments, such improved catalytic activity is characterized by higher yield of product compared to a metal complex lacking an activating moiety.

The term "epoxide hydrolysis catalyst" as used herein, means (unless specified otherwise) any material capable of promoting the addition of water to an epoxide, thereby forming a glycol.

The term "epoxide CO$_2$ copolymerization catalyst" as used herein means, (unless otherwise specified) any material capable of promoting the copolymerization of epoxides and carbon dioxide to form an alternating copolymer.

DETAILED DESCRIPTION OF CERTAIN EMBODIMENTS

The present invention provides, among other things, methods of reducing an induction time prior to onset of the copolymerization of epoxides and carbon dioxide. In certain embodiments such methods comprise reducing the water content of an epoxide-$CO_2$ copolymerization reaction mixture by reacting the water with the epoxide in the presence of an epoxide hydrolysis catalyst.

Induction times prior to onset of polymerization have been observed in the copolymerization of epoxides and carbon dioxide, see for example: *J. Am. Chem. Soc.* 2003, 125, 7586-7591, *Inorg. Chem.* 2009, 48, 2830-2836, and *Inorg. Chem.* 2009, 48, 10455-10465. Without being bound by theory or limiting the scope of the present invention, it is believed that water in the reaction system causes or extends the length of the induction time. It is also believed that the amount of water in the system needs to come down to a certain level for certain polymerization catalysts to be active towards the copolymerization of epoxides and carbon dioxide. In certain embodiments, the present invention provides methods to reduce an induction time in the copolymerization of epoxides and carbon dioxide by contacting epoxides with an epoxide hydrolysis catalyst prior to onset of the copolymerization. In other embodiments, the present invention provides methods to reduce an induction time in the copolymerization of epoxides and carbon dioxide by contacting epoxides with a mixture of an epoxide-$CO_2$ copolymerization catalyst and an epoxide hydrolysis catalyst. In certain embodiments, an epoxide hydrolysis catalyst catalyzes hydrolysis of epoxides and thereby facilitates the consumption of water in the polymerization system.

In certain embodiments, the epoxide $CO_2$ copolymerization catalyst is an organometallic complex with a tethered functional moiety (such as an onium salt or strongly basic nitrogen-containing functional group) which catalyzes copolymerization of epoxides and carbon dioxide. Without being bound by theory or thereby limiting the scope of the present invention, it is believed that such tethered complexes, while having increased catalytic activity for epoxide-$CO_2$ copolymerization are not facile catalysts for the hydrolysis of epoxides by water. It is further believed that water may bind unproductively to the tethered catalysts and prevent them from catalyzing the desired epoxide $CO_2$ copolymerization. Epoxide $CO_2$ copolymerization catalysts which lack such tethered groups generally have lower catalytic rates in epoxide $CO_2$ copolymerization but do not normally manifest significant induction periods—possibly because they are able to catalyze the hydrolysis of epoxides and therefore quickly consume any water present in the reaction mixture. We have discovered that providing an additional catalyst that is a good catalyst for epoxide hydrolysis is advantageous when using tethered catalysts, (or any other class of epoxide-$CO_2$ copolymerization catalysts) that demonstrate a significant water-dependent induction period.

Before further describing the methods of the present invention, each of the two catalysts used (i.e. the epoxide hydrolysis catalyst and the epoxide $CO_2$ copolymerization catalyst) will be described in more detail.

I. Epoxide Hydrolysis Catalysts

In certain embodiments, the present invention provides methods of preparing poly(alkylene carbonate) polymers comprising the step of contacting one or more epoxides with a first catalyst active for epoxide hydrolysis and a second catalyst active for the copolymerization of epoxides and $CO_2$. In certain embodiments, the epoxide hydrolysis catalyst is further characterized in that it does not substantially inhibit copolymerization of the epoxide and carbon dioxide. In certain embodiments, the epoxide hydrolysis catalyst is further characterized in that it does not substantially homopolymerize epoxides. In certain embodiments, the epoxide hydrolysis catalyst is further characterized in that it does not substantially catalyze the addition of epoxides to carbon dioxide to form cyclic carbonates.

In certain embodiments, the present invention provides methods of reducing the induction time in a copolymerization of epoxides and carbon dioxide by contacting a copolymerization mixture comprising one or more epoxides with an epoxide hydrolyisis catalyst. In certain embodiments, a provided epoxide hydrolysis catalyst facilitates the consumption of water by hydrolyzing epoxides but does not substantially inhibit copolymerization of epoxides and carbon dioxide or catalyze homopolymerization of epoxides.

In certain embodiments, the epoxide hydrolysis catalyst comprises a chemical compound which catalyzes hydrolysis of epoxides. In certain embodiments, such catalysts are further characterized in that they do not inhibit copolymerization of epoxides and carbon dioxide or catalyze the homopolymerization of epoxides.

In certain embodiments, the epoxide hydrolysis catalyst is an acid which catalyzes hydrolysis of epoxides as known in the art, but which does not inhibit copolymerization of epoxides and carbon dioxide or homopolymerize epoxides.

In certain embodiments, the epoxide hydrolysis catalyst is a base that catalyzes hydrolysis of epoxides as known in the art, but which does not inhibit copolymerization of epoxides and carbon dioxide or catalyze the homopolymerization of epoxides.

In certain embodiments, the epoxide hydrolysis catalyst comprises a transition metal complex. A very large number of transition metal complexes are known in the art and a number of these have been identified in the literature to be competent catalysts for the hydrolysis of epoxides. As such, complexes with the required catalytic activity for epoxide hydrolysis are known and available and to the skilled artisan. White this specification describes certain metal complexes and families of catalysts that can be employed as epoxide hydrolysis catalysts in the inventive methods, the invention is not limited to these particular catalysts since it is within the capacity of the skilled artisan, using the teachings and disclosure herein to identify suitable catalysts through routine experimentation. A skilled artisan can readily evaluate large numbers of metal complexes (which may be commercially available or made using well known procedures) for the requisite activity. For example, by exposing mixtures containing water and an epoxide such as propylene oxide to a catalytic amount of various metal complexes (preferably using automated parallel high-throughput reaction equipment) the artisan could routinely screen many potential catalysts. The mixtures would then be subjected to routine analysis to detect reduction in water content (i.e. by Karl Fischer analysis) and/or for the formation of propylene glycol (e.g. by GC or NMR analysis) to ascertain which complexes are competent hydrolysis catalysts. Further routine analysis to evaluate whether polyethers, or other undesirable by-products are present would further guide the choice of suitably selective epoxide hydrolysis catalysts having the features described herein. In certain embodiments, methods of the present invention include a step of evaluating possible hydrolysis catalysts for their activity and selectivity prior to employing them in the epoxide $CO_2$ copolymerization methods described below. Similarly, it is recognized by the inventors that new and possibly improved catalysts for epoxide hydrolysis will likely be discovered in the future. It is anticipated that such catalysts will also be suitable for the methods of the present invention and that such catalysts will be employed in the presently described methods without departing from the scope or spirit of the invention.

Where the epoxide hydrolysis catalyst comprises a metal complex, the complex typically comprises one or more metal atoms coordinated to one or more ligands. In certain embodiments, the complex comprises one or more multidentate ligands.

In certain embodiments, such metal complexes have a structure:

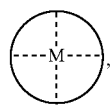

wherein:

M is a metal atom;

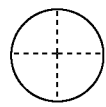

comprises a multidentate ligand.

In certain embodiments, where the epoxide hydrolysis catalyst comprises a metal complex, the complex has a structure:

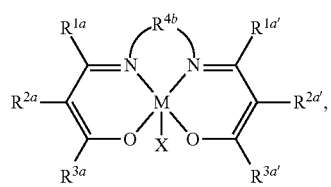

where M is a metal atom;

$R^{1a}$ and $R^{1a'}$ are independently hydrogen, or an optionally substituted radical selected from the group consisting of $C_{1-20}$ aliphatic, $C_{1-20}$ heteroaliphatic, phenyl, a 3- to 8-membered saturated or partially unsaturated monocyclic carbocycle, a 7-14 carbon saturated, partially unsaturated or aromatic polycyclic carbocycle, a 5- to 6-membered monocyclic heteroaryl ring having 1-4 heteroatoms independently selected from nitrogen, oxygen, or sulfur, a 3- to 8-membered saturated or partially unsaturated heterocyclic ring having 1-3 heteroatoms independently selected from nitrogen, oxygen, or sulfur, a 6- to 12-membered polycyclic saturated or partially unsaturated heterocycle having 1-5 heteroatoms independently selected from nitrogen, oxygen, or sulfur, and an 8- to 10-membered bicyclic heteroaryl ring having 1-5 heteroatoms independently selected from nitrogen, oxygen, or sulfur;

$R^{2a}$, $R^{2a'}$, $R^{3a}$, and $R^{3a'}$ are independently, hydrogen, —OR, —NR$_2$, —SR, —CN, —NO$_2$, —SO$_2$R, —SOR, —SO$_2$NR$_2$, —CNO, —NRSO$_2$R, —NCO, —N$_3$, —SiR$_3$, or an optionally substituted radical selected from the group consisting of $C_{1-20}$ aliphatic, $C_{1-20}$ heteroaliphatic, phenyl, a 3- to 8-membered saturated or partially unsaturated monocyclic carbocycle, a 7-14 carbon saturated, partially unsaturated or aromatic polycyclic carbocycle, a 5- to 6-membered monocyclic heteroaryl ring having 1-4 heteroatoms independently selected from nitrogen, oxygen, or sulfur, a 3- to 8-membered saturated or partially unsaturated heterocyclic ring having 1-3 heteroatoms independently selected from nitrogen, oxygen, or sulfur, a 6- to 12-membered polycyclic saturated or partially unsaturated heterocycle having 1-5 heteroatoms independently selected from nitrogen, oxygen, or sulfur, and an 8- to 10-membered bicyclic heteroaryl ring having 1-5 heteroatoms independently selected from nitrogen, oxygen, or sulfur;

or any one or more of [$R^{2a'}$ and $R^{3a'}$], [$R^{2a}$ and $R^{3a}$], [$R^{1a}$ and $R^{2a}$], and [$R^{1a'}$ and $R^{2a'}$] may optionally be taken together with their intervening atoms to form one or more rings which may in turn be substituted with one or more $R^d$ groups;

$R^{4b}$ is selected from the group consisting of:

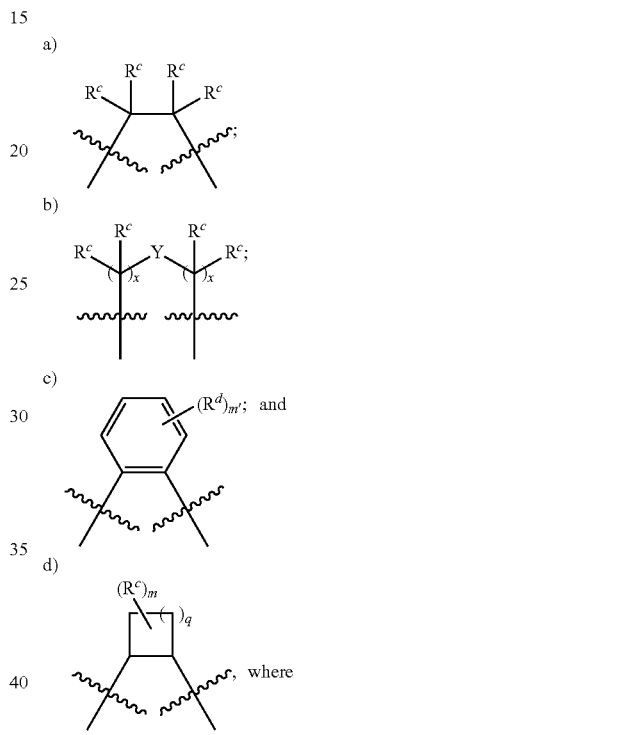

$R^c$ at each occurrence is independently hydrogen, halogen, —OR, —NR$_2$, —SR, —CN, —SO$_2$R, —SOR, —SO$_2$NR$_2$, —CNO, —NRSO$_2$R, —NCO, —N$_3$, —SiR$_3$, —C(O)NR$_2$, —OC(O)NR$_2$, —NR(CO)OR, —NRC(O)R, —CO$_2$R, —OC(O)R, —OC(O)OR, or an optionally substituted radical selected from the group consisting of $C_{1-20}$ aliphatic, $C_{1-20}$ heteroaliphatic, phenyl, a 3- to 8-membered saturated or partially unsaturated monocyclic carbocycle, a 7-14 carbon saturated, partially unsaturated or aromatic polycyclic carbocycle, a 5- to 6-membered monocyclic heteroaryl ring having 1-4 heteroatoms independently selected from nitrogen, oxygen, or sulfur, a 3- to 8-membered saturated or partially unsaturated heterocyclic ring having 1-3 heteroatoms independently selected from nitrogen, oxygen, or sulfur, a 6- to 12-membered polycyclic saturated or partially unsaturated heterocycle having 1-5 heteroatoms independently selected from nitrogen, oxygen, or sulfur, or an 8- to 10-membered bicyclic heteroaryl ring having 1-5 heteroatoms independently selected from nitrogen, oxygen, or sulfur; or any two adjacent $R^c$ groups may be taken together with the carbon atoms to which they are attached and any intervening atoms to form one or more optionally substituted rings; or any two $R^c$ groups attached to the same carbon atom may optionally be taken together along with the carbon atom to which they are attached to form an optionally substituted moiety selected from the group consisting of: a 3- to 8-membered spirocyclic ring, a carbonyl, an oxime, a hydrazone, and an imine;

$R^d$ at each occurrence is independently hydrogen, halogen, —OR, —$NR_2$, —SR, —CN, —$NO_2$, —$SO_2R$, —SOR, —$SO_2NR_2$, —CNO, —$NRSO_2R$, —NCO, —$N_3$, —$SiR_3$, —C(O)$NR_2$, —OC(O)$NR_2$, —NR(CO)OR, —NRC(O)R, —$CO_2R$, —OC(O)R, —OC(O)OR, or an optionally substituted radical selected from the group consisting of $C_{1-20}$ aliphatic, $C_{1-20}$ heteroaliphatic, phenyl, a 3- to 8-membered saturated or partially unsaturated monocyclic carbocycle, a 7-14 carbon saturated, partially unsaturated or aromatic polycyclic carbocycle, a 5- to 6-membered monocyclic heteroaryl ring having 1-4 heteroatoms independently selected from nitrogen, oxygen, or sulfur, a 3- to 8-membered saturated or partially unsaturated heterocyclic ring having 1-3 heteroatoms independently selected from nitrogen, oxygen, or sulfur, a 6- to 12-membered polycyclic saturated or partially unsaturated heterocycle having 1-5 heteroatoms independently selected from nitrogen, oxygen, or sulfur, or an 8- to 10-membered bicyclic heteroaryl ring having 1-5 heteroatoms independently selected from nitrogen, oxygen, or sulfur; or any two adjacent $R^d$ groups may be taken together with their intervening atoms to form one or more optionally substituted rings optionally containing one or more heteroatoms independently selected from nitrogen, oxygen, or sulfur;

R at each occurrence is independently hydrogen, an optionally substituted radical selected the group consisting of acyl, $C_{1-6}$ aliphatic, $C_{1-6}$ heteroaliphatic, carbamoyl, arylalkyl, phenyl, a 3- to 8-membered saturated or partially unsaturated monocyclic carbocycle, a 7-14 carbon saturated, partially unsaturated or aromatic polycyclic carbocycle, a 5- to 6-membered monocyclic heteroaryl ring having 1-4 heteroatoms independently selected from nitrogen, oxygen, or sulfur, a 3- to 8-membered saturated or partially unsaturated heterocyclic ring having 1-3 heteroatoms independently selected from nitrogen, oxygen, or sulfur, a 6- to 12-membered polycyclic saturated or partially unsaturated heterocycle having 1-5 heteroatoms independently selected from nitrogen, oxygen, or sulfur, an 8- to 10-membered bicyclic heteroaryl ring having 1-5 heteroatoms independently selected from nitrogen, oxygen, or sulfur, an oxygen protecting group, and a nitrogen protecting group; or two R groups on the same nitrogen atom can optionally be taken together to form an optionally substituted 3- to 7-membered ring, X is an anion;

Y is a divalent linker selected from the group consisting of: —C($R^c$)$_2$—, —NR—, —N(R)C(O)—, —C(O)NR—, —O—, —C(O)—, —OC(O)—, —C(O)O—, —S—, —SO—, —$SO_2$—, —$SiR_2$—, —C(=S)—, —C(=NR)—, or —N=N—; —CR=CR—, a polyether; a $C_3$ to $C_8$ substituted or unsubstituted carbocycle; and a $C_1$ to $C_8$ substituted or unsubstituted heterocycle;

m is 0 or an integer from 1 to 6, inclusive;

m' is 0 or an integer from 1 to 4, inclusive;

q is 0 or an integer from 1 to 4, inclusive; and x is 1, or 2.

In certain embodiments, where the epoxide hydrolysis catalyst comprises a metal complex, the complex comprises a metal salen complex. In certain embodiments, the epoxide hydrolysis catalyst comprises a metal salen complex of formula:

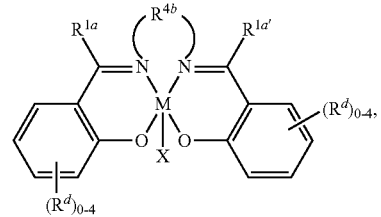

where, each of M, X, $R^{4b}$, $R^d$, $R^{1a}$, and $R^{1a'}$ is as defined above and in the classes and subclasses herein:

In certain embodiments, provided epoxide hydrolysis catalysts comprise metal salen complexes. In certain embodiments, a provided epoxide hydrolysis catalyst is selected from the group consisting of:

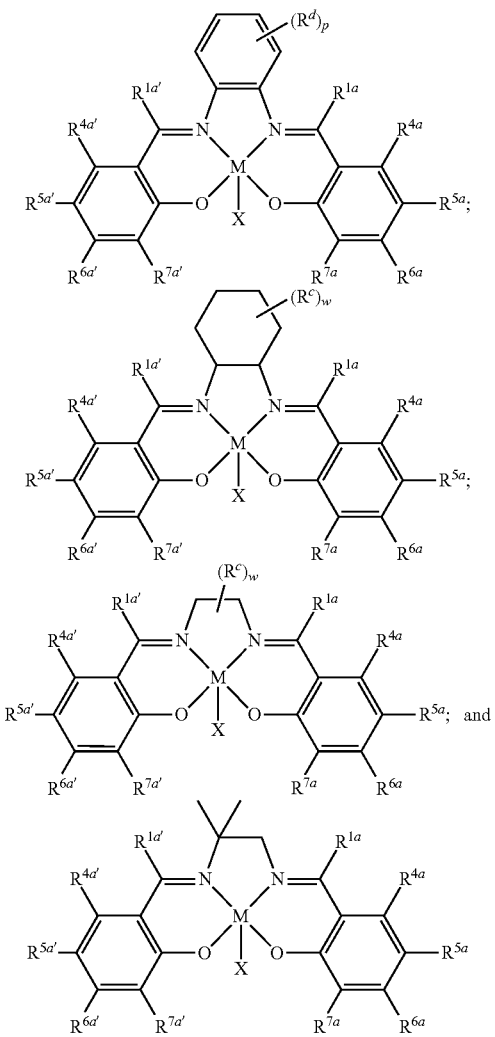

where, each of M, X, $R^c$, $R^d$, $R^{1a}$, $R^{1a'}$, w, and p is as defined above and in the classes and subclasses herein:

$R^{4a}$, $R^{4a'}$, $R^{5a}$, $R^{5a'}$, $R^{6a}$, $R^{6a'}$, $R^{7a}$ and $R^{7a'}$ are each independently hydrogen, halogen, —OR, —$NR_2$, —SR, —CN, —$NO_2$, —$SO_2R$, —SOR, —$SO_2NR_2$, —CNO, —$NRSO_2R$, —NCO, —$N_3$, —$SiR_3$, —C(O)$NR_2$, —OC(O)$NR_2$, —NR(CO)OR, —NRC(O)R, —$CO_2R$, —OC(O)R, —OC(O)OR, or an optionally substituted radical selected from the group consisting of $C_{1-20}$ aliphatic, $C_{1-20}$ heteroaliphatic, phenyl, a 3- to 8-membered saturated or partially unsaturated monocyclic carbocycle, a 7-14 carbon saturated, partially unsaturated or aromatic polycyclic carbocycle, a 5- to 6-membered monocyclic heteroaryl ring having 1-4 heteroatoms independently selected from nitrogen, oxygen, or sulfur, a 3- to 8-membered saturated or partially unsaturated heterocyclic ring having 1-3 heteroatoms independently selected from nitrogen, oxygen, or sulfur, a 6- to 12-membered polycyclic saturated or partially unsaturated heterocycle having 1-5 heteroatoms independently selected from nitrogen, oxygen, or sulfur, and an 8- to 10-membered bicyclic heteroaryl ring having 1-5 heteroatoms independently selected from nitrogen, oxygen, or sulfur; or any one or more of [$R^{1a}$ and $R^{4a}$], [$R^{1a'}$ and $R^{4a'}$], [$R^{4a}$ and $R^{5a}$], [$R^{5a}$ and $R^{6a}$], [$R^{6a}$ and $R^{7a}$], [$R^{4a'}$ and $R^{5a'}$], [$R^{5a'}$ and $R^{6a'}$], [$R^{6a'}$ and $R^{7a'}$] can optionally be taken together with their intervening atoms to form one or more optionally substituted rings;

w is 0 or an integer from 1 to 8, inclusive;

p is 0 or an integer from 1 to 4, inclusive; and

X is an anion.

In certain embodiments, $R^{1a}$, $R^{1a'}$, $R^{4a}$, $R^{4a'}$, $R^{6a}$, and $R^{6a'}$ are each H.

In certain embodiments, $R^{5a}$, $R^{5a'}$, $R^{7a}$, and $R^{7a'}$ are each —H, an optionally substituted aliphatic group or an optionally substituted aryl group.

In certain embodiments, $R^{1a}$, $R^{1a'}$, $R^{4a}$, $R^{4a'}$, $R^{6a}$ and $R^{6a'}$ are each —H and $R^{5a}$, $R^{5a'}$, $R^{7a}$, and $R^{7a'}$ are each independently an optionally substituted $C_{1-12}$ aliphatic group.

In certain embodiments, a provided epoxide hydrolysis catalyst is selected from the group consisting of:

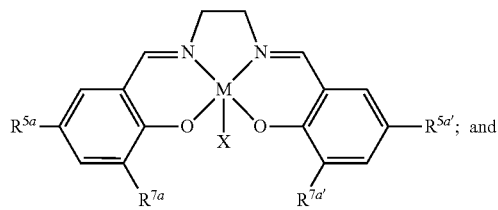

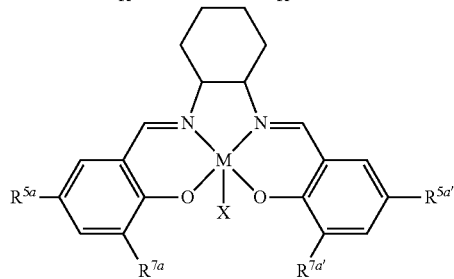

wherein
each of M, $R^{5a}$, $R^{5a'}$, $R^{7a}$, $R^{7a'}$ and X is as defined above and in the classes and subclasses herein.

In certain embodiments where a provided epoxide hydrolysis catalyst comprises a metal complex, the metal (M) is selected from periodic table groups 3-13, inclusive. In certain embodiments, M is a transition metal selected from periodic table groups 5-12, inclusive. In certain embodiments, M is a transition metal selected from periodic table groups 4-11, inclusive. In certain embodiments, M is a transition metal selected from periodic table groups 5-10, inclusive. In certain embodiments, M is a transition metal selected from periodic table groups 7-9, inclusive. In some embodiments, M is selected from the group consisting of Cr, Mn, V, Fe, Co, Mo, W, Ru, Al, and Ni. In some embodiments, M is a metal atom selected from the group consisting of: cobalt; chromium; aluminum; titanium; ruthenium, and manganese. In some embodiments, M is cobalt. In some embodiments, M is chromium. In some embodiments, M is aluminum.

In certain embodiments, a metal complex is a zinc, cobalt, chromium, aluminum, titanium, ruthenium, or manganese complex. In certain embodiments, a metal complex is an aluminum complex. In some embodiments, a metal complex is a chromium complex. In some embodiments, a metal complex is a zinc complex. In certain some embodiments, a metal complex is a titanium complex. In some embodiments, a metal complex is a ruthenium complex. In certain embodiments, a metal complex is a manganese complex. In certain embodiments, a metal complex is cobalt complex. In certain embodiments where the metal complex is a cobalt complex, the cobalt metal has an oxidation state of 3+ (i.e., Co(III)). In some embodiments, the cobalt metal has an oxidation state of 2+. In certain embodiments, a metal complex is chromium complex. In certain embodiments where the metal complex is a chromium complex, the chromium metal has an oxidation state of 3+ (i.e., Cr(III)). In some embodiments, the chromium metal has an oxidation state of 2+.

In certain embodiments, a provided epoxide hydrolysis catalyst comprises:

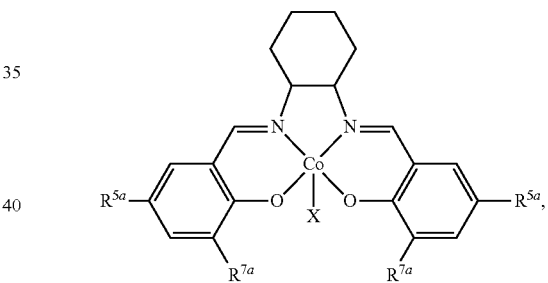

where each of $R^{5a}$, $R^{5a'}$, $R^{7a}$, $R^{7a'}$ and X is as defined above and in the classes and subclasses herein.

In certain embodiments, a provided epoxide hydrolysis catalyst comprises:

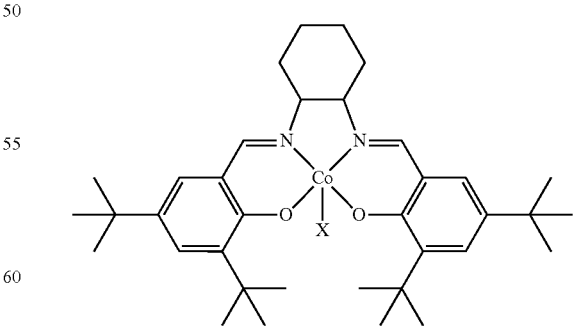

wherein X is as defined above and in the classes and subclasses herein.

In certain embodiments, a provided epoxide hydrolysis catalyst comprises:

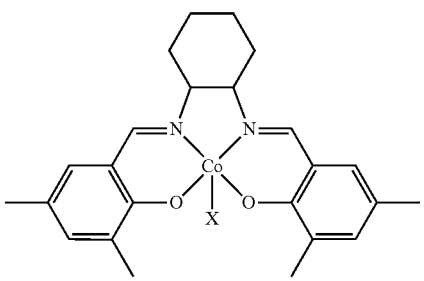

wherein X is as defined above and in the classes and subclasses herein.

In certain embodiments, a provided epoxide hydrolysis catalyst comprises:

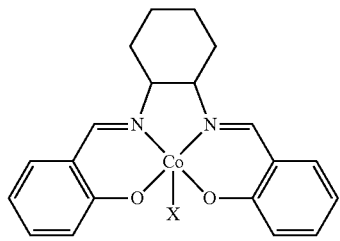

wherein X is as defined above and in the classes and subclasses herein.

In certain embodiments, a provided epoxide hydrolysis catalyst comprises:

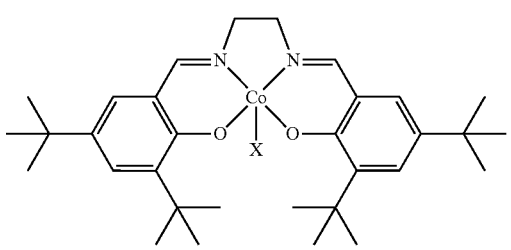

wherein X is as defined above and in the classes and subclasses herein.

In certain embodiments, a provided epoxide hydrolysis catalyst comprises:

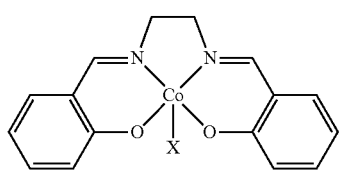

wherein X is as defined above and in the classes and subclasses herein.

In certain embodiments where the provided epoxide hydrolysis catalyst comprises a metal complex where the metal atom has a net positive charge, the positive charge is balanced by an associated anion. In certain embodiments, such associated anions are designated —X, as in the structures above.

In certain embodiments, X is a nucleophilic ligand. Exemplary nucleophilic ligands include, but are not limited to: ]—$OR^x$, —$SR^x$, —$O(C=O)R^x$, —$O(C=O)OR^x$, —$O(C=O)N(R^x)_2$, —$N(R^x)(C=O)R^x$, —NC, —CN, halo (e.g., —Br, —I, —Cl), —$N_3$, —$O(SO_2)R^x$ and —$OPR^x_3$, wherein each $R^x$ is, independently, selected from hydrogen, optionally substituted aliphatic, optionally substituted heteroaliphatic, optionally substituted aryl and optionally substituted heteroaryl.

In certain embodiments, X is —$O(C=O)R^x$, wherein $R^x$ is selected from optionally substituted aliphatic, fluorinated aliphatic, optionally substituted heteroaliphatic, optionally substituted aryl, fluorinated aryl, and optionally substituted heteroaryl. For example, in certain embodiments, X is —$O(C=O)R^x$, wherein $R^x$ is optionally substituted aliphatic. In certain embodiments, X is —$O(C=O)R^x$, wherein $R^x$ is optionally substituted alkyl and fluoroalkyl. In certain embodiments, X is —$O(C=O)CH_3$ or —$O(C=O)CF_3$.

Furthermore, in certain embodiments, X is —$O(C=O)R^x$, wherein $R^x$ is optionally substituted aryl, fluoroaryl, or heteroaryl. In certain embodiments, X is —$O(C=O)R^x$, wherein $R^x$ is optionally substituted aryl. In certain embodiments, X is —$O(C=O)R^x$, wherein $R^x$ is optionally substituted phenyl. In certain embodiments, X is —$O(C=O)C_6H_5$ or —$O(C=O)C_6F_5$.

In certain embodiments, X is —$OR^x$, wherein $R^x$ is selected from optionally substituted aliphatic, optionally substituted heteroaliphatic, optionally substituted aryl, and optionally substituted heteroaryl. For example, in certain embodiments, X is —$OR^x$, wherein $R^x$ is optionally substituted aryl. In certain embodiments, X is —$OR^x$, wherein $R^x$ is optionally substituted phenyl. In certain embodiments, X is —$OC_6H_5$ or —$OC_6H_2(2,4-NO_2)$.

In certain embodiments, X is halo. In certain embodiments, X is —Br. In certain embodiments, X is —Cl. In certain embodiments, X is —I.

In certain embodiments, X is —$O(SO_2)R^x$. In certain embodiments X is —OTs. In certain embodiments X is —$OSO_2Me$. In certain embodiments X is —$OSO_2CF_3$.

It is known in the art, that oligomeric metal complexes can have certain advantages as epoxide hydrolysis catalysts. For example certain oligomeric complexes described by Jacobsen et al. and others have increased catalytic activity and/or selectivity and have further advantages in terms of the ease with which they can be recovered from reaction mixtures. Such oligomeric complexes are well suited to the methods of the present invention. Therefore, in certain embodiments, provided epoxide hydrolysis catalysts comprise an oligomeric metal complex comprising two or more transition metal complexes connected by linker units.

In certain embodiments, oligomeric catalysts comprise two or more linked versions of any of the metal complexes shown above or described in the classes and subclasses herein. Typically such oligomeric catalysts are assembled via linker moieties covalent attached to suitable sites on the ligand, (for example in place of any one or more of $R^{1a}$, $R^{1a'}$, $R^{2a}$, $R^{2a'}$, $R^{3a}$, $R^{3a'}$, $R^{4a}$, $R^{4a'}$, $R^{5a}$, $R^{5a'}$, $R^{6a}$, $R^{6a'}$, $R^{7a}$, and $R^{7a'}$ in the metal complexes described above)

In certain embodiments, where a provided epoxide hydrolysis catalyst comprises an oligomeric metal complex, the oligomeric complex comprises two or more

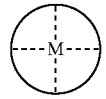

groups covalently linked together. In certain embodiments, such complexes have a formula:

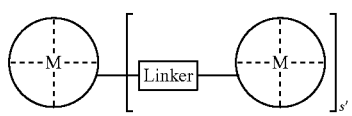

where s' is an integer from 1 to about 20.

In certain embodiments, where provided epoxide hydrolysis catalysts comprise oligomeric structures, the oligomers comprise a plurality of salen complexes linked via covalent bonds to the aryl rings:

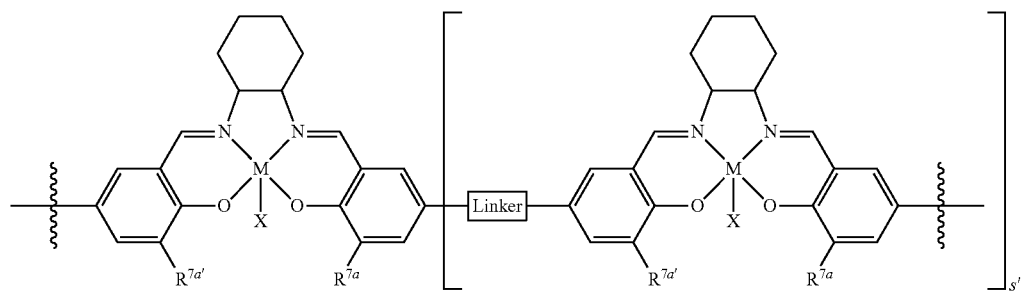

(linkage to para position)

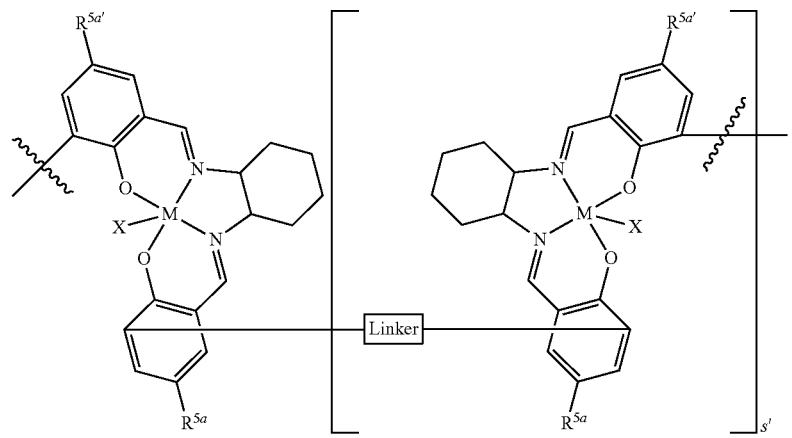

(linkage at ortho position)

where, each of M, X, $R^{5a'}$, $R^{5a}$, $R^{7a'}$, $R^{7a}$ and s' is as defined above and in the classes and subclasses herein.

The linkers in such oligomers typically comprise a plurality of atoms selected from carbon, silicon, oxygen, nitrogen and sulfur. In certain embodiments, linkers comprise alkyl chains, optionally with one or more sites of unsaturation and optionally one or more ether, ester or amide linkages present. In certain embodiments, the oligomeric hydrolysis catalysts comprise complexes and linkers such as those disclosed in *Angew. Chem. Mt. Ed.* 2002, 41, 1374-1377, the entirety of which is incorporated herein by reference.

In certain embodiments where provided epoxide hydrolysis catalysts are oligomeric, the oligomers are macrocylic molecules. For example:

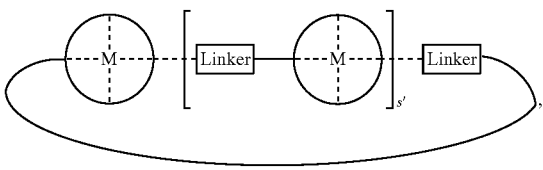

where each of M, s', and the linker moiety are as defined above and in the classes and subclasses herein.

In certain embodiments where provided epoxide hydrolysis catalysts are macrocyclic oligomers, the oligomers comprise two or more salen complexes. For example:

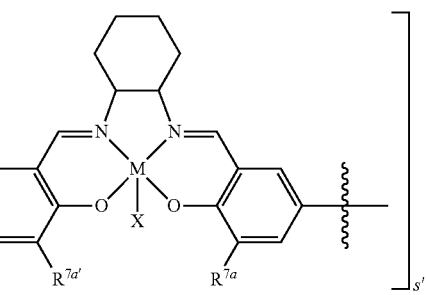

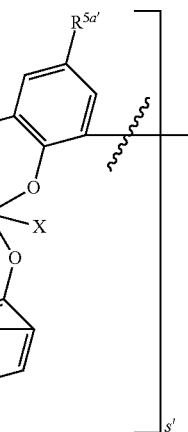

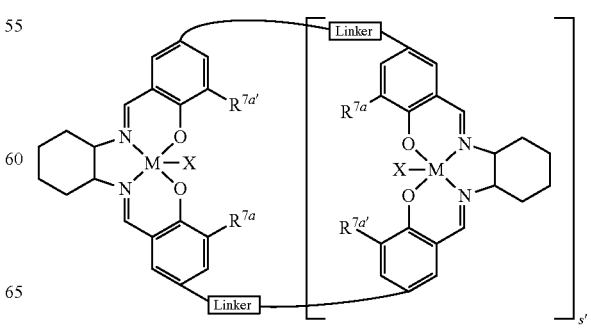

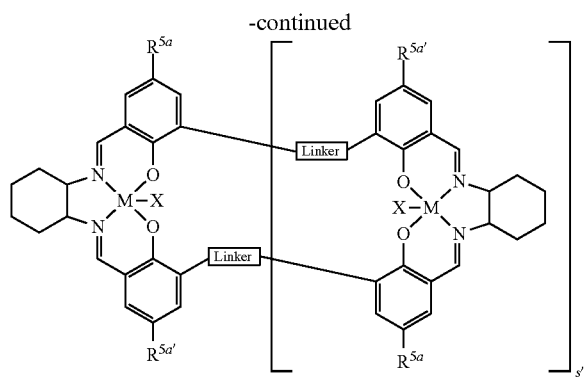

where, each of M, X, $R^{5a'}$, $R^{5a}$, $R^{7a'}$, and $R^{7a}$ and s' is as defined above and in the classes and subclasses herein.

The skilled artisan will have an understanding of the scope of suitable oligomeric catalysts available and described in the literature. As described above, additional suitable epoxide hydrolysis catalysts can be identified through routine experimentation to evaluate potential complexes and select those having the catalytic activities and selectivities taught in this disclosure.

In some embodiments, the epoxide hydrolysis catalysts include those disclosed in U.S. Pat. No. 7,220,870; *J. Am. Chem. Soc.* 1999, 121, 4147-4154; *Angew. Chem. Int. Ed.* 2002, 41, 1374-1377; and *Angew. Chem. Int. Ed.* 2000, 39, 3604-3607, the entireties of which are incorporated herein by reference.

In certain embodiments, a provided epoxide hydrolysis catalyst is or comprises a solid. In certain embodiments, a provided epoxide hydrolysis catalyst comprises a solid-supported metal complex. Such solid-supported epoxide hydrolysis catalysts can comprise any of the polymeric or inorganic solid supports known in the literature to be suitable for the support of metal-based catalysts. In certain embodiments, solid-supported epoxide hydrolysis catalysts comprise any of the epoxide hydrolysis catalysts described above and in the classes and subclasses herein adsorbed onto an inorganic support such as a silica, alumina, carbon, ceramic, clay, glass, mineral or other similar material. In certain embodiments, solid-supported epoxide hydrolysis catalysts comprise any of the epoxide hydrolysis catalysts described above covalently linked to a solid such as a silica gel or a polymer such as polystyrene, polysulfone, polyolefin, polyester, polyether, polycarbonate, polyurethane or a similar material. In certain embodiments, the polymer support comprises cross-linked polystyrene.

In certain embodiments, a provided epoxide hydrolysis catalyst comprises, or is similar to those reported in: *Adv. Synth. Catal.* 2008, 350, pp 1816-1822, or Angewandte Chemie Int'l Ed. 2012, 51(46), pp 11517-11521.

II. Polymerization Catalysts

As described above, in addition to the epoxide hydrolysis catalyst, methods and compositions of the present invention comprise a polymerization catalyst capable of promoting the copolymerization of epoxides and $CO_2$ to form aliphatic polycarbonates. In certain embodiments, a provided epoxide $CO_2$ copolymerization catalyst is an organometallic complex known in the art to catalyze copolymerization of epoxides and carbon dioxide. In certain embodiments, provided polymerization catalysts are characterized in that they demonstrate induction times prior to the onset of a copolymerization reaction between epoxides and carbon dioxide, particularly in the presence of water. Induction time is defined as an interval of time during which the components and conditions necessary for copolymerization are present in a reaction mixture, but substantially no copolymerization occurs. The end of such an induction period is typically signaled by a commencement of copolymerization at a rate substantially higher than that observed (if any) during the induction period. This is a phenomenon that is well documented in the literature and known to those skilled in the art.

In certain embodiments, such induction times are greater than about 0.5 hours. In certain embodiments, such induction times are greater than about 1 hour, greater than about 2 hours, greater than about 3, 4, 6, 8, or 12 hours.

In certain embodiments, the epoxide $CO_2$ copolymerization catalyst is an organometallic complex which catalyzes copolymerization of epoxides and carbon dioxide and which has a tethered activating functional moiety such as an onium salt or strong base. Without being bound by theory or thereby limiting the scope of the present invention, it is believed that such tethered complexes, while having increased catalytic activity for epoxide-$CO_2$ copolymerizations are not facile catalysts for the hydrolysis of epoxides by water. It is further believed that water may bind unproductively to the tethered catalysts and prevent them from catalyzing the desired epoxide $CO_2$ copolymerization. Epoxide-$CO_2$ catalysts which lack such tethered groups generally have lower catalytic rates in epoxide $CO_2$ copolymerization but do not manifest significant induction periods—possibly because they are able to catalyze the hydrolysis of epoxides and therefore quickly consume any water present in the reaction mixture. Therefore, providing a second catalyst that is a good catalyst for epoxide hydrolysis is advantageous when using tethered catalysts, or any other epoxide-$CO_2$ copolymerization catalyst that demonstrates a significant water-dependent induction period.

In certain embodiments, where the polymerization comprises a tethered activating functional group, the catalyst has a structure:

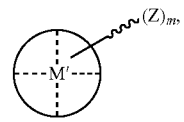

wherein:

M' is a metal atom;

comprises a multidentate ligand; and

⁓⁓(Z)$_m$ represents one or more activating moieties tethered to the multidentate ligand, where ⁓⁓ represents a linker moiety; m represents the number of Z groups present on a linker moiety and is an integer between 1 and 4 inclusive; and each (Z) is an activating functional group independently selected from the group consisting of:

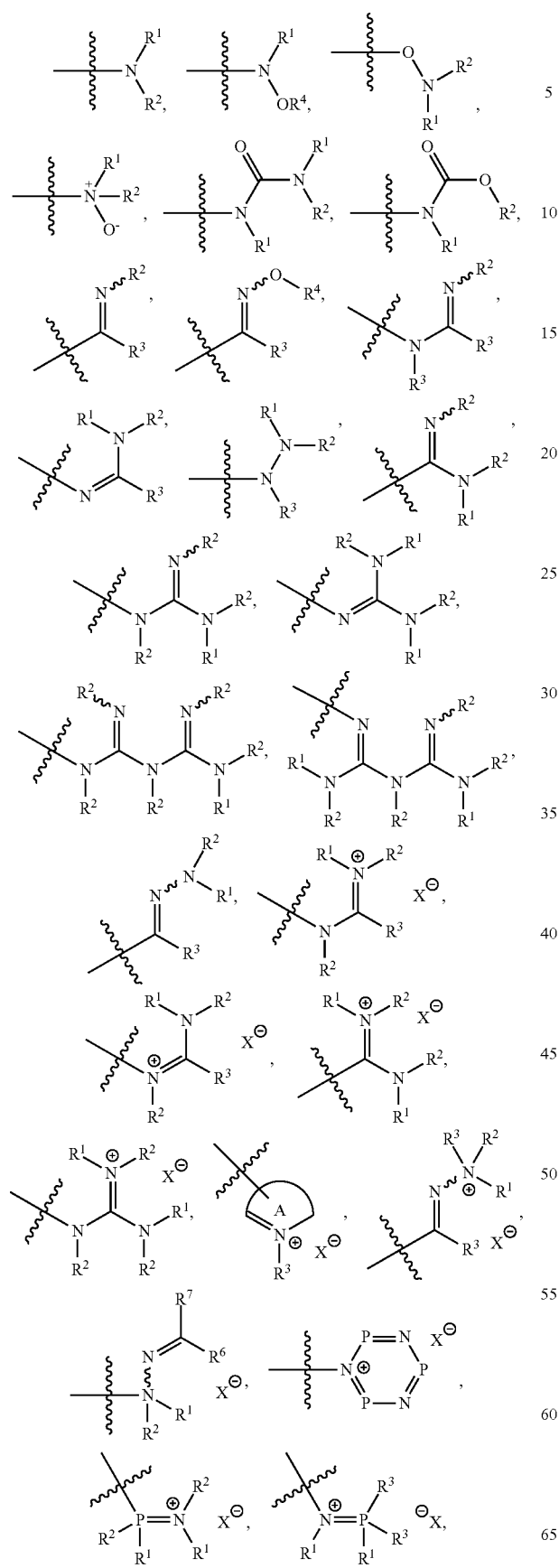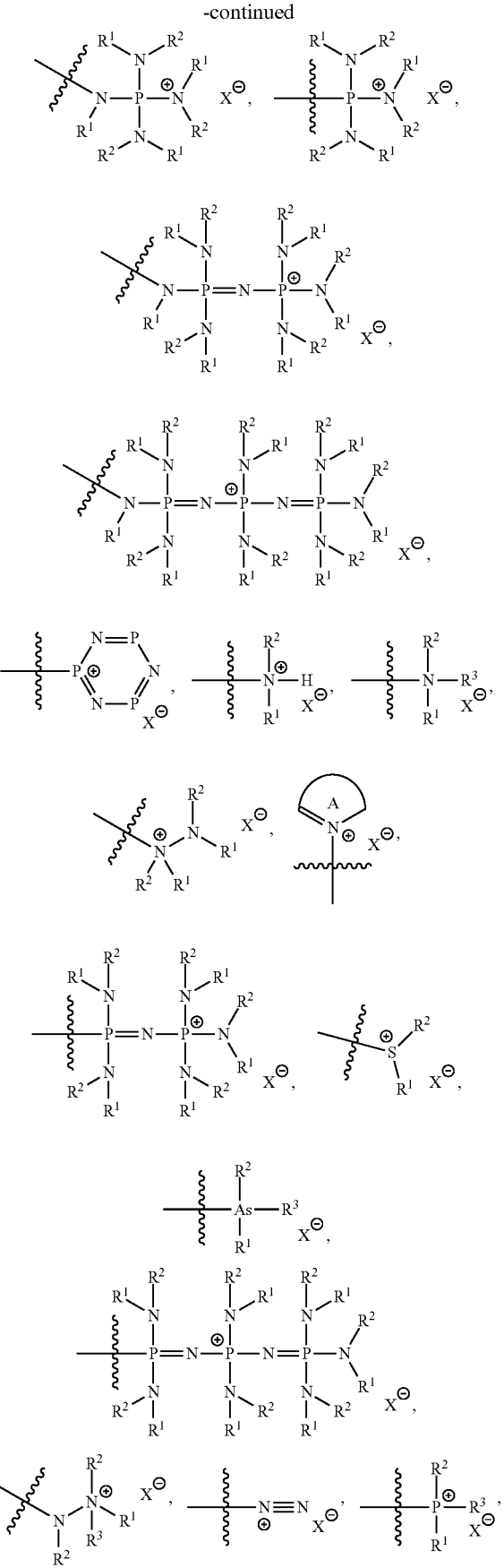

-continued

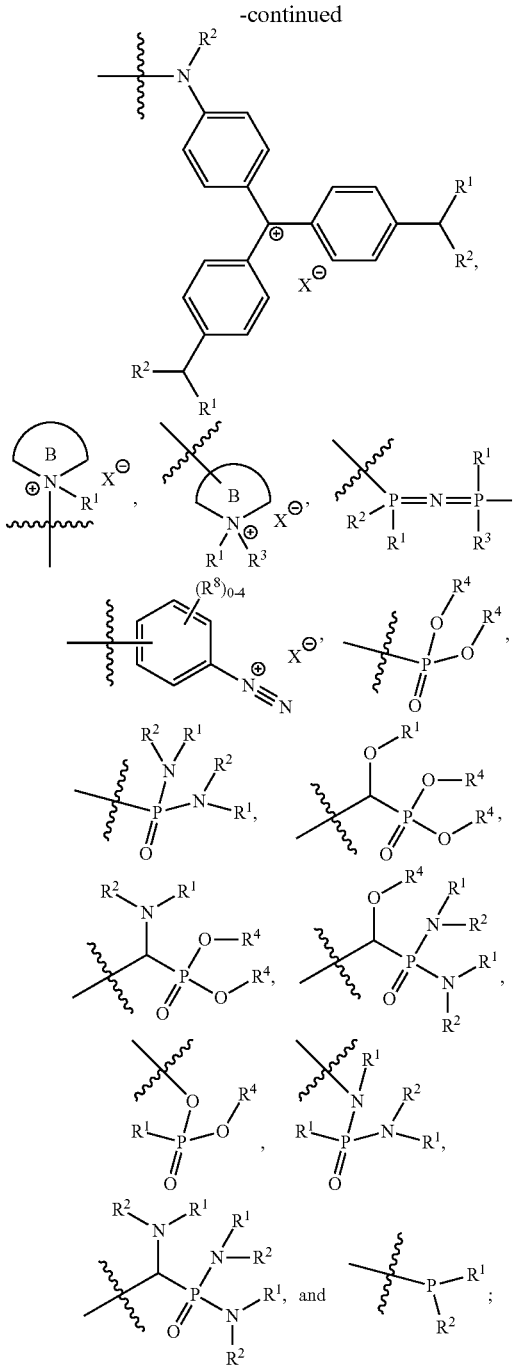

wherein:
each $R^1$ and $R^2$ is independently hydrogen or an optionally substituted radical selected from the group consisting of $C_{1-20}$ aliphatic, $C_{1-20}$ heteroaliphatic, a 3- to 8-membered saturated or partially unsaturated monocyclic carbocycle, a 7- to 14-membered saturated or partially unsaturated polycyclic carbocycle, a 5- to 6-membered monocyclic heteroaryl ring having 1-4 heteroatoms independently selected from nitrogen, oxygen, or sulfur, an 8- to 14-membered polycyclic heteroaryl ring having 1-5 heteroatoms independently selected from nitrogen, oxygen, or sulfur, a 3- to 8-membered saturated or partially unsaturated monocyclic heterocyclic ring having 1-3 heteroatoms independently selected from nitrogen, oxygen, or sulfur, a 6- to 14-membered saturated or partially unsaturated polycyclic heterocycle having 1-5 heteroatoms independently selected from nitrogen, oxygen, or sulfur, phenyl, and an 8- to 14-membered polycyclic aryl ring; or $R^1$ and $R^2$ can be taken together with their intervening atoms to form one or more optionally substituted rings optionally containing one or more additional heteroatoms;

each $R^3$ is independently hydrogen or an optionally substituted radical selected from the group consisting of $C_{1-20}$ aliphatic, $C_{1-20}$ heteroaliphatic, a 3- to 8-membered saturated or partially unsaturated monocyclic carbocycle, a 7- to 14-membered saturated or partially unsaturated polycyclic carbocycle, a 5- to 6-membered monocyclic heteroaryl ring having 1-4 heteroatoms independently selected from nitrogen, oxygen, or sulfur, an 8- to 14-membered polycyclic heteroaryl ring having 1-5 heteroatoms independently selected from nitrogen, oxygen, or sulfur, a 3- to 8-membered saturated or partially unsaturated monocyclic heterocyclic ring having 1-3 heteroatoms independently selected from nitrogen, oxygen, or sulfur, a 6- to 14-membered saturated or partially unsaturated polycyclic heterocycle having 1-5 heteroatoms independently selected from nitrogen, oxygen, or sulfur, phenyl, and an 8- to 14-membered polycyclic aryl ring; or an $R^3$ group can be taken with an $R^1$ or $R^2$ group to form one or more optionally substituted rings; and each $R^4$ is independently hydrogen, a hydroxyl protecting group, or an optionally substituted radical selected from the group consisting of $C_{1-20}$ acyl, $C_{1-20}$ aliphatic, $C_{1-20}$ heteroaliphatic, a 3- to 8-membered saturated or partially unsaturated monocyclic carbocycle, a 7- to 14-membered saturated or partially unsaturated polycyclic carbocycle, a 5- to 6-membered monocyclic heteroaryl ring having 1-4 heteroatoms independently selected from nitrogen, oxygen, or sulfur, an 8- to 14-membered polycyclic heteroaryl ring having 1-5 heteroatoms independently selected from nitrogen, oxygen, or sulfur, a 3- to 8-membered saturated or partially unsaturated monocyclic heterocyclic ring having 1-3 heteroatoms independently selected from nitrogen, oxygen, or sulfur, a 6- to 14-membered saturated or partially unsaturated polycyclic heterocycle having 1-5 heteroatoms independently selected from nitrogen, oxygen, or sulfur, phenyl, and an 8- to 14-membered polycyclic aryl ring;

$R^5$ is $R^2$ or hydroxyl; or $R^1$ and $R^5$ can be taken together with their intervening atoms to form one or more optionally substituted carbocyclic, heterocyclic, aryl, or heteroaryl rings;

each $R^6$ and $R^7$ is independently hydrogen or an optionally substituted radical selected from the group consisting of $C_{1-20}$ aliphatic, $C_{1-20}$ heteroaliphatic, a 3- to 8-membered saturated or partially unsaturated monocyclic carbocycle, a 7- to 14-membered saturated or partially unsaturated polycyclic carbocycle, a 5- to 6-membered monocyclic heteroaryl ring having 1-4 heteroatoms independently selected from nitrogen, oxygen, or sulfur, an 8- to 14-membered polycyclic heteroaryl ring having 1-5 heteroatoms independently selected from nitrogen, oxygen, or sulfur, a 3- to 8-membered saturated or partially unsaturated monocyclic heterocyclic ring having 1-3 heteroatoms independently selected from nitrogen, oxygen, or sulfur, a 6- to 14-membered saturated or partially unsaturated polycyclic heterocycle having 1-5 heteroatoms independently selected from nitrogen, oxygen, or sulfur, phenyl, and an 8- to 14-membered polycyclic aryl ring; or $R^6$ and $R^7$ can be taken together with their intervening atoms to form one or more optionally substituted rings optionally containing one or more heteroatoms; or an $R^6$ or $R^7$ group can be taken with an $R^1$ or $R^2$ group to form one or more optionally substituted rings;

each occurrence of $R^8$ is independently selected from the group consisting of halogen, $-NO_2$, $-CN$, $-SR^y$, $-S(O)R^y$, $-S(O)_2R^y$, $-N^yC(O)R^y$, $-OC(O)R^y$, $-CO_2R^y$, $-NCO$, $-N_3$, $-OR^y$, $-OC(O)N(R^y)_2$, $-N(R^y)_2$, $-NR^yC(O)R^y$, $-NR^yC(O)OR^y$, or an optionally substituted radical selected from the group consisting of $C_{1-20}$ aliphatic, $C_{1-20}$ heteroaliphatic, a 3- to 8-membered saturated or partially unsaturated monocyclic carbocycle, a 7- to 14-membered saturated or partially unsaturated polycyclic carbocycle, a 5- to 6-membered monocyclic heteroaryl ring having 1-4 heteroatoms independently selected from nitrogen, oxygen, or sulfur, an 8- to 14-membered polycyclic heteroaryl ring having 1-5 heteroatoms independently selected from nitrogen, oxygen, or sulfur, a 3- to 8-membered saturated or partially unsaturated monocyclic heterocyclic ring having 11-3 heteroatoms independently selected from nitrogen, oxygen, or sulfur, a 6- to 14-membered saturated or partially unsaturated polycyclic heterocycle having 1-5 heteroatoms independently selected from nitrogen, oxygen, or sulfur, phenyl, or an 8- to 14-membered polycyclic aryl ring;

or two or more adjacent $R^8$ groups can be taken together to form an optionally substituted saturated, partially unsaturated, or aromatic 5- to 12-membered ring containing 0 to 4 heteroatoms;

each $R^y$ is independently —H or an optionally substituted group selected from the group consisting of $C_{1-6}$ aliphatic, phenyl, a 3-7 membered saturated or partially unsaturated carbocyclic ring, a 3-7 membered saturated or partially unsaturated monocyclic heterocyclic ring having 1-2 heteroatoms independently selected from nitrogen, oxygen, or sulfur, a 5-6 membered heteroaryl ring having 1-3 heteroatoms independently selected from nitrogen, oxygen, or sulfur, and 8- to 10-membered aryl;

X is an anion;

Ring A is an optionally substituted, 5- to 10-membered heteroaryl group; and

Ring B is an optionally substituted, 3- to 8-membered saturated or partially unsaturated monocyclic heterocyclic ring having 0-2 heteroatoms independently selected from nitrogen, oxygen, or sulfur in addition to the depicted ring nitrogen atom.

In certain embodiments, where the epoxide $CO_2$ copolymerization catalyst has a structure

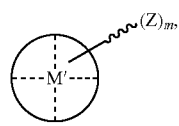

suitable multidentate ligands

include, but are not limited to: salen derivatives 1, derivatives of salan ligands 2, bis-2-hydroxybenzamido derivatives 3, derivatives of the Trost ligand 4, porphyrin derivatives 5, derivatives of tetrabenzoporphyrin ligands 6, derivatives of corrole ligands 7, phthalocyaninate derivatives 8, and dibenzotetramethyltetraaza[14]annulene (tmtaa) derivatives 9 or 9' as shown below, and other similar complexes.

Formulae 1 to 9' below show the structures of certain classes of metal complexes that may have utility as epoxide $CO_2$ copolymerization catalysts in methods and compositions of the present invention:

1

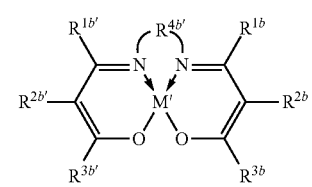

2

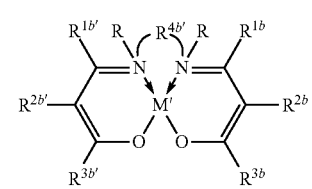

3

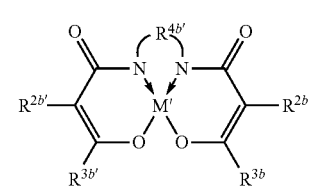

4

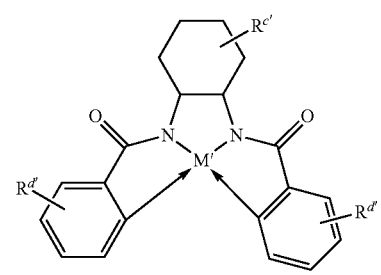

5

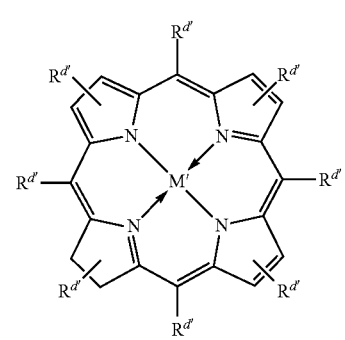

-continued

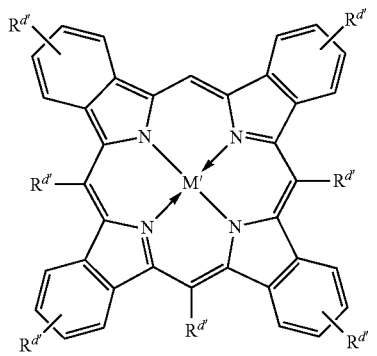

6

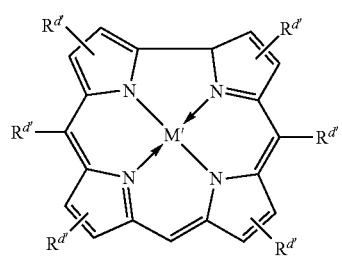

7

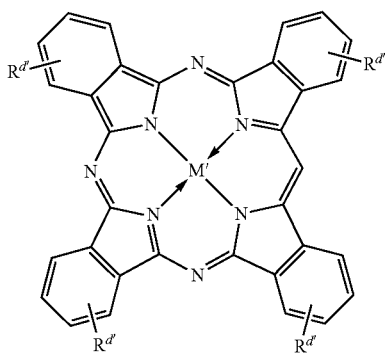

8

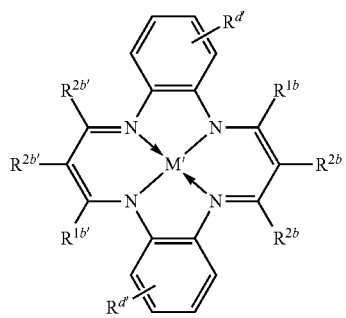

9

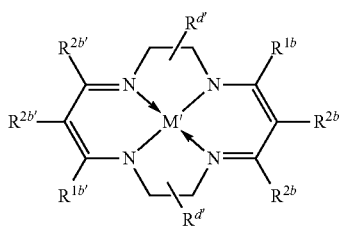

9' where M', $R^{1b}$, $R^{2b}$, $R^{3b}$, $R^{1b'}$, $R^{2b'}$, $R^{3b'}$, $R^{4b'}$, R, $R^{c'}$, and $R^{d'}$ are as defined below and in the classes and subclasses herein.

In certain embodiments,

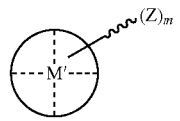

comprises:

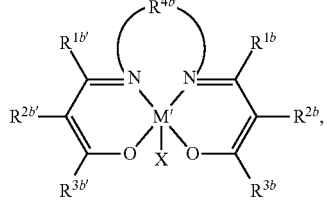

where
$R^{1b}$ and $R^{1b'}$, are independently —H, a ⁓⁓$(Z)_m$ group, or an optionally substituted radical selected from the group consisting of $C_{1-20}$ aliphatic, $C_{1-20}$ heteroaliphatic, phenyl, a 3- to 8-membered saturated or partially unsaturated monocyclic carbocycle, a 7-14 carbon saturated, partially unsaturated or aromatic polycyclic carbocycle, a 5- to 6-membered monocyclic heteroaryl ring having 1-4 heteroatoms independently selected from nitrogen, oxygen, or sulfur, a 3- to 8-membered saturated or partially unsaturated heterocyclic ring having 1-3 heteroatoms independently selected from nitrogen, oxygen, or sulfur, a 6- to 12-membered polycyclic saturated or partially unsaturated heterocycle having 1-5 heteroatoms independently selected from nitrogen, oxygen, or sulfur, and an 8- to 10-membered bicyclic heteroaryl ring having 1-5 heteroatoms independently selected from nitrogen, oxygen, or sulfur;

$R^{2b}$, $R^{2b'}$, $R^{3b}$, and $R^{3b'}$ are independently a ⁓⁓$(Z)_m$ group, hydrogen, —OR, —$NR_2$, —SR, —CN, —$NO_2$, —$SO_2R$, —SOR, —$SO_2NR_2$, —CNO, —$NRSO_2R$, —NCO, —$N_3$, —$SiR_3$, or an optionally substituted radical selected from the group consisting of $C_{1-20}$ aliphatic, $C_{1-20}$ heteroaliphatic, phenyl, a 3- to 8-membered saturated or partially unsaturated monocyclic carbocycle, a 7-14 carbon saturated, partially unsaturated or aromatic polycyclic carbocycle, a 5- to 6-membered monocyclic heteroaryl ring having 1-4 heteroatoms independently selected from nitrogen, oxygen, or sulfur, a 3- to 8-membered saturated or partially unsaturated heterocyclic ring having 1-3 heteroatoms independently selected from nitrogen, oxygen, or sulfur, a 6- to 12-membered polycyclic saturated or partially unsaturated heterocycle having 1-5 heteroatoms independently selected from nitrogen, oxygen, or sulfur, and an 8- to 10-membered bicyclic heteroaryl ring having 1-5 heteroatoms independently selected from nitrogen, oxygen, or sulfur; or any of [$R^{2b'}$ and $R^{3b'}$], [$R^{2b}$ and $R^{3b}$], [$R^{1b}$ and $R^{2b}$], and [$R^{1b'}$ and $R^{2b'}$] may optionally be taken together with their intervening atoms to form one or more rings which may in turn be substituted with one or more $R^{d'}$ groups;

$R^{d'}$ at each occurrence is independently a ⁓⁓⁓$(Z)_m$ group, a linker, hydrogen, halogen, —OR, —NR$_2$, —SR, —CN, —NO$_2$, —SO$_2$R, —SOR, —SO$_2$NR$_2$, —CNO, —NRSO$_2$R, —NCO, —N$_3$, —SiR$_3$, —C(O)NR$_2$, —OC(O)NR$_2$, —NR(CO)OR, —NRC(O)R, —CO$_2$R, —OC(O)R, —OC(O)OR, or an optionally substituted radical selected from the group consisting of C$_{1-20}$ aliphatic, C$_{1-20}$ heteroaliphatic, phenyl, a 3- to 8-membered saturated or partially unsaturated monocyclic carbocycle, a 7-14 carbon saturated, partially unsaturated or aromatic polycyclic carbocycle, a 5- to 6-membered monocyclic heteroaryl ring having 1-4 heteroatoms independently selected from nitrogen, oxygen, or sulfur, a 3- to 8-membered saturated or partially unsaturated heterocyclic ring having 1-3 heteroatoms independently selected from nitrogen, oxygen, or sulfur, a 6- to 12-membered polycyclic saturated or partially unsaturated heterocycle having 1-5 heteroatoms independently selected from nitrogen, oxygen, or sulfur, or an 8- to 10-membered bicyclic heteroaryl ring having 1-5 heteroatoms independently selected from nitrogen, oxygen, or sulfur; or two or more $R^{d'}$ groups may be taken together with their intervening atoms to form one or more optionally substituted rings optionally containing one or more heteroatoms;

$R^{4b'}$ is selected from the group consisting of:

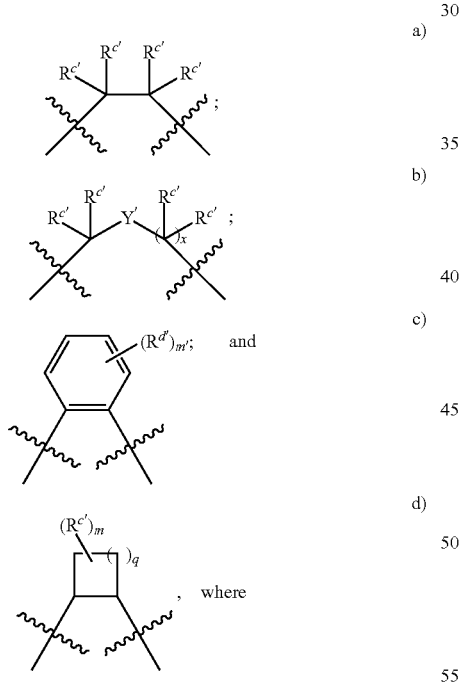

, where $R^{c'}$ at each occurrence is independently a ⁓⁓⁓$(Z)_m$ group, hydrogen, halogen, —OR, —NR$_2$, —SR, —CN, —SO$_2$R, —SOR, —SO$_2$NR$_2$, —CNO, —NRSO$_2$R, —NCO, —N$_3$, —SiR$_3$, —C(O)NR$_2$, —OC(O)NR$_2$, —NR(CO)OR, —NRC(O)R, —CO$_2$R, —OC(O)R, —OC(O)OR; or an optionally substituted radical selected from the group consisting of C$_{1-20}$ aliphatic, C$_{1-20}$ heteroaliphatic, phenyl, a 3- to 8-membered saturated or partially unsaturated monocyclic carbocycle, a 7-14 carbon saturated, partially unsaturated or aromatic polycyclic carbocycle, a 5- to 6-membered monocyclic heteroaryl ring having 1-4 heteroatoms independently selected from nitrogen, oxygen, or sulfur, a 3- to 8-membered saturated or partially unsaturated heterocyclic ring having 1-3 heteroatoms independently selected from nitrogen, oxygen, or sulfur, a 6- to 12-membered polycyclic saturated or partially unsaturated heterocycle having 1-5 heteroatoms independently selected from nitrogen, oxygen, or sulfur, and an 8- to 10-membered bicyclic heteroaryl ring having 1-5 heteroatoms independently selected from nitrogen, oxygen, or sulfur; or two or more $R^{c'}$ groups may be taken together with the carbon atoms to which they are attached and any intervening atoms to form one or more optionally substituted rings; or two $R^{c'}$ groups attached to the same carbon atom may optionally be taken together along with the carbon atom to which they are attached to form an optionally substituted moiety selected from the group consisting of: a 3- to 8-membered spirocyclic ring, a carbonyl, an oxime, a hydrazone, and an imine;

R at each occurrence is independently hydrogen, an optionally substituted radical selected the group consisting of acyl, C$_{1-6}$ aliphatic, C$_{1-6}$ heteroaliphatic, carbamoyl, arylalkyl, phenyl, a 3- to 8-membered saturated or partially unsaturated monocyclic carbocycle, a 7-14 carbon saturated, partially unsaturated or aromatic polycyclic carbocycle, a 5- to 6-membered monocyclic heteroaryl ring having 1-4 heteroatoms independently selected from nitrogen, oxygen, or sulfur, a 3- to 8-membered saturated or partially unsaturated heterocyclic ring having 1-3 heteroatoms independently selected from nitrogen, oxygen, or sulfur, a 6- to 12-membered polycyclic saturated or partially unsaturated heterocycle having 1-5 heteroatoms independently selected from nitrogen, oxygen, or sulfur, an 8- to 10-membered bicyclic heteroaryl ring having 1-5 heteroatoms independently selected from nitrogen, oxygen, or sulfur, an oxygen protecting group, and a nitrogen protecting group; or two R groups on the same nitrogen atom can optionally be taken together to form an optionally substituted 3- to 7-membered ring;

X is an anion;

Y' is a divalent linker selected from the group consisting of: —C(R$^{c'}$)$_2$—, —NR—, —N(R)C(O)—, —C(O)NR—, —O—, —C(O)—, —OC(O)—, —C(O)O—, —S—, —SO—, —SO$_2$—, —SiR$_2$—, —C(=S)—, —C(=NR)—, or —N=N—; a polyether; a C$_3$ to C$_8$ substituted or unsubstituted carbocycle; and a C$_1$ to C$_8$ substituted or unsubstituted heterocycle;

m is 0 or an integer from 1 to 6, inclusive;

m' is 0 or an integer from 1 to 4, inclusive;

q is 0 or an integer from 1 to 4, inclusive; and x is 0, 1, or 2.

In certain embodiments, such metal complexes are characterized in that they comprise one or more ⁓⁓⁓$(Z)_m$ groups. In certain embodiments, such metal complexes are characterized in that they comprise one to six ⁓⁓⁓$(Z)_m$ groups. In certain embodiments, such complexes have one ⁓⁓⁓$(Z)_m$ group. In certain embodiments, such complexes have two ⁓⁓⁓$(Z)_m$ groups. In certain embodiments, such complexes have four ⁓⁓⁓$(Z)_m$ groups. In certain embodiments, such complexes have six ⁓⁓⁓$(Z)_m$ groups.

In certain embodiments,

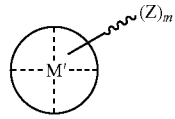

comprises:

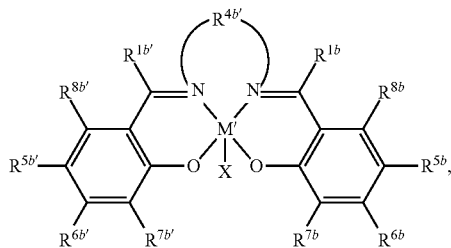

where each of $R^{4b'}$, $R^{1b}$, $R^{1b'}$, M', and X is as defined above and in the classes and subclasses herein, and wherein $R^{8b}$, $R^{8b'}$, $R^{5b}$, $R^{5b'}$, $R^{6b}$, $R^{6b'}$, $R^{7b}$, and $R^{7b'}$ are each independently a ⸺$(Z)_m$ group, hydrogen, halogen, —OR, —$NR_2$, —SR, —CN, —$NO_2$, —$SO_2R$, —SOR, —$SO_2NR_2$, —CNO, —$NRSO_2R$, —NCO, —$N_3$, —$SiR_3$, —$C(O)NR_2$, —$OC(O)NR_2$, —NR(CO)OR, —NRC(O)R, —$CO_2R$, —OC(O)R, —OC(O)OR, or an optionally substituted radical selected from the group consisting of $C_{1-20}$ aliphatic, $C_{1-20}$ heteroaliphatic, phenyl, a 3- to 8-membered saturated or partially unsaturated monocyclic carbocycle, a 7-14 carbon saturated, partially unsaturated or aromatic polycyclic carbocycle, a 5- to 6-membered monocyclic heteroaryl ring having 1-4 heteroatoms independently selected from nitrogen, oxygen, or sulfur, a 3- to 8-membered saturated or partially unsaturated heterocyclic ring having 1-3 heteroatoms independently selected from nitrogen, oxygen, or sulfur, a 6- to 12-membered polycyclic saturated or partially unsaturated heterocycle having 1-5 heteroatoms independently selected from nitrogen, oxygen, or sulfur, or an 8- to 10-membered bicyclic heteroaryl ring having 1-5 heteroatoms independently selected from nitrogen, oxygen, or sulfur; or any one or more of [$R^{1b}$ and $R^{8b}$], [$R^{1b'}$ and $R^{8b'}$], [$R^{8b}$ and $R^{5b}$], [$R^{5b}$ and $R^{6b}$], [$R^{6b}$ and $R^{7b}$], [$R^{8b'}$ and $R^{5b'}$], [$R^{5b'}$ and $R^{6b'}$], [$R^{6b'}$ and $R^{7b'}$] can optionally be taken together with their intervening atoms to form one or more optionally substituted rings;

In certain embodiments,

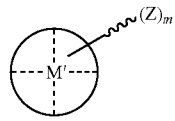

comprises:

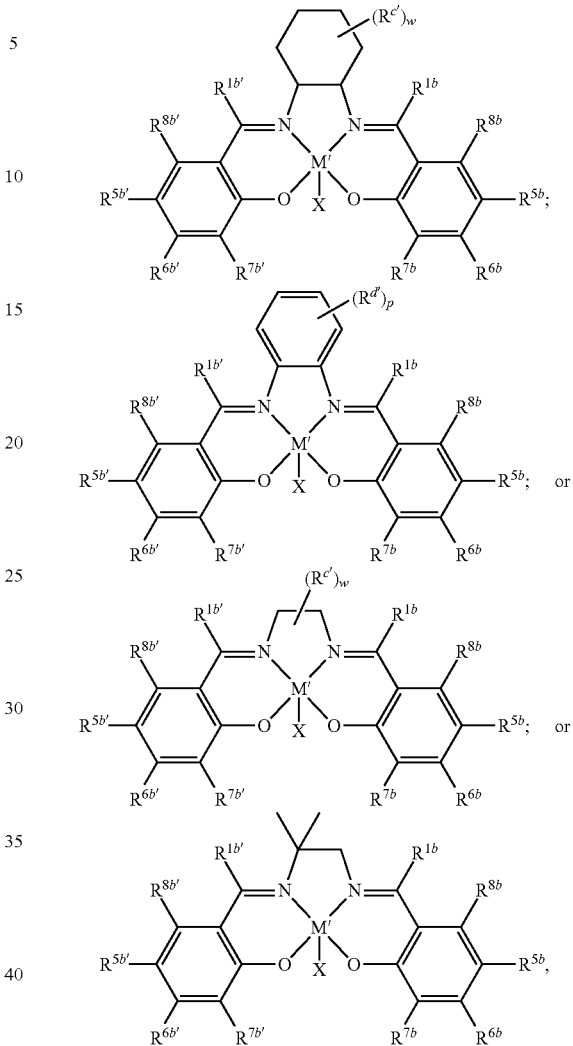

where, M', X', $R^{c'}$, $R^{d'}$, $R^{1b}$, $R^{1b'}$, $R^{8b}$, $R^{8b'}$, $R^{5b}$, $R^{5b'}$, $R^{6b}$, $R^{6b'}$, $R^{7b}$, and $R^{7b'}$ are as defined above and in the classes and subclasses herein, w is 0 or an integer from 1 to 8, inclusive; and p is 0 or an integer from 1 to 4, inclusive.

In certain embodiments, $R^{1b}$ and $R^{1b'}$ are each independently selected from —H, and $C_{1-6}$ aliphatic. In certain embodiments, $R^{1b}$ and $R^{1b'}$ are each —H. In certain embodiments, $R^{1b}$ and $R^{1b'}$ are each methyl.

In certain embodiments, at least one of $R^{5b}$, $R^{5b'}$, $R^{7b}$, and $R^{7b'}$ comprises a ⸺$(Z)_m$ group. In certain embodiments, at least one of $R^{c'}$, or $R^{d'}$ comprises a ⸺$(Z)_m$ group. In certain embodiments, $R^{5b}$, $R^{5b'}$, $R^{7b}$, and $R^{7b'}$ are each independently selected from —H, $C_{1-12}$ aliphatic, and ⸺$(Z)_m$.

In certain embodiments, $R^{8b}$, $R^{8b'}$, $R^{6b}$, and $R^{6b'}$ are each —H. In certain embodiments, $R^{8b}$, $R^{8b'}$, $R^{6b}$ and $R^{6b'}$ are each —H and at least one of $R^{5b}$, $R^{5b'}$, $R^{7b}$, and $R^{7b'}$ comprises a ⸺$(Z)_m$ group. In certain embodiments, $R^{8b}$, $R^{8b'}$, $R^{6b}$ and $R^{6b'}$ are each —H, at least one of $R^{5b}$ and $R^{5b'}$, comprises a ⸺$(Z)_m$ group, and $R^{7b}$, and $R^{7b'}$ are each independently —H, or $C_{1-12}$ aliphatic. In certain embodiments, $R^{8b}$, $R^{8b'}$, $R^{6b}$, and $R^{6b'}$ are each —H, each of $R^{5b}$ and $R^{5b'}$ comprises a ⸺$(Z)_m$ group, and $R^{7b}$, and $R^{7b'}$ are each independently —H, or $C_{1-12}$ aliphatic. In certain embodiments, $R^{8b}$, $R^{8b'}$, $R^{6b}$, and $R^{6b'}$ are each —H, one of $R^{5b}$ and $R^{5b'}$ comprises a ⁓⁓$(Z)_m$ group while the other comprises —H or $C_{1-12}$ aliphatic, and $R^{5b}$, and $R^{5b'}$ are each independently —H, or $C_{1-12}$ aliphatic.

In certain embodiments, $R^{8b}$, $R^{8b'}$, $R^{6b}$, and $R^{6b'}$ are each —H, at least one of $R^{7b}$ and $R^{7b'}$, comprises a ⁓⁓$(Z)_m$ group, and $R^{5b}$, and $R^{5b'}$ are each independently —H, or $C_{1-12}$ aliphatic. In certain embodiments, $R^{8b}$, $R^{8b'}$, $R^{6b}$, and $R^{6b'}$ are each —H, one of $R^{7b}$ and $R^{7b'}$ comprises a ⁓⁓$(Z)_m$ group while the other comprises —H or $C_{1-12}$ aliphatic, and $R^{5b}$, and $R^{5b'}$ are each independently —H, or $C_{1-12}$ aliphatic. In certain embodiments, $R^{8b}$, $R^{8b'}$, $R^{6b}$, and $R^{6b'}$ are each —H, each of $R^{7b}$ and $R^{7b'}$ comprises a ⁓⁓$(Z)_m$ group, and $R^{5b}$, and $R^{5b'}$ are each independently —H, or $C_{1-12}$ aliphatic.

In certain embodiments where epoxide $CO_2$ copolymerization catalysts have a formula

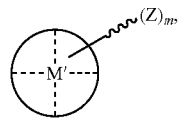

M' is independently selected from the group consisting of Cr, Mn, V, Fe, Co, Mo, W, Ru, Al, and Ni.

In certain embodiments, M' is independently selected from the group consisting of: Co, Al, and Cr. In certain embodiments, M' is Co. In certain embodiments, M' is Co(III)-X. In certain embodiments, M' is Cr. In certain embodiments, M' is Cr(III)-X.

In certain embodiments where epoxide $CO_2$ copolymerization catalysts have a formula

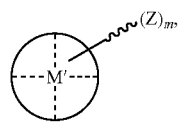

a In certain embodiments, the ⁓⁓ moiety contains 1-30 atoms including at least one carbon atom, and optionally one or more atoms selected from the group consisting of N, O, S, Si, B, and P. In certain embodiments, the ⁓⁓ moiety is a $C_{2-30}$ aliphatic group wherein one or more carbons are optionally and independently replaced by —$NR^y$—, —$N(R^y)C(O)$—, —$C(O)N(R^y)$—, —O—, —C(O)—, —OC(O)—, —C(O)O—, —S—, —$Si(R^y)_2$—, —SO—, —$SO_2$—, —C(=S)—, —$C(=NR^y)$—, or —N=N—, wherein each occurrence of $R^y$ is independently —H, or an optionally substituted radical selected from the group consisting of $C_{1-6}$ aliphatic, phenyl, a 3-7 membered saturated or partially unsaturated carbocyclic ring, a 3-7 membered saturated or partially unsaturated monocyclic heterocyclic ring having 1-2 heteroatoms independently selected from nitrogen, oxygen, or sulfur, a 5-6 membered heteroaryl ring having 1-3 heteroatoms independently selected from nitrogen, oxygen, or sulfur, and 8- to 10-membered aryl.

In certain embodiments, a linker moiety is an optionally substituted $C_3$-$C_{30}$ aliphatic group. In certain embodiments, a linker is an optionally substituted $C_{4-24}$ aliphatic group. In certain embodiments, a linker moiety is an optionally substituted. $C_4$-$C_{20}$ aliphatic group. In certain embodiments, a linker moiety is an optionally substituted $C_4$-$C_{12}$ aliphatic group. In certain embodiments, a linker is an optionally substituted $C_{4-10}$ aliphatic group. In certain embodiments, a linker is an optionally substituted $C_{4-8}$ aliphatic group. In certain embodiments, a linker moiety is an optionally substituted $C_4$-$C_6$ aliphatic group. In certain embodiments, a linker moiety is an optionally substituted $C_6$-$C_{12}$ aliphatic group. In certain embodiments, a linker moiety is an optionally substituted $C_8$ aliphatic group. In certain embodiments, a linker moiety is an optionally substituted $C_7$ aliphatic group. In certain embodiments, a linker moiety is an optionally substituted $C_6$ aliphatic group. In certain embodiments, a linker moiety is an optionally substituted $C_5$ aliphatic group. In certain embodiments, a linker moiety is an optionally substituted $C_4$ aliphatic group. In certain embodiments, a linker moiety is an optionally substituted $C_3$ aliphatic group. In certain embodiments, a aliphatic group in the linker moiety is an optionally substituted straight alkyl chain. In certain embodiments, the aliphatic group is an optionally substituted branched alkyl chain. In some embodiments, a linker moiety is a $C_4$ to $C_{20}$ alkyl group having one or more methylene groups replaced by —$C(R^aR^b)$— where $R^a$ and $R^b$ are each, independently $C_1$-$C_4$ alkyl groups. In certain embodiments, a linker moiety consists of an aliphatic group having 4 to 30 carbons including one or more gem-dimethyl substituted carbon atoms.

In certain embodiments, a linker moiety includes one or more optionally substituted cyclic elements selected from the group consisting of saturated or partially unsaturated carbocyclic, aryl, heterocyclic, or heteroaryl. In certain embodiments, a linker moiety consists of the substituted cyclic element, in some embodiments the cyclic element is part of a linker with one or more non-ring heteroatoms or optionally substituted aliphatic groups comprising other parts of the linker moiety.

In certain embodiments where epoxide $CO_2$ copolymerization catalysts haven formula

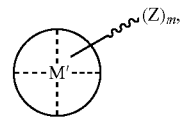

a ⁓⁓ moiety ⁓⁓ is selected from the group consisting of:

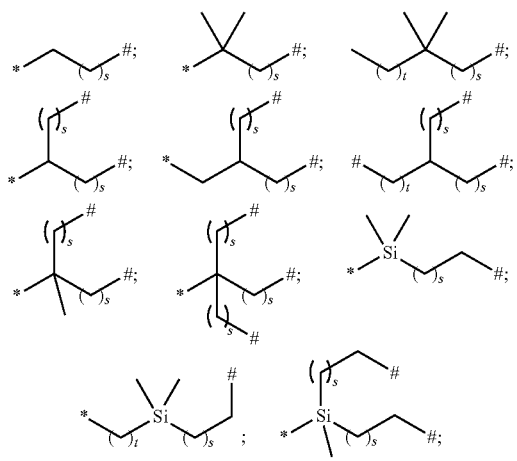

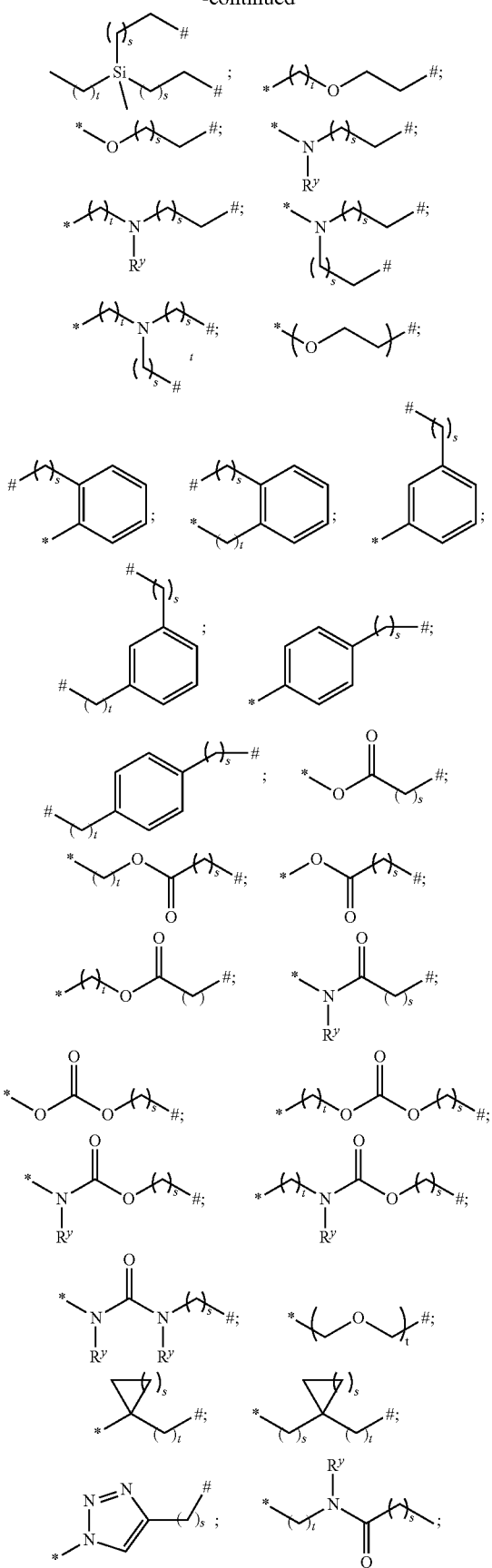
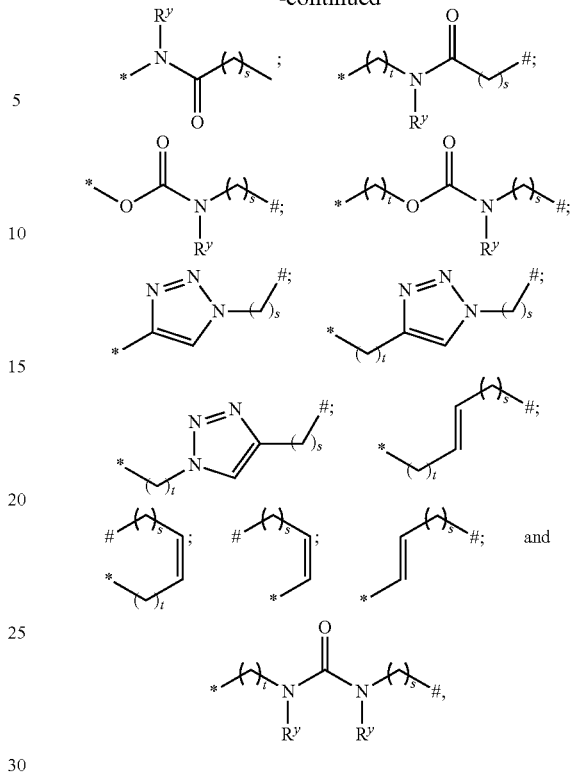

wherein each s is independently 0-6, each t is independently 1-4, * represents the site of attachment to the

moiety, and each # represents a site of attachment of an activating functional group.

In some embodiments, where a linker ———⌇⌇⌇ is selected from the group above, s is 0. In some embodiments, s is 1. In some embodiments, s is 2. In some embodiments, s is 3. In some embodiments, s is 4. In some embodiments, s is 5. In some embodiments, s is 6. In some embodiments, t is 1. In some embodiments, t is 2. In some embodiments, t is 3. In some embodiments, t is 4.

In certain embodiments, each activating moiety ———⌇⌇⌇ $(Z)_m$ contains only one activating functional group (i.e. m=1). In some embodiments, each activating moiety contains more than one activating functional groups (i.e. m>1). In certain embodiments, an activating moiety contains two activating functional groups (i.e. m=2). In certain embodiments, an activating moiety contains three activating functional groups (i.e. m=3). In certain embodiments, an activating moiety contains four activating functional groups (i.e. m=4). In certain embodiments where more than one activating functional group is present on an activating moiety, they are all the same functional group. In some embodiments where more than one activating functional group is present on an activating moiety, two or more of the activating functional groups are different.

In certain embodiments, one or more Z groups is independently a neutral functional group selected from the group consisting of amines, phosphines, guanidines, bis-guanidines, amidines, and nitrogen-containing heterocycles.

In certain embodiments, at least one Z group is selected from the group consisting of:
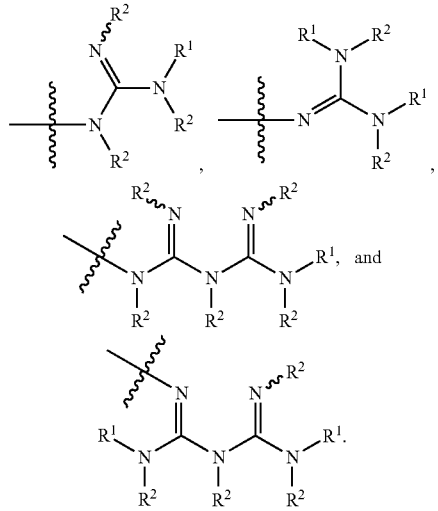
In certain embodiments, two or more of $R^1$ and $R^2$ are taken together to form one or more optionally substituted rings optionally containing additional heteroatoms.
In certain embodiments, at least one Z group is selected from the group consisting of:
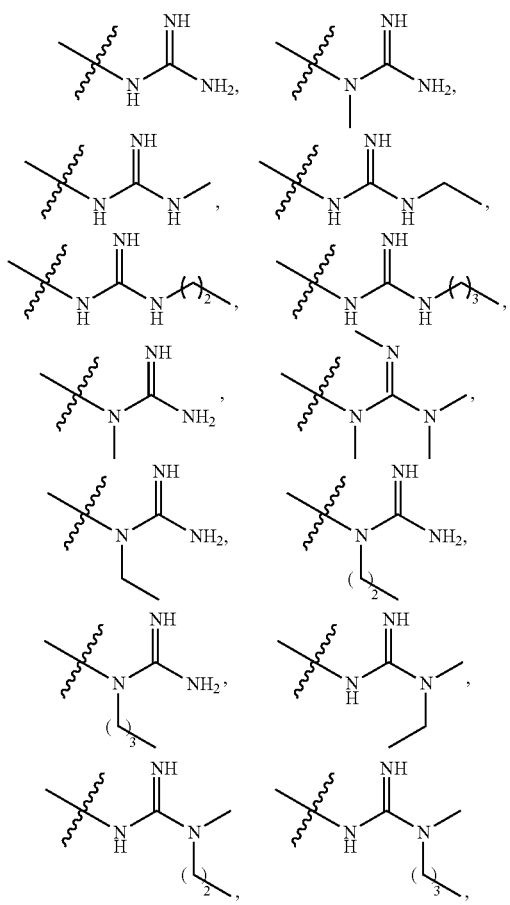
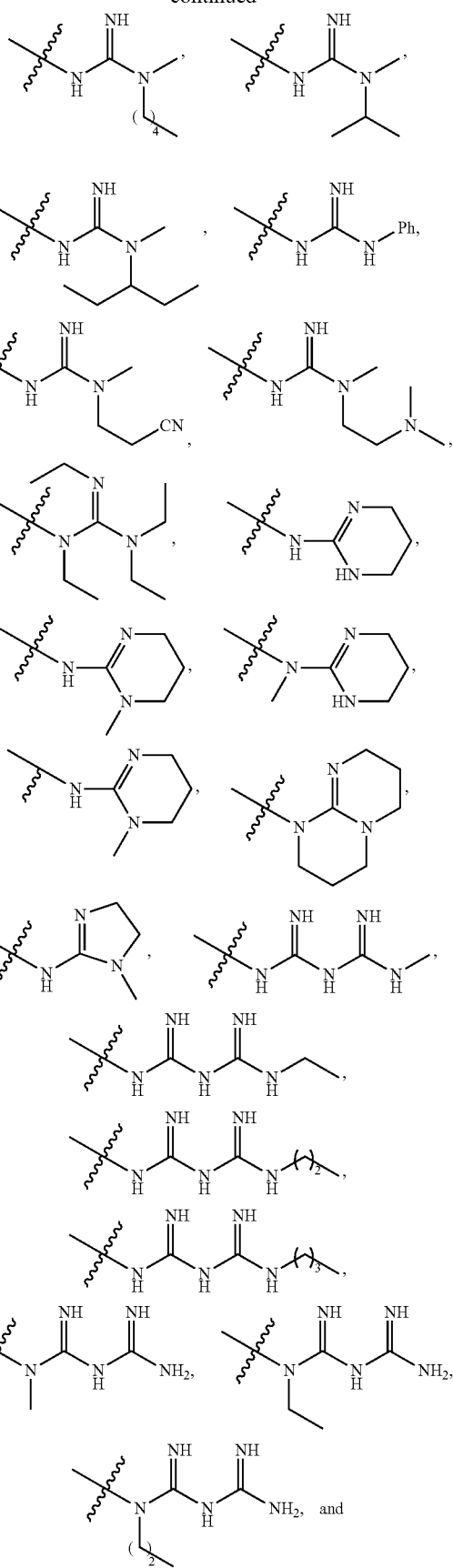

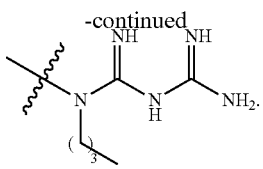

In certain embodiments, at least one Z group is

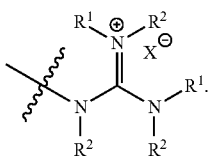

In certain embodiments, at least one Z group is

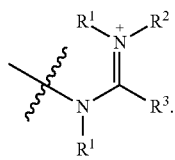

In certain embodiments, at least one Z group is a polycyclic guanidinium group. In certain embodiments, at least one Z group is a polycyclic amidinium group. In certain embodiments, at least one Z group is

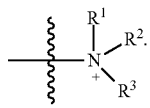

In certain embodiments, at least one Z group is a trialkyl ammonium group. In certain embodiments, at least one Z group is

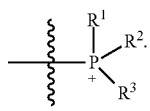

In certain embodiments at least one Z group is a trialkyl phosphonium group. In certain embodiments at least one Z group is a triaryl phosphonium group.

In certain embodiments where the provided epoxide $CO_2$ copolymerization catalyst comprises a metal complex where the metal atom has a net positive charge, the positive charge is balanced by an associated anion. In certain embodiments, such associated anions are designated —X. Additionally, for those metal complexes with activating moieties having a positive charge, additional anions also denoted —X will necessarily be present to balance the positive charge. Complexes with more than one positive charge may have more than one —X group each of which may be the same or different. Such complexes may also comprise polyanionic —X groups. Such polyanions may satisfy the positive charge on more than one cation or metal atom in the same metal complex, or they may be shared between two or more metal complexes.

In certain embodiments, an —X group associated with a provided epoxide $CO_2$ copolymerization catalyst is a nucleophilic ligand. Exemplary nucleophilic ligands include, but are not limited to: —$OR^x$, —$SR^x$, —O(C=O)$R^x$, $HCO_3^-$, $CO_3^{2-}$, —O(C=O)$OR^x$, —O(C=O)N($R^x$)$_2$, —$NO_3$, —N($R^x$)(C=O)$R^x$, —NC, —CN, halo (e.g., —Br, —I, —Cl), —$N_3$, —O($SO_2$)$R^x$ and —$OPR^x_3$, wherein each $R^x$ is, independently, selected from hydrogen, optionally substituted aliphatic, optionally substituted heteroaliphatic, optionally substituted aryl and optionally substituted heteroaryl.

In certain embodiments, X is —)(C=O)$R^x$, wherein $R^x$ is selected from optionally substituted aliphatic, fluorinated aliphatic, optionally substituted heteroaliphatic, optionally substituted aryl, fluorinated aryl, and optionally substituted heteroaryl. For example, in certain embodiments, X is —O(C=O)$R^x$, wherein $R^x$ is optionally substituted aliphatic. In certain embodiments, X is —O(C=O)$R^x$, wherein $R^x$ is optionally substituted alkyl and fluoroalkyl. In certain embodiments, X is —O(C=O)$CH_3$ or —O(C=O)$CF_3$. In certain embodiments, X is bicarbonate ($HCO_3$—). In certain embodiments, X is carbonate ($CO_3^{2-}$).

Furthermore, in certain embodiments, X is —O(C=O)$R^x$, wherein $R^x$ is optionally substituted aryl, fluoroaryl, or heteroaryl. In certain embodiments, X is —O(C=O)$R^x$, wherein $R^x$ is optionally substituted aryl. In certain embodiments, X is —O(C=O)$R^x$, wherein $R^x$ is optionally substituted phenyl. In certain embodiments, X is —O(C=O)$C_6H_5$ or —O(C=O)$C_6F_5$.

In certain embodiments, X is —$OR^x$, wherein $R^x$ is selected from optionally substituted aliphatic, optionally substituted heteroaliphatic, optionally substituted aryl, and optionally substituted heteroaryl. For example, in certain embodiments, X is —$OR^x$, wherein $R^x$ is optionally substituted aryl. In certain embodiments, X is —$OR^x$, wherein $R^x$ is optionally substituted phenyl. In certain embodiments, X is —$OC_6H_5$ or —$OC_6H_3(2,4-NO_2)$.

In certain embodiments, X is halo. In certain embodiments, X is —Br. In certain embodiments, X is —Cl. In certain embodiments, X is —I.

In certain embodiments, X is —O($SO_2$)$R^x$. In certain embodiments X is —OTs. In certain embodiments X is —$OSO_2Me$. In certain embodiments X is —$OSO_2CF_3$.

Non-limiting examples of exemplary metal complexes suitable for use as epoxide $CO_2$ copolymerization catalysts in methods and compositions of the present invention are shown below:

TABLE 1

Representative Epoxide $CO_2$ Copolymerization Catalysts

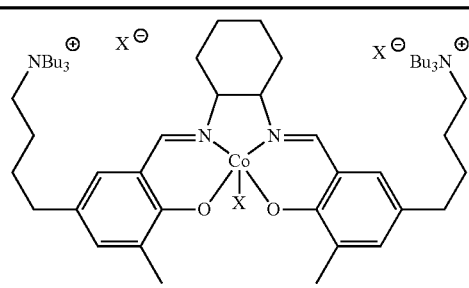

TABLE 1-continued
Representative Epoxide CO₂ Copolymerization Catalysts
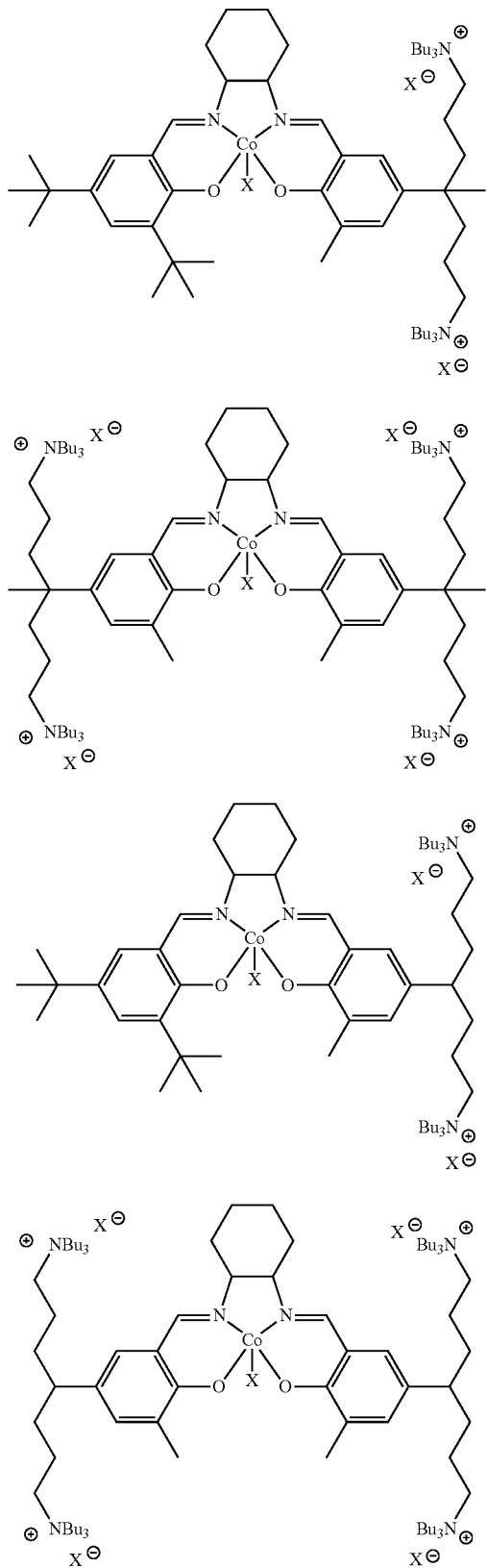
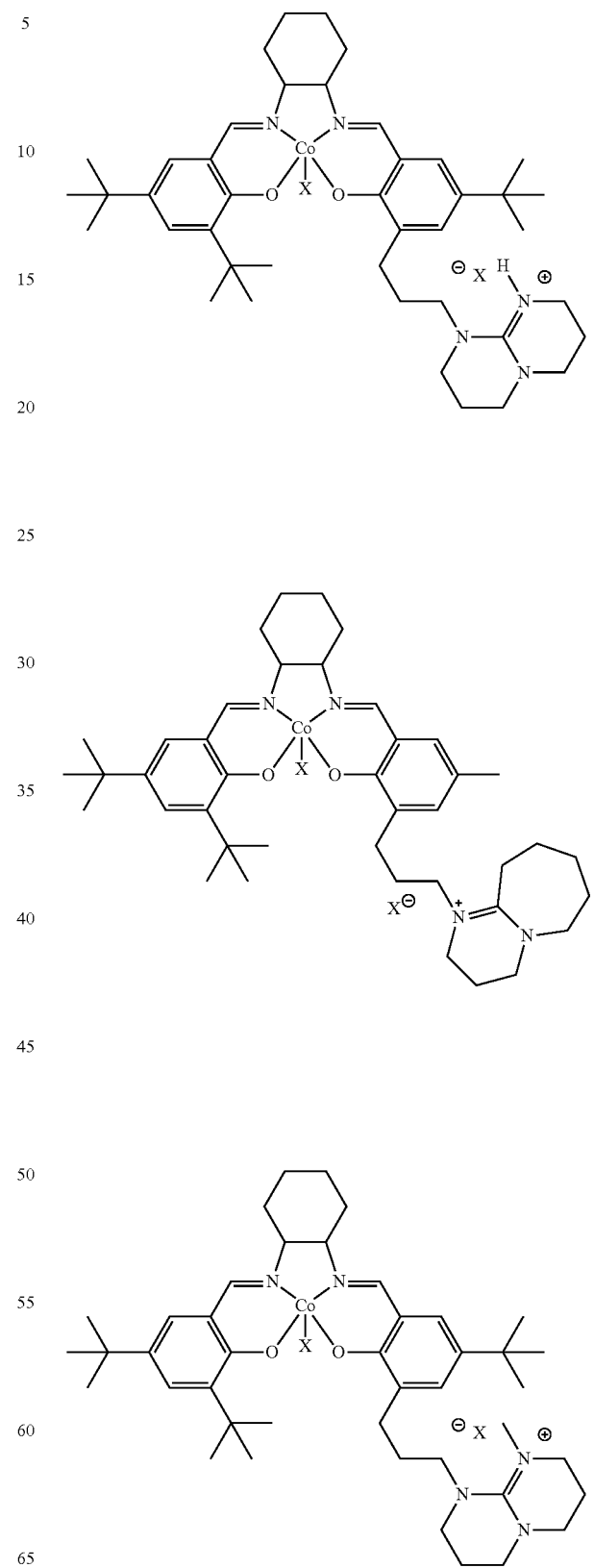

TABLE 1-continued
Representative Epoxide CO₂ Copolymerization Catalysts
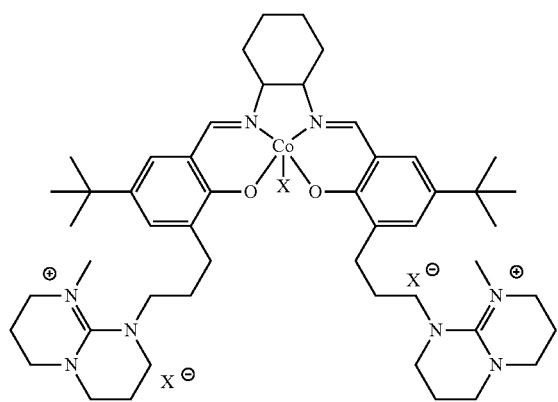
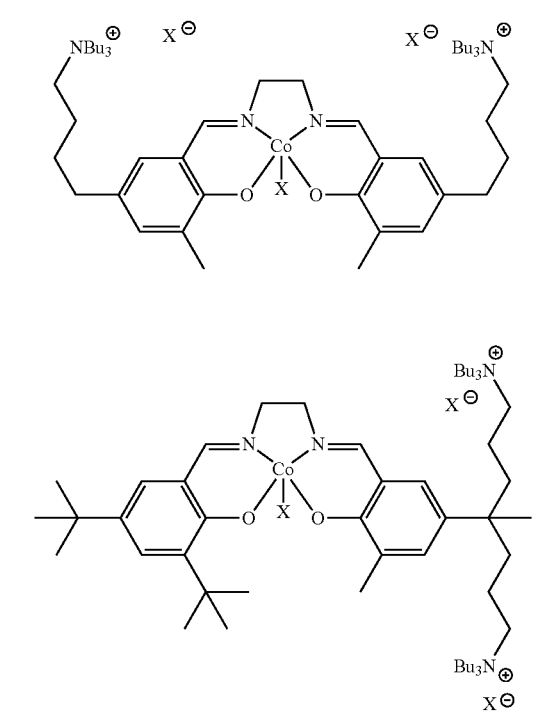
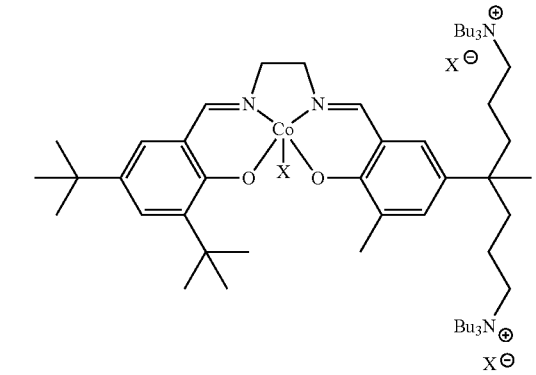
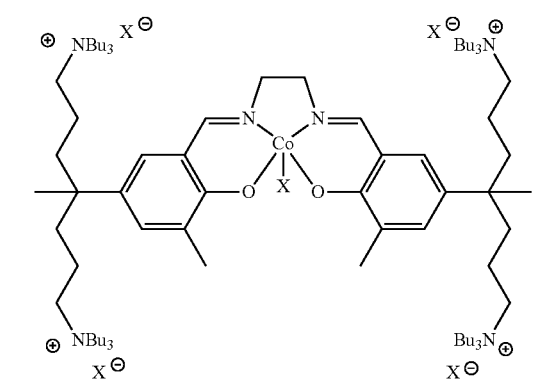
TABLE 1-continued
Representative Epoxide CO₂ Copolymerization Catalysts
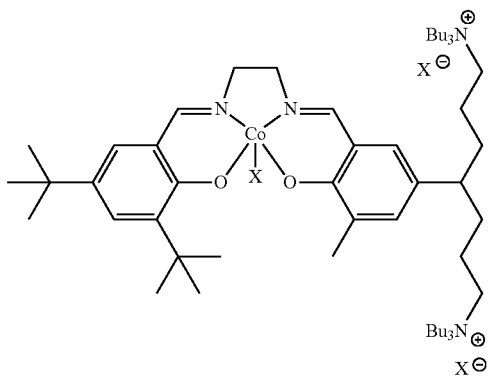
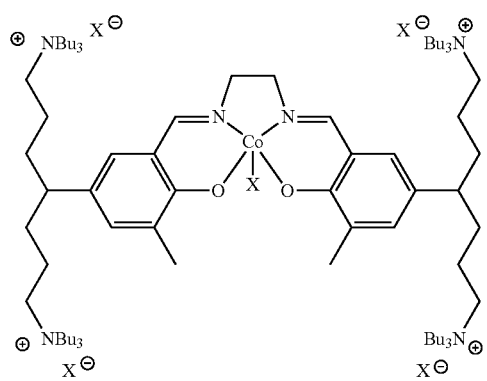
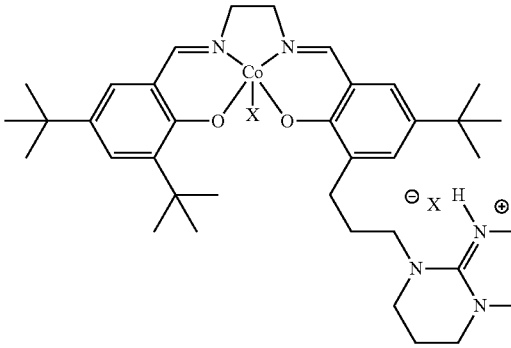
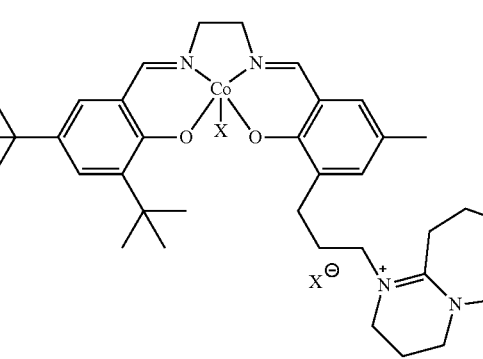

TABLE 1-continued
Representative Epoxide CO₂ Copolymerization Catalysts
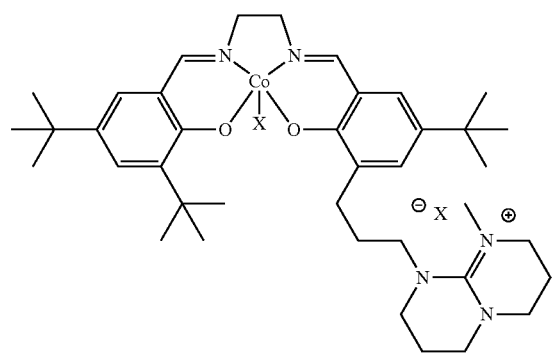
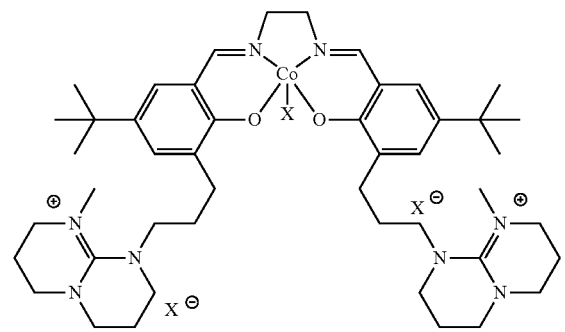
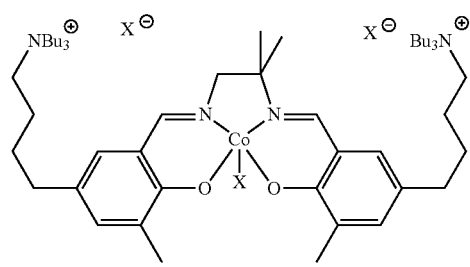
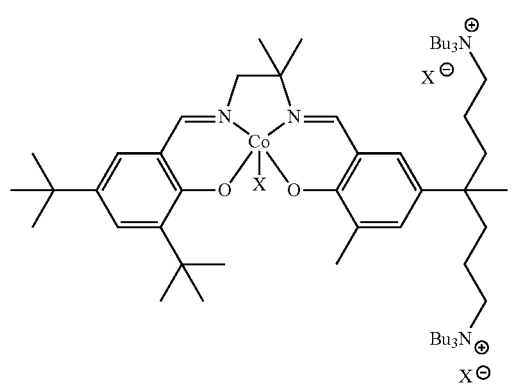
TABLE 1-continued
Representative Epoxide CO₂ Copolymerization Catalysts
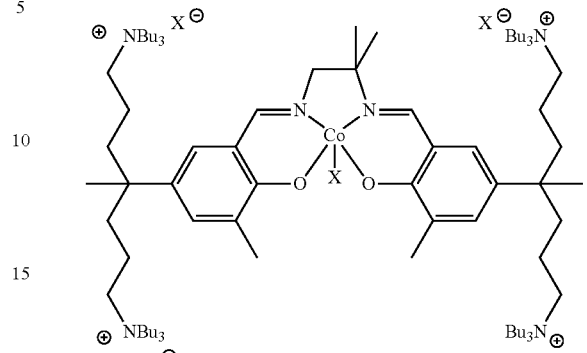
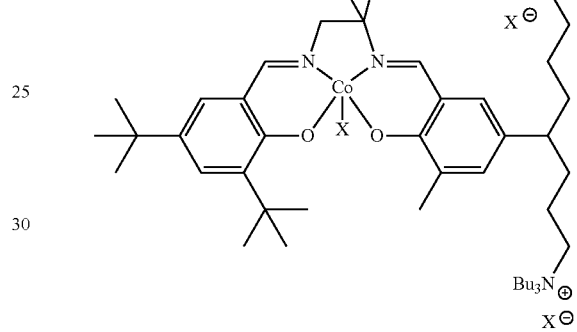
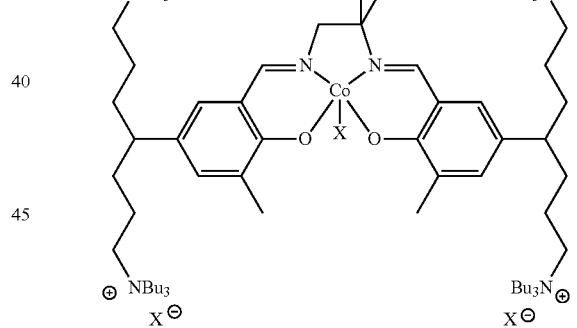
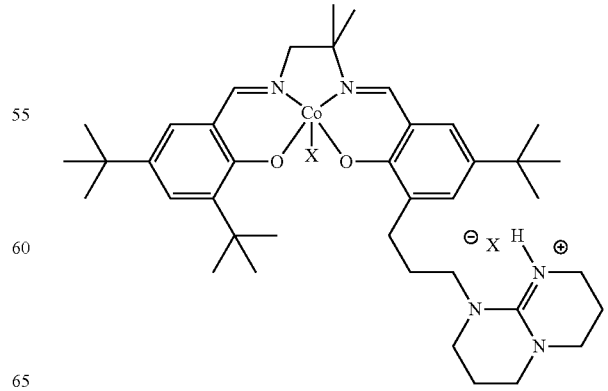

TABLE 1-continued

Representative Epoxide CO₂ Copolymerization Catalysts

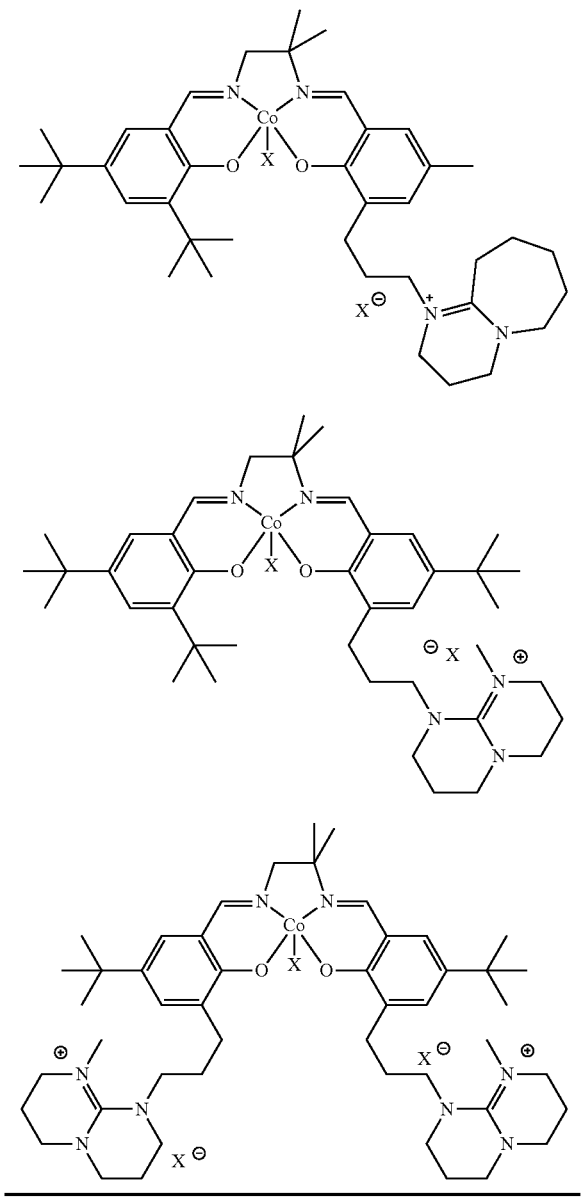

X in each compound in Table I represents an anion, and each X may be the same as or different from other X groups in the same molecule.

It will be recognized by the skilled artisan that there are a vast number of other suitable epoxide $CO_2$ copolymerization catalysts available in the art, while a few are presented here, it will be understood that any epoxide $CO_2$ copolymerization catalyst possessing the features described herein can be used similarly to practice the inventive methods and compositions. While this specification describes certain metal complexes and families of catalysts that can be employed as epoxide $CO_2$ copolymerization catalysts in the inventive methods and compositions, the invention is not limited to these particular catalysts since it is within the capacity of a skilled artisan to identify suitable catalysts through routine experimentation guided by the teaching of this disclosure. A skilled artisan can readily evaluate large numbers of metal complexes (which may be commercially available or made using well known procedures) for the required activity. For example, by exposing mixtures of carbon dioxide an epoxide such as propylene oxide to a catalytic amount of various metal complexes (preferably using automated parallel high-throughput reaction equipment) the artisan could routinely screen many catalysts. The mixtures could then be subjected to routine analysis to detect polymer formation (e.g. by GPC or NMR), to evaluate the formation of byproducts, and to measure other parameters to ascertain which complexes are suitable as polymerization catalysts. In certain embodiments, methods of the present invention include a step of evaluating possible polymerization catalysts for their activity and selectivity prior to employing them in the methods and compositions of the invention. Similarly, it is recognized by the inventors that new and possibly improved catalysts for epoxide $CO_2$ copolymerization will likely be discovered in the future. It is anticipated that such catalysts will also be suitable for methods of the present invention and their use in the claimed methods will be within the scope of the present invention.

In some embodiments, polymerization catalysts suitable for the present invention include those disclosed in PCT application publications WO 2010/022388, WO 2008/136591, WO 2012/037282, J. Am. Chem. Soc. 2007, 129, 8082-8083, and J. Am. Chem. Soc. 2009, 131, 11509-11518, the entire content of each of which is incorporated herein by reference.

III. The Molar Ratio of the Epoxide Hydrolysis Catalyst to the Polymerization Catalyst As mentioned above, and described in more detail below, methods of the present invention involve the use of two different catalysts. This section describes the ratios in which the epoxide hydrolysis catalyst and the epoxide $CO_2$ copolymerization catalyst are provided. In a general sense, the methods of the invention do not place any particular limitations on the amounts or ratios of catalysts provided. In certain embodiments, either the epoxide hydrolysis catalyst or the epoxide $CO_2$ copolymerization catalyst may be provided in molar excess relative to the other. However, it is a general principal that artisans endeavor to use as little catalyst as possible to reliably effect the desired reaction in a reasonable interval of time since this minimizes catalyst expense and also simplifies purification of the product if the catalyst is to be removed. In that spirit, but without being bound by theory, or limiting the scope of the invention it is believed that the most efficient approach is to use high activity catalysts and to use the epoxide hydrolysis catalyst in an amount equal to or less than the amount of epoxide $CO_2$ copolymerization catalyst on a molar basis.

In certain embodiments, the molar ratio of the epoxide hydrolysis catalyst to the polymerization catalyst is from 1:10,000 to 1:1. In certain embodiments, the molar ratio of the epoxide hydrolysis catalyst to the polymerization catalyst is from 1:1,000 to 1:1. In certain embodiments, the molar ratio of the epoxide hydrolysis catalyst to the polymerization catalyst ranges from 1:5,000 to 1:50, from 1:1000 to 1:50, from 1:500 to 1:50, from 1:400 to 1:50, from 1:300 to 1:50, from 1:200 to 1:50 or from 1:100 to 1:50. In certain embodiments, the molar ratio of the epoxide hydrolysis catalyst to the polymerization catalyst ranges from 1:50 to 1:1, from 1:50 to 1:5, from 1:50 to 1:10, from 1:50 to 1:15, from 1:50 to 1:20, or from 1:50 to 1:30. In certain embodiments, the molar ratio of the epoxide hydrolysis catalyst to the polymerization catalyst ranges from 1:20 to 1:1, from 1:20 to 1:2, from 1:20 to 1:5, or from 1:20 to 1:10. In certain embodiments, the molar ratio of the epoxide hydrolysis catalyst to the polymerization catalyst ranges from 1:10 to 1:1, from 1:10 to 1:2, from 1:10 to 1:3, from 1:10 to 1:4, or from 1:110 to 1:5.

In certain embodiments, the molar ratio of the epoxide hydrolysis catalyst to the polymerization catalyst is from 1:100 to 11:2. In certain embodiments, the molar ratio of the hydrolysis catalyst to the polymerization catalyst is less than about 1:5 (e.g. less than 20 mol % hydrolysis catalyst). In certain embodiments, the molar ratio of the hydrolysis catalyst to the polymerization catalyst is less than about 1:10 (e.g. less than 10 mot % hydrolysis catalyst). In certain embodiments, the molar ratio of the hydrolysis catalyst to the polymerization catalyst is less than about 1:20, less than about 1:40, less than about 1:50 or less than about 1:100. In certain embodiments, the molar ratio of the hydrolysis catalyst to the polymerization catalyst is less than about 1:200, less than about 1:300, less than about 1:500, or less than about 1:1000.

IV. Methods of the Invention

In one aspect, the present invention provides methods for the copolymerization of epoxides and $CO_2$ to produce aliphatic polycarbonate polymers. Having described in some details the two classes of catalyst required to practice the invention, this section now describes in more detail the methods themselves. It is to be understood that the scope of each step and method described below encompasses the use of all of the variations of the catalysts described hereinabove. Therefore, where a method describes a step of contacting an epoxide with an epoxide hydrolysis catalyst, the catalyst to be understood to encompass all of those defined above and in the classes and subclasses herein in addition to any other catalyst with the requisite activity and selectivity. Similarly, the epoxide $CO_2$ copolymerization catalysts referenced in the methods encompass all of those defined above and described in the classes and subclasses herein in addition to any other catalyst with the requisite activity.

In certain embodiments, methods of the present invention comprise the step of contacting one or more epoxides with a first catalyst capable of catalyzing the hydrolysis of epoxides and a second catalyst capable of catalyzing the copolymerization of epoxides and $CO_2$. In certain embodiments, the methods are further characterized in that the first and second catalysts have different structures. In certain embodiments, the methods are characterized in that the second catalyst comprises at least one tethered activating moiety such as an 'onium' group, a nitrogen-containing functional group, or a phosphorous-containing functional group. In certain embodiments, the methods are characterized in that the second catalyst, when used without the step of contacting the epoxide with the first catalyst exhibits an induction period and that when the second catalyst is used with the step of contacting the epoxide with the first catalyst, this induction period is lessened or eliminated.

In certain embodiments, the method is as simple as contacting the one or more epoxides with both catalysts in the presence of $CO_2$. In other embodiments, methods of the present invention include additional refinements where the epoxide hydrolysis and epoxide $CO_2$ copolymerization are performed in distinct steps. These refinements include variations such as conducting the two steps at different times, conducting the two steps in different places, conducting the two steps under different reaction conditions, or combinations of any two or more of these. These variations are described in more detail below.

In certain embodiments, the epoxide hydrolysis step and the epoxide $CO_2$ copolymerization step are performed sequentially in time by first adding the epoxide hydrolysis catalyst and then, at a later time, adding the copolymerization catalyst. Therefore, in certain embodiments, methods encompassed by the present invention comprise the substeps of:

1) contacting one or more epoxides with the first catalyst prior to adding the second catalyst; and
2) contacting the one or more epoxides with carbon dioxide in the presence of the second catalyst.

In this variation, the carbon dioxide may be present during the hydrolysis step or added only when the second catalyst is introduced. Therefore, in certain embodiments of such methods, the step of contacting one or more epoxides with the first catalyst is performed in the absence of carbon dioxide, while in certain other embodiments, the step of contacting one or more epoxides with the first catalyst is performed in the presence of carbon dioxide.

Alternatively, both catalysts can be added to the epoxide (or mixture of epoxides), but the addition of carbon dioxide can be delayed such that copolymerization only commences after the epoxide hydrolysis catalyst has had time to react. Therefore, in certain embodiments, methods encompassed by the present invention comprise the substeps of:

(1) simultaneously contacting one or more epoxides with the first catalyst and the second catalyst;
(2) allowing the mixture to react for a period of time in the absence of $CO_2$, and
(3) contacting the mixture of one or more epoxides, the first catalyst, and the second catalyst with carbon dioxide.

In certain embodiments of this method, steps (1) to (3) can be performed. In a single vessel. In a variation, some of the steps can occur in one vessel and other steps in a second vessel. In certain embodiments, steps (1) and (2) are performed in a first vessel, and step (3) is performed in a second vessel.

As just described, the epoxide hydrolysis step and the copolymerization can be performed in different vessels. These embodiments can be advantageous since epoxide $CO_2$ copolymerizations are typically performed at elevated $CO_2$ pressures and therefore require expensive high pressure reactors. Since the hydrolysis step does not necessarily require high pressure, it can be an efficient use of capital to perform the hydrolysis in a less expensive low-pressure reactor and then transfer the mixture to a high pressure reactor for the copolymerization. With proper sizing and selection of vessels it is thereby possible to increase the throughput of the pressure reactor relative to performing both steps in the pressure reactor. In essence, this approach can be considered a pretreatment of the feedstock to the polymerization reaction.

Therefore, in certain embodiments, the present invention provides a method for the copolymerization of one or more epoxides and $CO_2$ to produce aliphatic polycarbonate polymers comprising the steps of:

treating an epoxide feedstock comprising one or more epoxides by contacting it with an epoxide hydrolysis catalyst, and
feeding the treated epoxide feedstock to an epoxide $CO_2$ copolymerization reaction where it is contacted with $CO_2$ in the presence of an epoxide $CO_2$ copolymerization catalyst.

In certain embodiments of this variation, only the epoxide hydrolysis catalyst is present in the first step and the epoxide $CO_2$ copolymerization catalyst is only present at the copolymerization step. In other embodiments, it is more expedient to add both catalysts at the initial step and the step of treating the epoxide feedstock is therefore conducted with the copolymerization catalyst present.

In certain embodiments, the step of contacting the treated epoxide feedstock with $CO_2$ in the presence of an epoxide $CO_2$ copolymerization catalyst is performed in the absence of the epoxide hydrolysis catalyst. Therefore, in certain embodiments, the method includes a step of removing the epoxide hydrolysis catalyst from the epoxide feedstock. In certain embodiments of such methods, the step of treating the epoxide feedstock comprises contacting the feedstock with a solid or solid-supported epoxide hydrolysis catalyst. In certain embodiments, the solid or solid-supported epoxide hydrolysis catalyst is removed from the treated epoxide feedstock (for example by filtering, decanting, or sedimentation) before or during the step of feeding it to the epoxide $CO_2$ copolymerization. In certain embodiments, the step of treating the epoxide feedstock with the solid or solid-supported epoxide hydrolysis catalyst comprises flowing the epoxide feedstock through a bed of the catalyst. In certain embodiments of this approach, the rate of the flow and size of the solid catalyst bed are such that the water in the epoxide feedstock stream is substantially consumed.

It is typical when performing chemical reactions of epoxides to carefully control the temperature, pressure, atmosphere, and agitation of the reaction mixtures. The present invention places no particular limitations on these variables or the physical conditions under which the steps of the invention are performed. It is to be understood that the selection of such variables is required, but that using the teachings and disclosure of the present application, such selections require no more than routine experimentation. It will, for example, be recognized that the optimal temperature for each step may vary according to the specific catalyst, epoxide, and equipment employed, and may be influenced by the quality of the feedstocks, the desired product sought and a host of other similar variables. The skilled artisan (i.e. a chemical engineer) will be able to determine appropriate reaction conditions using the teachings herein along with the routine experimentation typically undertaken to determine workable conditions for a chemical process.

In certain embodiments, methods of the present invention include steps of heating or cooling the epoxide mixtures. In certain embodiments, the hydrolysis step and the copolymerization step are conducted at different temperatures. In certain embodiments, the temperature of the epoxide hydrolysis step is higher than the temperature of the copolymerization step. In certain embodiments, the temperature of the epoxide hydrolysis step is lower than the temperature of the copolymerization step. In certain embodiments, the temperature of the epoxide hydrolysis step is the same as the temperature of the copolymerization step. In certain embodiments, the epoxide hydrolysis step and the copolymerization step are both performed at elevated temperatures. In certain embodiments, the epoxide hydrolysis step and the copolymerization step are both performed at elevated temperatures but each step is at a different temperature. In certain embodiments, the epoxide hydrolysis step and the copolymerization step are both performed at the same elevated temperature. In certain embodiments, the epoxide hydrolysis step is performed at ambient temperature and the copolymerization step is performed at an elevated temperature.

In certain embodiments, the epoxide mixtures are stirred or otherwise agitated during one or more steps of the described methods.

In certain embodiments, the $CO_2$ pressure is varied between different steps in the inventive methods. For example, as described above, in certain embodiments, the step of contacting the epoxide (or mixture of epoxides) with the epoxide hydrolysis catalyst is performed in the absence of $CO_2$ pressure. In other embodiments, $CO_2$ pressure is present during the epoxide hydrolysis step. In certain embodiments where $CO_2$ pressure is present in both the hydrolysis step and the copolymerization step, the pressure is varied over time. In certain embodiments, the $CO_2$ pressure is lower during the hydrolysis step and then is raised during or before the copolymerization step.

In certain embodiments, the present invention provides a method for the copolymerization of one or more epoxides and $CO_2$ to produce aliphatic polycarbonate polymers comprising the steps of:
 charging a reaction vessel with one or more epoxides,
 contacting the one or more epoxides with an epoxide hydrolysis catalyst,
 allowing a period of time for epoxide hydrolysis, and
 adding an epoxide $CO_2$ copolymerization catalyst to the vessel.

In certain embodiments, $CO_2$ is present during the epoxide hydrolysis step. In other embodiments, $CO_2$ is introduced after the hydrolysis step is at least partially complete.

In certain embodiments, the method includes the step of heating the one or more epoxides during the epoxide hydrolysis period. In certain embodiments, the mixture is heated to a temperature above about 30° C., above about 40° C., above about 50° C., above about 60° C., above about 70° C., or above about 80° C. during the epoxide hydrolysis step. In certain embodiments, the mixture is heated to between 30° C. and 100° C. during the epoxide hydrolysis step. In certain embodiments, the mixture is heated to about 30° C., about 40° C., about 50° C., about 60° C., about 70° C., or about 80° C. during the epoxide hydrolysis step.

In certain embodiments where the mixture is heated during the epoxide hydrolysis step, the mixture is cooled prior to adding the epoxide $CO_2$ catalyst. In certain embodiments where the mixture is heated during the epoxide hydrolysis step, the heating is maintained during or after the step of adding the epoxide $CO_2$ catalyst.

In certain embodiments, the mixture is maintained at or near ambient temperature or is cooled during the epoxide hydrolysis step. In certain embodiments, the mixture is then heated for the copolymerization step. This heating may be performed before, after, or during the addition of the epoxide $CO_2$ copolymerization catalyst. In certain embodiments, the epoxide hydrolysis step is performed at or below ambient temperature and the epoxide $CO_2$ copolymerization step is performed at a temperature above about 30° C., above about 40° C., above about 50° C., above about 60° C., above about 70° C., or above about 80° C.

In certain embodiments, the present invention provides a method for the copolymerization of one or more epoxides and $CO_2$ to produce aliphatic polycarbonate polymers comprising the steps of:
 charging a reaction vessel with one or more epoxides,
 contacting the one or more epoxides with a mixture of an epoxide hydrolysis catalyst and an epoxide $CO_2$ copolymerization catalyst,
 allowing a period of time for epoxide hydrolysis, and
 contacting the mixture with $CO_2$.

In certain embodiments, the method includes the step of heating the one or more epoxides during the epoxide hydrolysis period. In certain embodiments, the mixture is heated to a temperature above about 30° C., above about 40° C., above about 50° C., above about 60° C., above about 70° C., or above about 80° C. during the epoxide hydrolysis step. In certain embodiments, the mixture is heated to between 30°

C. and 100° C. during the epoxide hydrolysis step. In certain embodiments, the mixture is heated to about 30° C., about 40° C., about 50° C., about 60° C., about 70° C., or about 80° C. during the epoxide hydrolysis step.

In certain embodiments where the mixture is heated during the epoxide hydrolysis step, the mixture is cooled prior to contacting the mixture with $CO_2$. In certain embodiments where the mixture is heated during the epoxide hydrolysis step, the heating is maintained during or after the step of contacting the mixture with $CO_2$.

In certain embodiments, the mixture is maintained at or near ambient temperature or is cooled during the epoxide hydrolysis step. In certain embodiments, the mixture is then heated for the copolymerization step. This heating may be performed before, after, or during the addition of the $CO_2$. In certain embodiments, the epoxide hydrolysis step is performed at or below ambient temperature and the epoxide $CO_2$ copolymerization step is performed at a temperature above about 30° C., above about 40° C., above about 50° C., above about 60° C., above about 70° C., or above about 80° C.

In certain embodiments, the present invention provides a method for the copolymerization of one or more epoxides and $CO_2$ to produce aliphatic polycarbonate polymers comprising the steps of:
 charging a reaction vessel with one or more epoxides, and
 contacting the one or more epoxides with $CO_2$ and a mixture of an epoxide hydrolysis catalyst and an epoxide $CO_2$ copolymerization catalyst.

In certain embodiments, the method includes the step of heating the mixture for an initial period to facilitate epoxide hydrolysis. In certain embodiments, the mixture is heated to a temperature above about 30° C., above about 40° C., above about 50° C., above about 60° C., above about 70° C., or above about 80° C. to facilitated the epoxide hydrolysis. In certain embodiments, the mixture is heated to between 30° C. and 100° C. during the epoxide hydrolysis step. In certain embodiments, the mixture is heated to about 30° C., about 40° C., about 50° C., about 60° C., about 70° C., or about 80° C. during the epoxide hydrolysis step.

In certain embodiments where the mixture is heated an initial period to facilitate epoxide hydrolysis and then cooled for a subsequent period during which epoxide $CO_2$ copolymerization occurs. In certain embodiments where the mixture is heated during the epoxide hydrolysis step, the heating is maintained or increased for a subsequent period during which epoxide $CO_2$ copolymerization occurs.

In certain embodiments, the mixture is maintained at or near ambient temperature or is cooled during an initial period to facilitate the epoxide hydrolysis step. In certain embodiments, the mixture is then heated for the copolymerization step. This heating may be performed before, after, or during the addition of the $CO_2$. In certain embodiments, the epoxide hydrolysis step is performed at or below ambient temperature and the epoxide $CO_2$ copolymerization step is performed at a temperature above about 30° C., above about 40° C., above about 50° C., above about 60° C., above about 70° C., or above about 80° C.

In certain embodiments, the mixture one or more epoxides, the first catalyst and the second catalyst is formed in the presence of carbon dioxide, or immediately contacted with carbon dioxide after mixing.

In certain embodiments, methods of the present invention are characterized in that a copolymerization performed using both the first catalyst and the second catalyst has a substantially lower induction period than a corresponding reaction performed under the same copolymerization conditions, but in the absence of the first catalyst. In certain embodiments, the induction time observed for a copolymerization including the first catalyst is less than about 0.75× the same copolymerization performed in the absence of the first catalyst, in certain embodiments, the induction time observed for a copolymerization including the first catalyst is less than about 0.5×, less than about 0.4×, less than about 0.3×, less than about 0.25× or less than about 0.1× the same copolymerization performed in the absence of the first catalyst.

V. Catalyst Compositions

In another aspect, the present invention encompasses novel catalyst compositions. In certain embodiments, the inventive catalyst compositions comprise mixtures of two or more metal complexes characterized in that at least one metal complex has substantial catalytic activity for the hydrolysis of epoxides and at least one metal complex with a structure different from the epoxide hydrolysis catalyst which has substantial catalytic activity in the copolymerization of epoxides and $CO_2$. In certain embodiments, the compositions comprise the combination of at least one epoxide hydrolysis catalyst described above in the section titled "Epoxide Hydrolysis Catalysts", and at least one epoxide $CO_2$ copolymerization catalyst described in above in the section titled "Polymerization Catalysts". In certain embodiments, the inventive catalyst compositions are characterized in that they comprise a ratio of epoxide hydrolysis catalyst to epoxide $CO_2$ copolymerization catalyst according to any of the embodiments defined above in the section titled "The molar ratio of the epoxide hydrolysis catalyst to the polymerization catalyst". In certain embodiments, the mixtures are characterized in that the mixture contains less epoxide hydrolysis catalyst on a molar basis than epoxide $CO_2$ copolymerization catalyst. In certain embodiments, the mixtures are characterized in that the epoxide hydrolysis catalyst is present in a molar ratio of from about 1:100 to about 1:2 based on moles of epoxide $CO_2$ copolymerization catalyst present.

In certain embodiments, catalyst compositions of the present invention comprise a mixture containing two different metal salen complexes, characterized in that the first metal salen catalyst has substantial catalytic activity for the hydrolysis of epoxides and the second metal salen catalyst has substantial catalytic activity in the copolymerization of epoxides and $CO_2$. In certain embodiments, such compositions are further characterized in that the epoxide $CO_2$ copolymerization catalyst comprises a metal salon complex having a tethered activating moiety selected from the group consisting of onium salts, nitrogen-containing functional groups and phosphorous-containing functional groups. In certain embodiments, such compositions are further characterized in that the epoxide hydrolysis catalyst comprises a metal salen complex not having any tethered activating groups. In certain embodiments, both the epoxide hydrolysis catalyst and epoxide $CO_2$ copolymerization catalyst comprise a cobalt salen catalyst.

In certain embodiments, catalyst compositions of the present invention comprise a mixture of a catalyst with formula

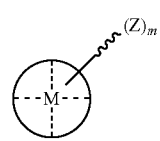

with a catalyst of formula

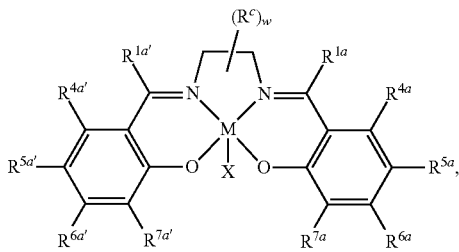

or a mixture of a catalyst with formula

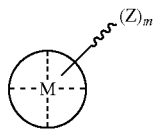

with a catalyst of formula

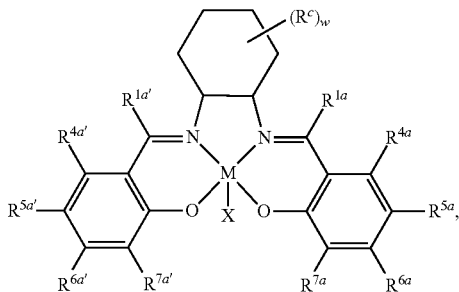

where

$(Z)_m$, X, M, $R^c$, $R^{1a}$, $R^{1a'}$, $R^{4a}$, $R^{4a'}$, $R^{5a}$, $R^{5a'}$, $R^{6a}$, $R^{6a'}$, $R^{7a}$, $R^{7a'}$ and w are as defined above, and in the classes and subclasses herein.

In certain embodiments, catalyst compositions of the present invention comprise a mixture of any catalyst in Table I, with a catalyst of formula:

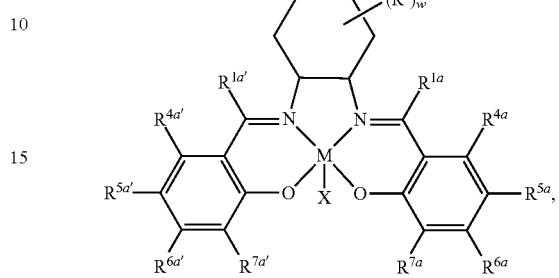

where, X, M, $R^c$, $R^{1a}$, $R^{1a'}$, $R^{4a}$, $R^{4a'}$, $R^{5a}$, $R^{5a'}$, $R^{6a}$, $R^{6a'}$, $R^{7a}$, $R^{7a'}$ are as defined above, and in the classes and subclasses herein.

In certain embodiments, catalyst compositions of the present invention comprise a mixture of any catalyst in Table I, with a catalyst of formula:

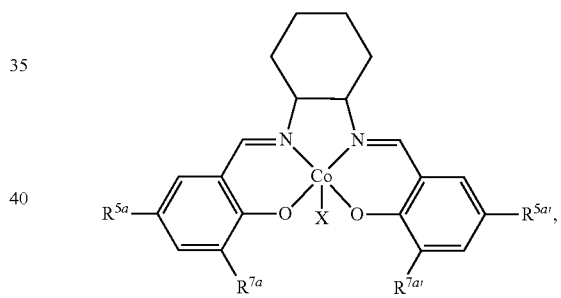

where each of $R^{5a}$, $R^{5a'}$, $R^{7a}$, $R^{7a'}$ and X is as defined above and in the classes and subclasses herein.

In certain embodiments, catalyst compositions of the present invention comprise a mixture of any catalyst in Table I, with a catalyst of formula:

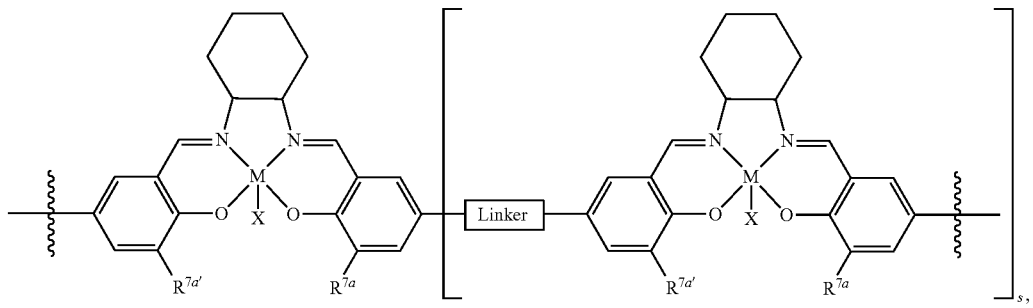

where each of the linker, M, $R^{7a}$, $R^{7a'}$, X, and s is as defined above and in the classes and subclasses herein.

In certain embodiments, the present invention encompasses compositions comprising any of the above catalyst mixtures dissolved in a liquid. In certain embodiments, the liquid in which the catalyst is dissolved comprises one or more epoxides.

VI. Epoxides

The methods described above place no particular constraint on the structure of the epoxide. The copolymerization of epoxides with $CO_2$ to form polycarbonates has been demonstrated for a large diversity of epoxides including, but not limited to:
- simple alkylene oxides such as ethylene oxide, propylene oxide, 1,2-butylene oxide and the oxides of higher alpha olefins;
- epoxides with additional substitution or with other heteroatoms present such as 2,3 butylene oxide, isobutylene oxide, epichlorohydrin, glycidol ethers, glycidol esters, fluorinated epoxides, and the like;
- bicyclic epoxides such as cyclohexene oxide, 3-ethyl cyclohexe oxide, cyclopentene oxide, cyclooctadiene diepoxide, limonene oxide, norbornene oxide and the like; and
- unsaturated epoxides such as butadiene monoepoxide, cyclooctadiene monoepoxide, cyclohexene oxide, and styrene oxide and its derivatives.

Any of the above can be used atone or in combination in the methods described herein.

In certain embodiments, the epoxide comprises ethylene oxide, either alone or in combination with one or more additional epoxides. In certain embodiments the epoxide comprises propylene oxide, either alone or in combination with one or more additional epoxides.

In certain embodiments, an epoxide used in any of the methods above has a formula:

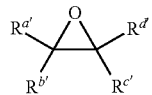

wherein:
$R^{a'}$ is hydrogen or an optionally substituted radical selected from the group consisting of $C_{1-30}$ aliphatic, $C_{1-30}$ heteroaliphatic, phenyl, a 3- to 8-membered saturated or partially unsaturated monocyclic carbocycle, a 7-14 carbon saturated, partially unsaturated or aromatic polycyclic carbocycle, a 5- to 6-membered monocyclic heteroaryl ring having 1-4 heteroatoms independently selected from nitrogen, oxygen, or sulfur, a 3- to 8-membered saturated or partially unsaturated heterocyclic ring having 1-3 heteroatoms independently selected from nitrogen, oxygen, or sulfur, a 6- to 12-membered polycyclic saturated or partially unsaturated heterocycle having 1-5 heteroatoms independently selected from nitrogen, oxygen, or sulfur, and an 8- to 10-membered bicyclic heteroaryl ring having 1-5 heteroatoms independently selected from nitrogen, oxygen, or sulfur; and each of $R^{b'}$, $R^{c'}$, and $R^{d'}$ is independently hydrogen or an optionally substituted radical selected from the group consisting of $C_{1-12}$ aliphatic, $C_{1-12}$ heteroaliphatic, phenyl; a 3- to 8-membered saturated or partially unsaturated monocyclic carbocycle, a 7-14 carbon saturated, partially unsaturated or aromatic polycyclic carbocycle, a 5- to 6-membered monocyclic heteroaryl ring having 1-4 heteroatoms independently selected from nitrogen, oxygen, or sulfur, a 3- to 8-membered saturated or partially unsaturated heterocyclic ring having 1-3 heteroatoms independently selected from nitrogen, oxygen, or sulfur, a 6- to 12-membered polycyclic saturated or partially unsaturated heterocycle having 1-5 heteroatoms independently selected from nitrogen, oxygen, or sulfur, and an 8- to 10-membered bicyclic heteroaryl ring having 1-5 heteroatoms independently selected from nitrogen, oxygen, or sulfur; or any one or more of [$R^{a'}$ and $R^{c'}$], [$R^{c'}$ and $R^{d'}$], and [$R^{a'}$ and $R^{b'}$] can each be taken together with their intervening atoms to form an optionally substituted ring.

In certain embodiments, epoxides useful for methods of the present invention are selected from the group consisting of:

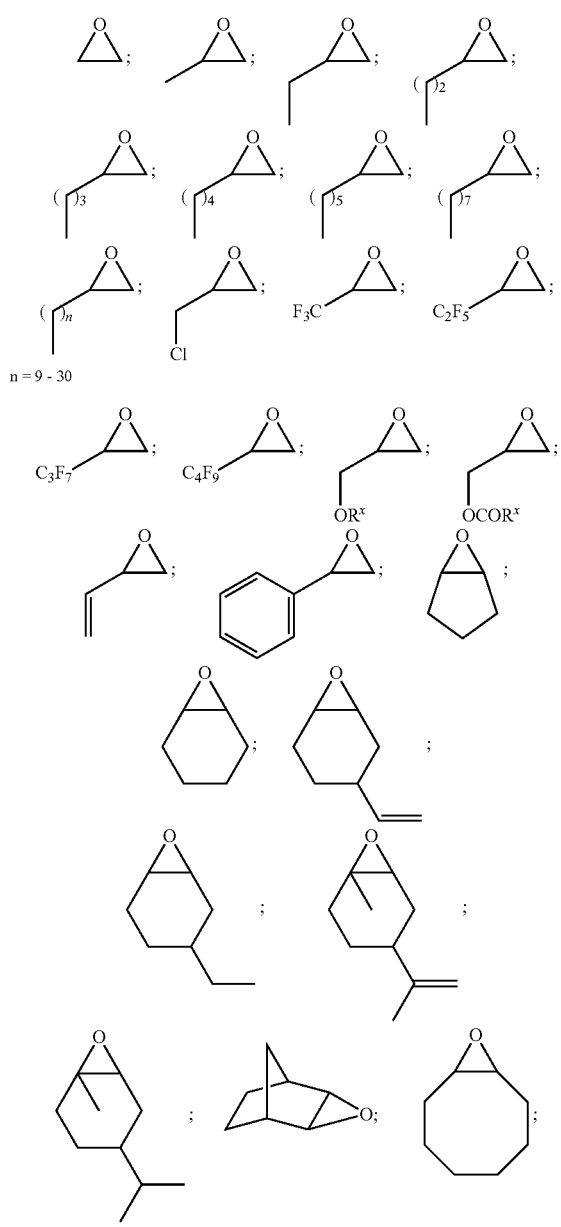

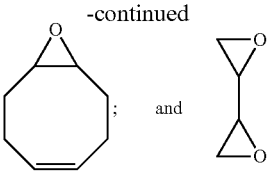

wherein each $R^x$ is independently selected from optionally substituted aliphatic, optionally substituted heteroaliphatic, optionally substituted aryl fluoroalkyl, and optionally substituted heteroaryl.

In certain embodiments, methods of the present invention include the use of ethylene oxide. In other embodiments, methods of the present invention include propylene oxide. In other embodiments methods of the present invention include cyclohexene oxide. In other embodiments, methods of the present invention include epichlorohydrin. In certain embodiments, methods of the present invention include a glycidyl ether or glycidyl ester. In certain embodiments, methods of the present invention include phenyl glycidyl ether. In certain embodiments, methods of the present invention include t-butyl glycidyl ether.

In certain embodiments, methods of the present invention include ethylene oxide and propylene oxide. In certain embodiments, methods of the present invention include propylene oxide along with from about 0.1 to about 10% of a $C_4$-$C_{30}$ epoxide. In certain embodiments, reaction mixtures include propylene oxide along with from about 0.1 to about 10% of a glycidyl ether. In certain embodiments, reaction mixtures include propylene oxide along with from about 0.1 to about 10% of a glycidyl ester. In certain embodiments, reaction mixtures include ethylene oxide along with from about 0.1 to about 10% of a glycidyl ether. In certain embodiments, reaction mixtures include ethylene oxide along with from about 0.1 to about 10% of a glycidyl ester. In certain embodiments, reaction mixtures include ethylene oxide along with from about 0.1 to about 10% of a $C_4$-$C_{30}$ epoxide.

In certain embodiments, reaction mixtures include epoxides derived from naturally occurring materials such as epoxidized resins or oils. Examples of such epoxides include, but are not limited to: Epoxidized Soybean Oil; Epoxidized Linseed Oil; Epoxidized Octyl Soyate; Epoxidized PGDO; Methyl Epoxy Soyate; Butyl Epoxy Soyate; Epoxidized Octyl Soyate; Methyl Epoxy Linseedate; Butyl Epoxy Linseedate; and Octyl Epoxy Linseedate. These and similar materials are available commercially from Arkema Inc. under the trade name Vikoflex®. Examples of such commerically available Vikoflex® materials include Vikoflex 7170 Epoxidized Soybean Oil, Vikoflex 7190 Epoxidized Linseed, Vikoflex 4050 Epoxidized Octyl Soyate, Vikoflex 5075 Epoxidized PGDO, Vikoflex 7010 Methyl Epoxy Soyate, Vikoflex 7040 Butyl Epoxy Soyate, Vikoflex 7080 Epoxidized Octyl Soyate, Vikoflex 9010 Methyl Epoxy Linseedate, Vikoflex 9040 Butyl Epoxy Linseedate, and Vikoflex 9080 Octyl Epoxy Linseedate.

In certain embodiments of the present invention, reaction mixtures include epoxides derived from alpha olefins. Examples of such epoxides include, but are not limited to those derived from $C_{10}$ alpha olefin, $C_{12}$ alpha olefin, $C_{14}$ alpha olefin, $C_{16}$ alpha olefin, $C_{18}$ alpha olefin, $C_{20}$-$C_{24}$ olefin, $C_{24}$-$C_{28}$ alpha olefin and $C_{30+}$ alpha olefins. These and similar materials are commercially available from Arkema Inc. under the trade name Vikolox®. In certain embodiments, reaction mixtures including alpha olefins also include other simpler epoxide monomers including, but not limited to: ethylene oxide, propylene oxide, butylene oxide, hexene oxide, cyclopentene oxide and cyclohexane oxide.

EXEMPLIFICATION

The invention now having been generally described, it will be more readily understood by reference to the following examples which are included merely for purposes of illustration of certain aspects and embodiments of the present invention, and are not intended to limit the invention.

Examples below use metal complexes including catalysts I, II, and III among others.

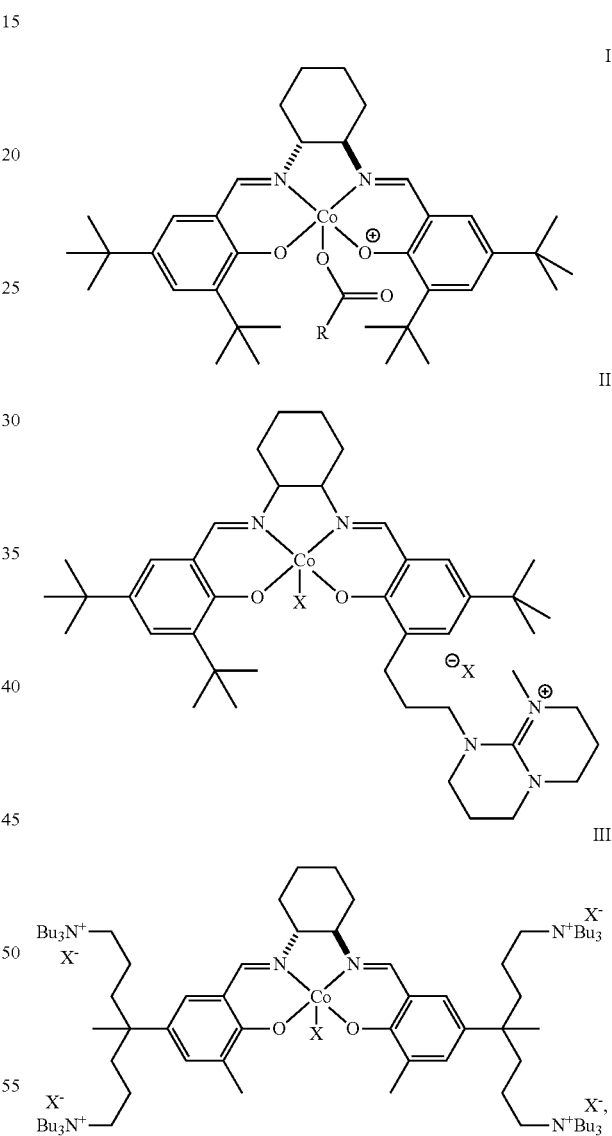

wherein in catalyst I, R is $CF_3$ in catalyst II, X is $\frac{1}{2}$ $CO_3^{2-}$; and in catalyst III each X is 2,4-dinitrophenolate.

Example 1-3

A 300 mL capacity pressure reactor was charged with catalyst I (as an epoxide hydrolysis catalyst) and catalyst II (as an epoxide $CO_2$ copolymerization catalyst). The reactor was sealed and purged with dry nitrogen gas for 5 min.

Dipropylene glycol (4.7 ml) and propylene oxide (60 mL) were added in the reactor under $N_2$ via syringe. The reactor was mechanically agitated at 500 rpm, heated to 50° C. and pressurized with carbon dioxide to 300 psi. The reaction was terminated by venting carbon dioxide. The results are shown in Table II.

TABLE II

| Example No. | Catalyst I (mmol) | Catalyst II (mmol) | Induction time (h) |
|---|---|---|---|
| 1 | 0.0047 | 0.43 | 1.97 |
| 2 | 0.0095 | 0.43 | 1.47 |
| 3 | 0.0225 | 0.43 | 0.67 |
| 4 | 0 | 0.43 | 6.38 |

Example 4

Example 4 was performed under the conditions described for Example 1, except catalyst I was not added to compare the induction time of the runs with catalyst I with that of the run without catalyst I.

Examples 5-8

Examples 5-8 are performed under the conditions described for Examples 1-3, except in each case, catalyst III is substituted for catalyst I and the reactions are carried out at 70° C. In examples 5, 6, and 7, the induction period is reduced relative to the comparative example 8 lacking catalyst I.

Examples 9-16

Examples 9-16, are performed under conditions identical to examples 1-7 respectively, except in each case, the dipropylene glycol is not added to the reaction mixtures. Again, the induction periods in reactions 9-11, and 13-15 including catalyst I are reduced relative to reactions 12 and 16 lacking catalyst I.

Examples 17-20

Examples 17-20 are performed under the conditions described for examples 13-16, except the ratio of PO:catalyst is 50,000:1 and the amount of catalyst I is unchanged.

Example 21

Example 21 is performed under the conditions described for example 1, except catalyst I is charged to the reactor prior to the other reagents, and catalyst II is added 1 h later.

Example 22

Example 22 is performed under the conditions described for example 1, except catalyst I is mixed with the PO in a separate vessel under dry nitrogen and allowed to stir for 1 h prior to charging the PO to the reactor.

Example 23

Example 23 is performed under the conditions described for example 1, except an equal mass of catalyst Id is substituted for catalyst I.

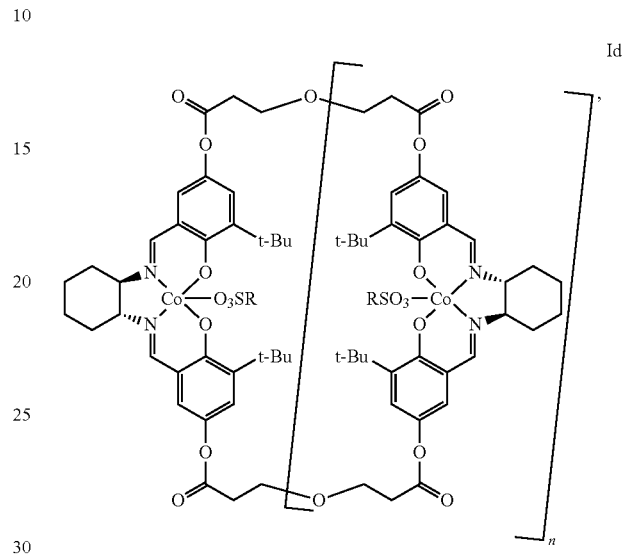

where n is 2, and R is methyl.

Example 24

Example 24 is performed under the conditions described for example 1, except ethylene oxide is substituted for propylene oxide.

Example 25

Example 25 is performed under the conditions described for example 1, except cyclohexene oxide is substituted for propylene oxide.

Example 26

Example 26 is performed under the conditions described for example 1, except a 1:1 mixture of ethylene oxide and propylene oxide is substituted for the propylene oxide.

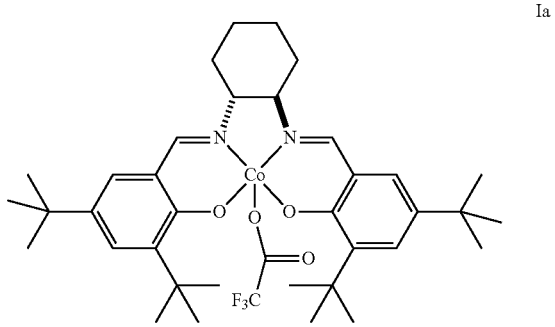

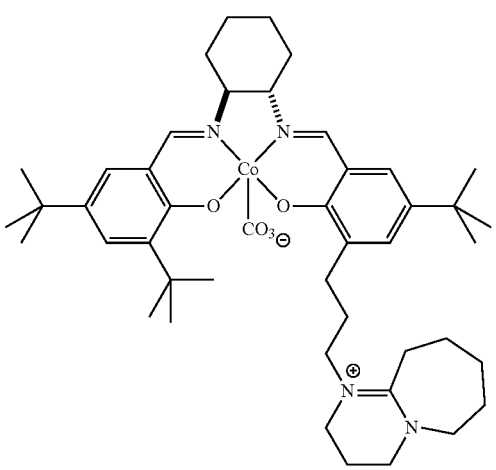

IIa

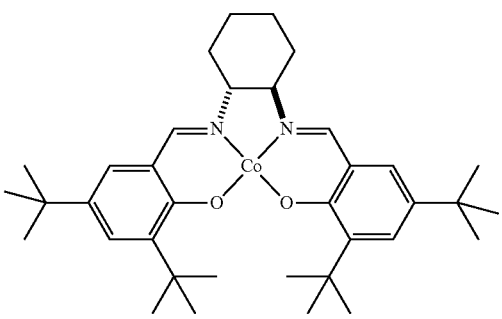

Ic

Example 27

A series of reactions were run to make high molecular weight PPC with catalyst IIa (an epoxide CO₂ copolymerization catalyst) in the presence or absence of epoxide hydrolysis catalyst Ia. For comparison, one reaction was run in the presence of complex Ic (an unoxidized form of catalyst Ia).

For each reaction, a 300 mL, capacity pressure reactor was sealed and purged with dry nitrogen gas for 5 min. Dipropylene glycol (0.5 mmol) and propylene oxide (100 mL) were added to the reactor under N₂. The mixture was mechanically agitated at 500 rpm, heated to 50° C., and pressurized with carbon dioxide to 300 psi. Thereafter, catalyst IIa (as an epoxide CO₂ copolymerization catalyst) with or without complexes Ia or Ic were introduced. The induction period for each reaction was measured by noting the time interval between catalyst addition and the first significant uptake of CO₂. The polymerizations were allowed to proceed for 1-3 hrs after induction and were then terminated by venting the carbon dioxide. In each case, polypropylene carbonate) was obtained in good yield, the polymer Mn ranged from 90 kg/mol to 196 kg/mol. As can be seen in Table III, reactions including addition of catalyst Ia had much shorter induction periods than those lacking catalyst Ia.

TABLE III

| Example No. | Catalyst Ia (mmol) | Complex Ic (mmol) | Catalyst IIa (mmol) | Induction time (h) |
|---|---|---|---|---|
| 27a | 0 | 0 | 0.10 | 23 |
| 27b | 0.015 | 0 | 0.10 | 0.50 |
| 27c | 0.015 | 0 | 0.10 | 0.50 |
| 27d* | 0.015 | 0 | 0.10 | 0.1 |
| 27e# | 0.015 | 0 | 0.10 | 0.2 |
| 27f* | 0† | 0.015 | 0.10 | >7 |

*polymerization at 60° C.
polymerization at 70° C.

What is claimed is:

1. A method for preparing aliphatic polycarbonate polymers comprising the step of contacting one or more epoxides with a first catalyst capable of catalyzing the hydrolysis of epoxides and a second catalyst capable of catalyzing the copolymerization of epoxides and CO₂;
   wherein the first catalyst comprises a transition metal complex; and
   the second catalyst comprises a metal-ligand complex.

2. The method of claim 1, characterized in that the second catalyst comprises at least one tethered activating moiety selected from the group consisting of: as an 'onium' groups, a nitrogen-containing functional group, and a phosphorous-containing functional group.

3. The method of claim 1, characterized in that the second catalyst, when used without the step of contacting the epoxide with the first catalyst exhibits an induction period and that when the second catalyst is used with the step of contacting the epoxide with the first catalyst, this induction period is lessened or eliminated.

4. The method of claim 1, wherein the one or more epoxides are contacted with both catalysts in the presence of CO₂.

5. The method of claim 1, wherein the step comprises a first substep comprising epoxide hydrolysis and a second substep comprising epoxide CO₂ copolymerization.

6. The method of claim 5, wherein the first and second substeps are performed at different times and the first substep comprises contacting one or more epoxides with the first catalyst prior to adding the second catalyst; and the second substep comprises contacting the one or more epoxides with carbon dioxide in the presence of the second catalyst.

7. The method of claim 5, wherein the first and second substeps are performed at different times and the first sub step comprises:
   a) charging a reaction vessel with one or more epoxides,
   b) contacting the one or more epoxides with the first catalyst,
   c) allowing a period of time for epoxide hydrolysis, and the second substep comprises adding the second catalyst to the vessel.

8. The method of claim 5, wherein the first and second sub steps are performed sequentially and the method comprises:
   a) simultaneously contacting one or more epoxides with the first catalyst and the second catalyst;
   b) allowing the mixture to react for a period of time in the absence of CO₂, and
   c) contacting the mixture of one or more epoxides, the first catalyst, and the second catalyst with carbon dioxide.

9. A method for the copolymerization of one or more epoxides and CO₂ to produce aliphatic polycarbonate polymers, the method comprising the steps of:

treating an epoxide feedstock comprising one or more epoxides by contacting it with a first catalyst capable of catalyzing epoxide hydrolysis and optionally a second catalyst capable of catalyzing epoxide $CO_2$ copolymerization; and feeding the treated epoxide feedstock to an epoxide $CO_2$ copolymerization reaction where it is contacted with $CO_2$ in the presence of the second catalyst capable of catalyzing epoxide $CO_2$ copolymerization;

wherein the first catalyst comprises a transition metal complex; and the second catalyst comprises a metal-ligand complex.

10. The method of claim 9, wherein only the first catalyst is present in the first step and the second catalyst is only present at the copolymerization step.

11. The method of claim 9, wherein the second catalyst is present during the step of treating the epoxide feedstock.

12. The method of claim 9, comprising the further step of removing the first catalyst from the treated epoxide feedstock prior to the feeding step.

13. The method of claim 9, wherein the first catalyst is a solid or solid-supported epoxide hydrolysis catalyst.

14. The method of claim 1, wherein the first catalyst comprises a metal salen complex.

15. The method of claim 1, wherein the metal-ligand complex comprises one or more tethered activating moieties selected from the group consisting of: onium salts, nitrogen-containing functional groups, phosphorous-containing functional groups, and combinations of any two or more of these.

* * * * *